United States Patent
Ito et al.

(10) Patent No.: US 8,337,308 B2
(45) Date of Patent: Dec. 25, 2012

(54) GAME SYSTEM, GAME DEVICE, STORAGE MEDIUM STORING GAME PROGRAM, AND GAME PROCESS METHOD

(75) Inventors: Jun Ito, Kyoto (JP); Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/208,719

(22) Filed: Aug. 12, 2011

(65) Prior Publication Data
US 2012/0046106 A1 Feb. 23, 2012

(30) Foreign Application Priority Data

Aug. 20, 2010 (JP) .................................. 2010-185315
May 30, 2011 (JP) .................................. 2011-120680

(51) Int. Cl.
*A63F 9/24* (2006.01)

(52) U.S. Cl. .......................................... 463/37; 463/38
(58) Field of Classification Search .................... 463/37, 463/38

See application file for complete search history.

(56) References Cited

U.S. PATENT DOCUMENTS

| | | | |
|---|---|---|---|
| 6,396,480 B1 | 5/2002 | Schindler et al. | |
| 6,540,610 B2 | 4/2003 | Chatani | |
| 6,716,103 B1 | 4/2004 | Eck et al. | |
| 7,275,994 B2 | 10/2007 | Eck et al. | |
| 7,352,358 B2 | 4/2008 | Zalewski et al. | |
| 7,352,359 B2 | 4/2008 | Zalewski et al. | |
| 7,391,409 B2 | 6/2008 | Zalewski et al. | |
| 2002/0165028 A1 | 11/2002 | Miyamoto et al. | |
| 2004/0023719 A1 | 2/2004 | Hussaini et al. | |
| 2006/0094502 A1 | 5/2006 | Katayama et al. | |
| 2006/0252541 A1 | 11/2006 | Zalewski et al. | |
| 2007/0060383 A1 | 3/2007 | Dohta | |
| 2008/0030458 A1 | 2/2008 | Helbing et al. | |
| 2008/0220867 A1 | 9/2008 | Zalewski et al. | |
| 2010/0045666 A1 | 2/2010 | Kornmann et al. | |
| 2011/0021274 A1* | 1/2011 | Sato et al. ........................ | 463/31 |

(Continued)

FOREIGN PATENT DOCUMENTS

EP 2007/128949 11/2007

(Continued)

OTHER PUBLICATIONS

PersonalApplets: "Gyro Tennis App for iPhone 4 and iPod Touch $4^{th}$ gen" YouTube, Aug. 9, 2010, http://www.youtube.com/watch?v=c7PRFbqWKIs, 2 pages.

(Continued)

*Primary Examiner* — Pierre E Elisca
(74) *Attorney, Agent, or Firm* — Nixon & Vanderhye P.C.

(57) ABSTRACT

A game system includes a game device, and a hand-held device having a predetermined input surface. The hand-held device transmits operation data which includes touch data representing a player input position on the predetermined input surface and movement data whose value changes in accordance with movement of the hand-held device. The game device controls an attitude of a control surface placed in a three-dimensional game space based on the movement data. The game device calculates a control direction in the game space based on the attitude of the control surface and the touch data, and performs a game process based on the control direction. The first game image representing the game space is output to and displayed on a display device which is separate from the hand-held device.

26 Claims, 23 Drawing Sheets

U.S. PATENT DOCUMENTS

| | | | | |
|---|---|---|---|---|
| 2011/0195785 A1* | 8/2011 | Ashida et al. | ................... | 463/37 |
| 2011/0295553 A1* | 12/2011 | Sato | .............................. | 702/154 |
| 2012/0068927 A1* | 3/2012 | Poston et al. | ................. | 345/163 |
| 2012/0119992 A1* | 5/2012 | Nishida et al. | ................ | 345/158 |

FOREIGN PATENT DOCUMENTS

| | | |
|---|---|---|
| JP | 3770499 | 4/2006 |
| JP | 2007-075353 | 3/2007 |
| WO | 03/083822 | 10/2003 |
| WO | 2008/136064 | 11/2008 |
| WO | 2009/038596 | 3/2009 |

OTHER PUBLICATIONS

Jhrogersii, "Review: Gyro Tennis for iPhone", iSource, Sep. 17, 2010, http://isource.com/2010/09/17/review-gyro-tennis-for-iphone/, 10 pages.

Mar. 16, 2012 Office Action for U.S. Appl. No. 13/019,924, 14 pages.

EPO Search Report for Application No. 1177775.1, Feb. 1, 2012, 6 pages.

Apr. 26, 2012 Office Action for U.S. Appl. No. 13/019,928, 18 pages.

Apple Support: "iPhone Technical Specifications", Apple, Aug. 22, 2008, URL:http://support.apple.com/kp/SP495, 2 pages.

May 10, 2012 European Search Report for EP11739553.3, 8 pages.

* cited by examiner

GAME SYSTEM, GAME DEVICE, STORAGE MEDIUM STORING GAME PROGRAM, AND GAME PROCESS METHOD

CROSS REFERENCE TO RELATED APPLICATIONS

This application claims the benefit under 35 U.S.C. Section 119 of Japanese Patent Application No. 2010-185315 filed on Aug. 20, 2010, Japanese Patent Application No. 2011-120680 filed on May 30, 2011, and Japanese Patent Application No. 2011-126525 filed on Jun. 6, 2011. The entire contents of each of these applications are incorporated herein by reference.

BACKGROUND AND SUMMARY

The present invention relates to a game system, a game device, a storage medium storing a game program and a game process method with which it is possible to perform game operations using a pointing device.

There are conventional techniques with which a player can perform game operations using a pointing device capable of specifying a position on the input surface. For example, Japanese Laid-Open Patent Publication No 2007-75353 discloses a game system using an optical pointing device. The input device of this game system is an optical pointing device having an image-capturing mechanism and is capable of capturing an image of a marker placed at an arbitrary position. The game device obtains the image-capturing result from the image-capturing mechanism (i.e., the position of the marker in the captured image) as operation data. Since the image-capturing result varies depending on the position and the direction of the input device, the game device can calculate the pointing position (the position specified by the input device) based on the operation data. A cursor is displayed at the pointing position, and the cursor is used for the player to specify a position on the screen.

With the pointing device, it is possible to specify a position on the screen. Since the game system of Japanese Laid-Open Patent Publication No. 2007-75353 uses an optical pointing device having an image-capturing mechanism, it is possible to calculate the distance from the marker to the optical pointing device, and to identify the position with respect to the depth direction. However, it was difficult with a pointing device to specify a direction in a three-dimensional space displayed in the screen. Moreover, in a case in which a touch panel or a touch pad is sued as the pointing device, it is only possible to specify a two-dimensional position on the screen, and it is not possible to specify a direction in a three-dimensional space.

It is therefore an object of the present invention to provide a game system, a game device, a storage medium storing a game program, and a game process method, with which it is possible to easily and intuitively specify a direction in a three-dimensional space using a pointing device, specifically a touch panel, a touch pad, or the like.

The present invention employs the following configurations (1) to (14) to attain the object mentioned above.

(1)

The present invention is a game system including a game device, and a hand-held device having a predetermined input surface. The hand-held device includes a touch data output section, a movement data output section, and an operation data transmission section. The touch data output section outputs touch data representing a player input position on the predetermined input surface. The movement data output section outputs movement data whose value changes in accordance with movement of the hand-held device. The operation data transmission section transmits operation data including the touch data and the movement data to the game device. The game device includes a first receiving section, a surface control section, a direction calculation section, a game process section, a first image generation section, and a first image output section. The first receiving section receives the operation data. The surface control section controls an attitude of a control surface placed in a three-dimensional game space based on the movement data. The direction calculation section calculates a control direction in the game space based on the attitude of the control surface and the touch data. The game process section performs a game process based on the control direction. The first image generation section generates a first game image representing the game space based on a first virtual camera which is set in the game space. The first image output section outputs the first game image to a first display device which is separate from the hand-held device.

The term "game device" as used herein may be any information processing device that performs game processes, and generates images based on the game processes. That is, the game device may be a single-purpose information processing device for games, or a general-purpose information processing device such as an ordinary personal computer.

While the term "hand-held device" as used herein is a portable game device in the embodiment to be described below, it does not need to have the function of performing a game process (game program) and it does not need to have a display section. That is, it may be a hand-held device used as a game controller of the game device. A terminal device 200 of a variation to be described below may be used as the hand-held device.

The term "game system" as used herein is only required to include a game device, a controller device and a hand-held device, and it may or may not include the "predetermined first display device" for displaying the first game image. That is, the game system may be provided in a form in which the predetermined first display device is not included, or in a form in which it is included.

The term "touch data output section" as used herein refers to a touch panel in the embodiment to be described below, but it may be any section as long as it outputs touch data representing an input position on the input surface, and, may be a touch pad, for example.

The term "movement of the hand-held device" as used herein includes a change in the position of the hand-held device and a change in the attitude thereof. That is, the "movement" may mean either a change in position or a change in attitude, and may also be a change in both position and attitude. The term "movement data output section" as used herein may be any section as long as it is capable of outputting movement data based on which the movement of the hand-held device can be calculated (estimated), as well as an acceleration sensor or a gyrosensor as in the configuration (14) below or the embodiment to be described below.

The term "control surface" as used herein may be a surface whose attitude at least changes in accordance with the movement of the hand-held device, as well as a surface whose attitude changes in accordance with the attitude of the hand-held device as in the configuration (13) below or the embodiment to be described below.

The term "game process based on control direction" as used herein may be any process as long as it is a game process that uses the control direction as an input, as well as a process of determining the movement direction of an object in the game space based on the control direction as in the configuration (2) below or the embodiment to be described below.

The term "separate first display device" as used herein may be a device that is formed as an integral unit with (in the same casing as) the game device, for example, as well as a television 2 as in the embodiment to be described below.

With the configuration (1) above, the attitude of the control surface is calculated based on the movement data in accordance with the movement of the hand-held device, and the control direction in the three-dimensional game space is calculated based on the calculated attitude and the touch data. Then, the player can specify the control direction using the operation of moving the hand-held device itself and the operation of making an operation on the input surface of the hand-held device. That is, with the configuration (1) above, it is possible to easily specify a direction in a three-dimensional space using a pointing device such as a touch panel, a touch pad, or the like. Since the operation on the attitude of the hand-held device and the input operation on the input surface can be performed in parallel simultaneously, the player can quickly perform the operation of specifying a direction in a three-dimensional space.

(2)

The game process section may control a movement direction of a predetermined object in the game space based on the control direction.

The term "to control based on the control direction" as used herein means not only to use the control direction as it is as the movement direction of the object as in the first example to be described below, but also to set the movement direction in a direction different from the control direction as in the second example to be described below.

With the configuration (2) above, the movement direction of the object in the game space is determined by the control direction. Therefore, the player can easily perform an operation of moving the object in the three-dimensional game space using a pointing device such as a touch panel or a touch pad.

(3)

The direction calculation section may include a position calculation section and a direction identification section. The position calculation section calculates a control position on the control surface based on the touch data. The direction identification section identifies the control direction based on the control position.

The term "control position" as used herein may be any position that is determined based on the touch data, and it may be calculated so as to correspond to the touch position on the screen (the embodiment to be described below) or may be calculated so that the position on the screen is different from the touch position.

The term "direction identification section" as used herein may be any section which identifies the control direction based on the control position, and it may calculate the control direction so as to be parallel to the control surface as in the configuration (4) below or the first the first example to be described below, or may calculate the control direction as a direction that crosses the control surface as in the configuration (7) below or the second the second example to be described below.

With the configuration (3) above, the control position on the control surface is determined based on the touch data, and the control direction is determined based on the determined control position. Therefore, by using the control position based on the touch data, it is possible to easily identify the control direction from the attitude of the control surface and the touch data.

(4)

The position calculation section may calculate a plurality of control positions on the control surface based on touch data representing successive inputs. In this case, the direction identification section identifies, as the control direction, a direction represented by the plurality of control positions.

The term "touch data representing successive inputs" as used herein is data representing input positions which are repeatedly detected while the player is touching the input surface, and is for example data representing a plurality of input positions which are detected when an operation of drawing a line (trace) on the input surface is performed.

The term "direction represented by the plurality of control positions" as used herein may be any direction which is calculated based on a plurality of control positions as the direction of a line segment that connects together the plurality of control positions. For example, the "direction represented by the plurality of control positions" may be a direction that is represented as an average velocity of a plurality of control positions, or may be a direction that connects between predetermined two points of the plurality of control positions (e.g., the first control position and the last control position, or the last control position and the control position before the last).

With the configuration (4) above, a plurality of control positions are calculated on the control surface based on the touch data representing successive inputs, and the direction represented by a plurality of control positions on the control surface is calculated as the control direction. Therefore, for example, when a line is drawn on the input surface, a direction in accordance with the direction of the line may be identified as the control direction. Therefore, the player can specify a control direction through an operation of moving the hand-held device itself and an intuitive and easy operation of drawing a line on the input surface.

(5)

The game process section moves a predetermined object in the game space in a direction determined by the control direction in an attitude determined by the attitude of the control surface.

With the configuration (5) above, the movement direction of the object is determined by the control direction, and the attitude of the object is determined by the attitude of the control surface. Therefore, the player can operate the attitude of the object in addition to the movement direction thereof, and it is possible to control the object in a detailed manner through an easy operation.

(6)

The surface control section may control the attitude of the control surface placed in the game space based on the movement data. In this case, the game process section sets the first virtual camera so that the control surface is included in an image-capturing range.

With the configuration (6) above, the first game image is generated so as to include the range of the control surface, and the first game image is displayed on the first display device. Then, since the player can check the attitude of the control surface by looking at the first game image, it is easier to operate on the hand-held device and it is possible to improve the controllability.

(7)

The direction identification section may identify, as the control direction, a direction from a predetermined position in the game space to the control position.

The term "predetermined position" as used herein may be any position that is set in the game space, and it may for example be the position of the virtual camera, the position of the reference point Pa as in the embodiment to be described below, or the position of a particular object. Although the "predetermined position" is a position that is not on the control surface in the second example to be described below, it may be a position on the control surface. If the predetermined position is position on the control surface, the control direction is parallel to the control surface as in the configuration (4) above or the first example to be described below.

With the configuration (7) above, the direction from the predetermined position in the game space to the control position on the control surface is calculated as the control direction. Then, when a point on the input surface is touched, a direction in accordance with the touched position can be identified as the control direction, for example. Therefore, the player can specify a control direction through an operation of moving the hand-held device itself and an easy and intuitive touch operation on the input surface.

(8)

The game device may include a second image generation section and a second image output section. The second image generation section generates a second game image representing the game space based on a second virtual camera which is set in the game space. The second image output section outputs the second game image to the hand-held device. In this case, the hand-held device includes a second receiving section and a display process section. The second receiving section receives the second game image from the game device. The display process section displays the second game image on a second display device which is provided on the hand-held device.

With the configuration (8) above, the first game image is displayed on the separate first display device, and the image of the game space is also displayed on the second display device of the hand-held device. Then, the player can perform game operations while looking at two images, and the game operations are made easier.

(9)

The direction identification section may identify, as the control direction, a direction from a position of the second virtual camera to the control position.

With the configuration (9) above, since the direction from the position of the second virtual camera to the control position is the control direction, the direction from the viewpoint in the second game image to the control position determined by the touch position is the control direction. Thus, as the start point of the control direction and the viewpoint in the second game image are made to coincide with each other, it is possible to display a natural game image with which the player does not feel awkward when, for example, the object is moved in the control direction.

(10)

The game process section may move the second virtual camera in accordance with a change in the control surface so that the control surface is included in an image-capturing range of the second virtual camera.

The term "to move the second virtual camera" as used herein means to change at least one of the position and the attitude of the second virtual camera.

With the configuration (10) above, in a case in which (at least) the attitude of the control surface changes through an operation of moving the hand-held device, the second virtual camera moves in accordance with the change. Then, the content of the second game image displayed on the screen of the hand-held device changes through an operation of moving the hand-held device. Therefore, when the player changes the general direction of the control direction through an operation of moving the hand-held device, the player can perform an operation while looking at the screen of the hand-held device, and it is thus easier to perform the operation.

(11)

The touch data output section may be a touch panel including the input surface on a screen of the second display device.

With the configuration (11) above, since the touch panel is provided on the screen of the hand-held device, the player can specify a control direction through an operation of touching the screen. Therefore, it is easier to perform the touch input operation for specifying the control direction.

(12)

The game process section may set the second virtual camera so that an input position on the input surface and a control position corresponding to the input position coincide with each other on the screen of the second display device.

With the configuration (12) above, when the player touches the screen of the hand-held device, the position in the game space displayed at the touched position is calculated as the control position. Then, the touch input operation for specifying the control direction is a more intuitive operation, and it is easier to perform the touch input operation.

(13)

The game device may further include an attitude calculation section for calculating an attitude of the hand-held device based on the movement data. In this case, the surface control section controls the attitude of the control surface in accordance with the attitude of the hand-held device.

With the configuration (13) above, the player can change the attitude of the control surface by changing the attitude of the hand-held device. Then, it is possible to make the player feel as if the player were actually tilting the control surface in the game space through an operation of tilting the hand-held device.

(14)

The movement data output section may include at least one of an acceleration sensor for outputting acceleration data and a gyrosensor for outputting angular velocity data.

With the configuration (14) above, the game process section can easily calculate (estimate) the movement of the hand-held device using the detection results of the acceleration sensor or the gyrosensor.

The present invention may be carried out in the form of a game device of the configurations (1) to (14) above. The present invention may be carried out in the form of a computer-readable storage medium storing therein a game program which causes a computer of any game device to function as mechanisms equivalent to the various sections of the game devices of the configurations (1) to (14). The present invention may be carried out in the form of a game process method to be carried out in a game system of the configurations (1) to (14).

According to the present invention, it is possible to easily specify a direction in a three-dimensional space using a pointing device such as a touch panel or a touch pad by calculating the attitude of the control surface based on the movement of the hand-held device, and identifying the control direction in a three-dimensional game space based on the calculated attitude and the touch data. The direction input by the player can be recognized intuitively.

These and other features, aspects and advantages will become more apparent from the following detailed description of the present invention when taken in conjunction with the accompanying drawings.

DETAILED DESCRIPTION

1. Overall Configuration of Game System

Figure 1:
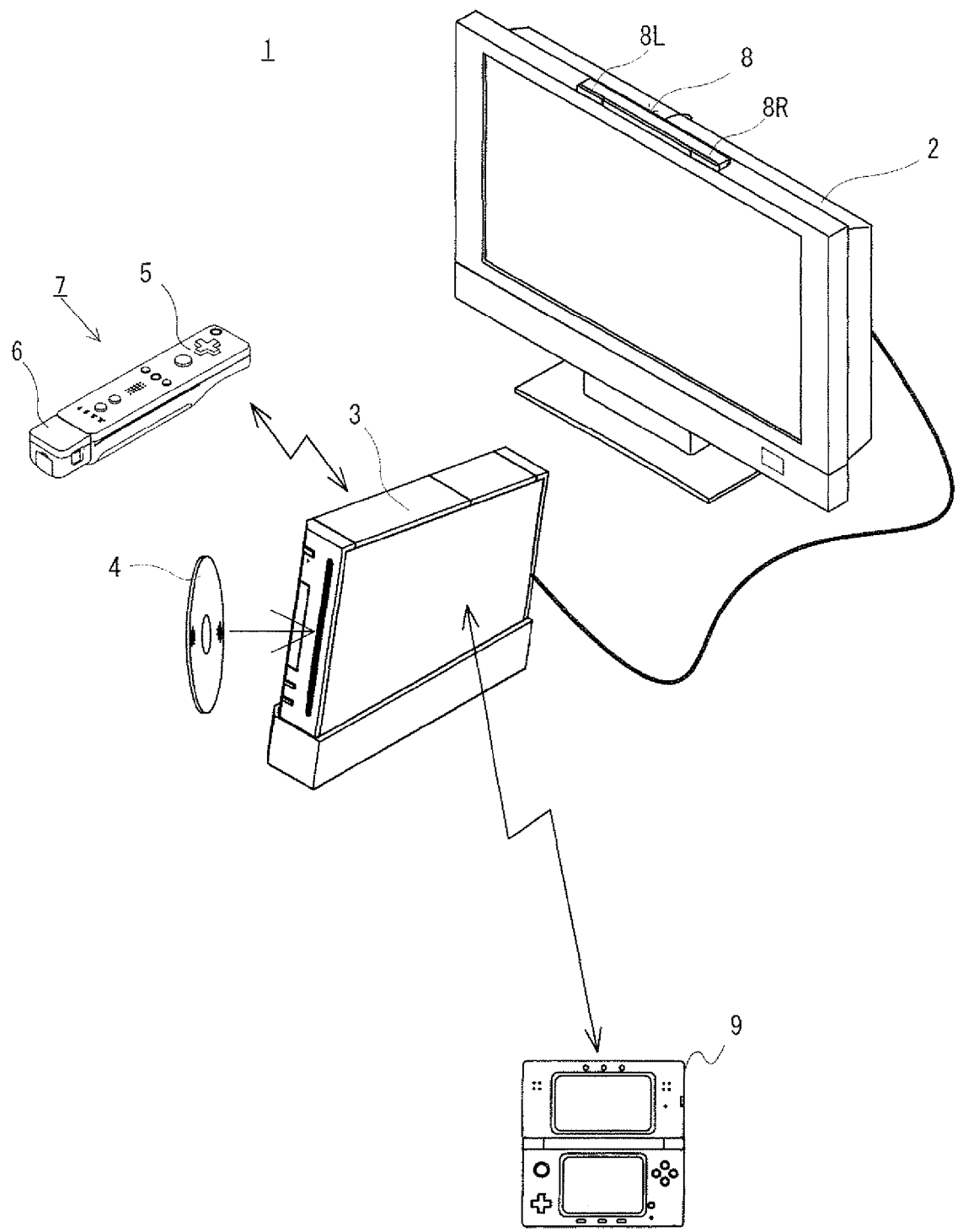
FIG. 1 is an external view of a game system.

A game system 1 according to an embodiment of the present invention will now be described with reference to the drawings. FIG. 1 is an external view of the game system 1. In FIG. 1, the game system 1 includes a display device (hereinafter referred to as a "television") 2 such as a television receiver, a game apparatus 3, an optical disc 4, an operating device 7, a marker device 8, and a hand-held device 9. In the game system 1, the game apparatus 3 performs game processes based on game operations performed using the operating device 7 and the hand-held device 9, and game images acquired through the game processes are displayed on the television 2 and/or on a display (a lower LCD 62 shown in FIG. 8) of the hand-held device 9.

In the game apparatus 3, the optical disc 4 typifying an information storage medium used for the game apparatus 3 in a replaceable manner is removably inserted. An information processing program (a game program, for example) to be executed by the game apparatus 3 is stored in the optical disc 4. The game apparatus 3 has, on the front surface thereof, an insertion opening for the optical disc 4. The game apparatus 3 reads and executes the information processing program stored on the optical disc 4 which is inserted into the insertion opening, to perform the game process.

The television 2 is connected to the game apparatus 3 by a connecting cord. Game images acquired as a result of the game processes performed by the game apparatus 3 are displayed on the television 2. The television 2 includes a speaker 2a (FIG. 2), and the speaker 2a outputs game sounds acquired as a result of the game process. In alternative embodiments, the game apparatus 3 and the display device may be an integral unit. Also, the communication between the game apparatus 3 and the television 2 may be wireless communication.

The marker device 8 is provided along the periphery of the screen (on the upper side of the screen in FIG. 1) of the television 2. The user can perform game operations by moving the operating device 7, the details of which will be described later, and the marker device 8 is used by the game apparatus 3 for detecting the movement of the operating device 7. The marker device 8 includes two markers 8R and 8L on opposite ends thereof. Specifically, the marker 8R (as well as the marker 8L) includes one or more infrared LEDs (Light Emitting Diodes), and emits an infrared light in a forward direction from the television 2. The marker device 8 is connected to the game apparatus 3, and the game apparatus 3 is able to control the lighting of each infrared LED of the marker device 8. While FIG. 1 shows an embodiment in which the marker device 8 is arranged on top of the television 2, the position and the direction of arranging the marker device 8 are not limited to this particular arrangement.

The operating device 7 provides the game apparatus 3 with operation data representing the content of operations performed on the controller itself. Hereinafter, operation data transmitted to the game apparatus 3 by the operating device 7 is referred to as "first operation data". In the present embodiment, the operating device 7 includes a controller 5 and a gyroscope unit 6. As will be described in detail below, the operating device 7 has the gyroscope unit 6 detachably connected to the controller 5. Alternatively, the controller 5 may include a gyroscope. The controller 5 and the game apparatus 3 are connected by wireless communication. In the present embodiment, the wireless communication between the operating device 7 and the game apparatus 3 uses, for example, Bluetooth (Registered Trademark) technology. In other embodiments, the operating device 7 and the game apparatus 3 may be connected by a wired connection.

In the present embodiment, the hand-held device 9 is a portable game apparatus which includes display devices (LCDs 62 and 72 to be described later) and input devices (e.g., a touch panel 63 and an acceleration sensor 89 to be described later). The hand-held device 9 can communicate with the game apparatus 3 wirelessly or wired. The hand-held device 9 receives game images and sound acquired by processing, from the game apparatus 3, and displays the game images on the display while outputting the game sound from a speaker. The hand-held device 9 transmits operation data representing the content of operations performed thereon to the game apparatus 3. Hereinafter, the operation data transmitted to the game apparatus 3 by the hand-held device 9 is referred to as the "second operation data".

While in the present embodiment, the hand-held device 9 is a portable game apparatus, in another embodiment, the hand-held device 9 may be any device (or controller) which includes a display device (s) and an input device (s) and can be held by a user. Specifically, the hand-held device 9 is not required to be provided with the function of executing any game process (or game program). Furthermore, while in the present embodiment, the hand-held device 9 is a portable game apparatus equipped with two display devices as shown in FIG. 1, the hand-held device 9 may be a portable game apparatus equipped with one display device or may be a game controller equipped with one display device.

2. Internal Configuration of the Game Apparatus 3

Figure 2:
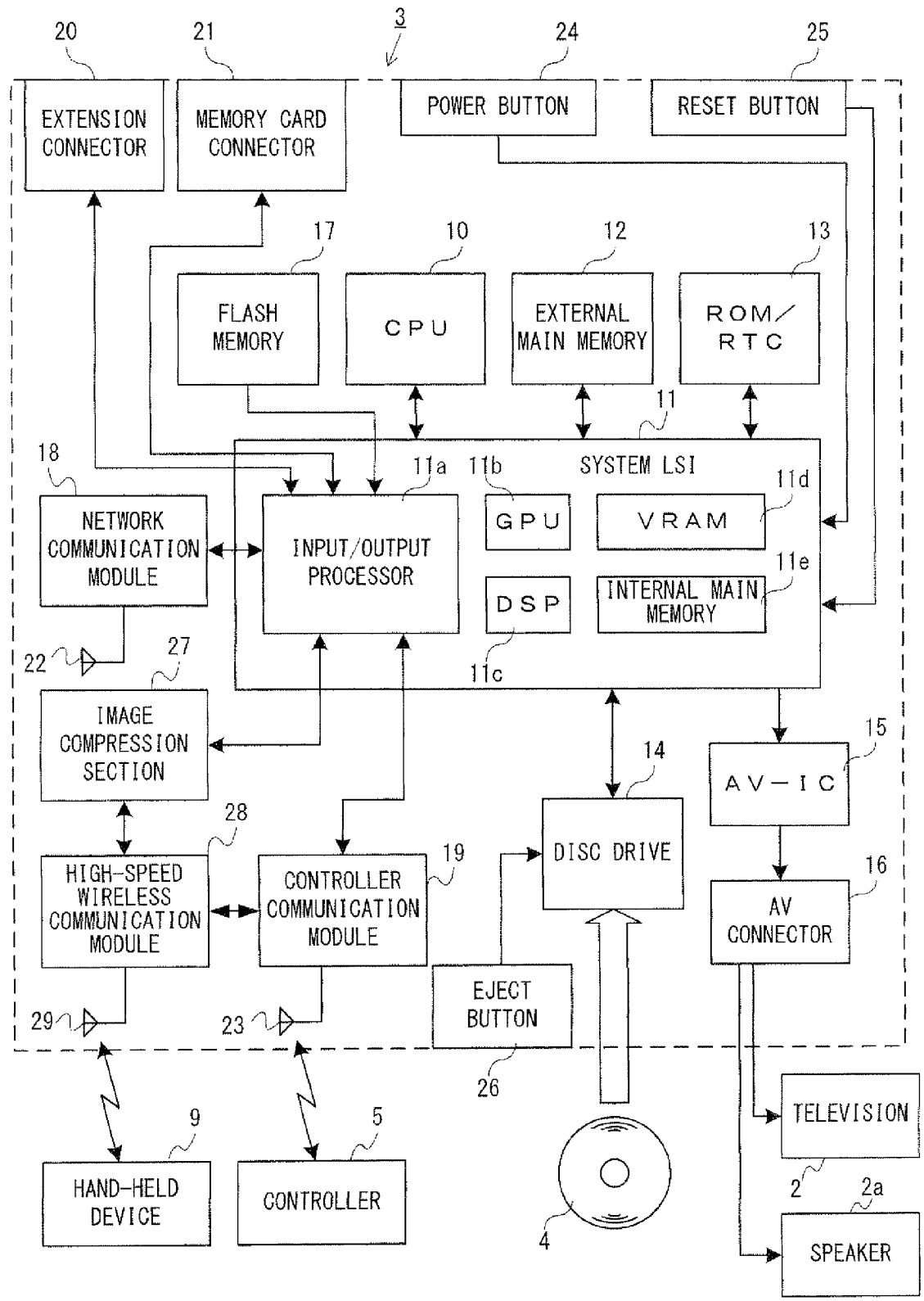
FIG. 2 is a block diagram showing an internal configuration of a game device.

An internal configuration of the game apparatus 3 will be described with reference to FIG. 2. FIG. 2 is a block diagram illustrating an internal configuration of the game apparatus 3. The game apparatus 3 includes a CPU (Central Processing Unit) 10, a system LSI 11, external main memory 12, a ROM/RTC 13, a disc drive 14, and an AV-IC 15.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, acquiring data from an external device (s), and the like. The internal configuration of the system LSI will be described below. The external main memory 12 is of a volatile type and stores a program such as a game program read from the optical disc 4, a game program read from flash memory 17, and various data. The external main memory 12 is used as a work area and a buffer area for the CPU 10. The ROM/RTC 13 includes a ROM (a so-called boot ROM) incorporating a boot program for the game apparatus 3, and a clock circuit (RTC: Real Time Clock) for counting time. The disc drive 14 reads program data, texture data, and the like from the optical disc 4, and writes the read data into internal main memory 11e (to be described below) or the external main memory 12.

The system LSI 11 includes an input/output processor (I/O processor) 11a, a GPU (Graphics Processor Unit) 11b, a DSP (Digital Signal Processor) 11c, VRAM (Video RAM) 11d, and the internal main memory 11e. Although not shown in the figures, these components 11a to 11e are connected with each other through an internal bus.

The GPU 11b, acting as a part of a rendering mechanism, generates images in accordance with graphics commands (rendering commands) from the CPU 10. The VRAM 11d stores data (data such as polygon data and texture data) necessary for the GPU 11b to execute the graphics commands. When images are generated, the GPU 11b generates image data using data stored in the VRAM 11d.

Here, in the present embodiment, the game apparatus 3 generates both game images to be displayed on the television 2 and game images to be displayed on the display devices (the lower LCD 62 and the upper LCD 72) of the hand-held device 9. Hereinafter, the game images to be displayed on the television 2 are referred to as the "first game images" and the game images to be displayed on the hand-held device 9 are referred to as the "second game images".

The DSP 11c, functioning as an audio processor, generates sound data using sound data and sound waveform (e.g., tone quality) data stored in one or both of the internal main memory 11e and the external main memory 12.

The image data (data for first game images) and sound data, which are generated as described above, are read out by the AV-IC 15. The AV-IC 15 outputs the read-out image data to the television 2 via an AV connector 16, and outputs the read-out sound data to the speaker 2a provided in the television 2. Thus, images are displayed on the television 2, and sounds are outputted from the speaker 2a.

The input/output processor 11a exchanges data with components connected thereto, and downloads data from an external device(s). The input/output processor 11a is connected to the flash memory 17, a network communication module 18, a controller communication module 19, an expansion connector 20, a memory card connector 21, and an image compression section 27. An antenna 22 is connected to the network communication module 18. An antenna 23 is connected to the controller communication module 19. The image compression section 27 is connected to a high-speed wireless communication module 28, and an antenna 29 is connected to the high-speed wireless communication module 28. The controller communication module 19 is connected to the high-speed wireless communication module 28.

The input/output processor 11a can be connected to a network such as the Internet via the network communication module 18 and the antenna 22 to communicate with other game devices and servers connected to the network. The input/output processor 11a regularly accesses the flash memory 17, and detects the presence or absence of any data which needs to be transmitted to the network, and when detected, transmits the data to the network via the network communication module 18 and the antenna 22. Further, the input/output processor 11a receives data transmitted from another game device and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game apparatus 3 in addition to data exchanged between the game apparatus 3 and other game apparatus or servers.

The input/output processor 11a receives first operation data transmitted from the operating device 7 via the antenna 23 and the controller communication module 19, and stores it (temporarily) in a buffer area of the internal main memory 11e or the external main memory 12. Also, the input/output processor 11a receives second operation data, which is transmitted from the hand-held device 9, via the antenna 29, the high-speed wireless communication module 28, and the controller communication module 19, and stores it (temporarily) in the buffer area of the internal main memory 11e or the external main memory 12.

When transmitting game images (second game images) to the hand-held device 9, the input/output processor 11a outputs game image data generated by the GPU 11b to the image compression section 27. The image compression section 27 performs a predetermined compression process on the image data from the input/output processor 11a. The high-speed wireless communication module 28 wirelessly communicates with the hand-held device 9. Accordingly, the image data compressed by the image compression section 27 is transmitted by the high-speed wireless communication module 28 to the hand-held device 9 via the antenna 29. In the present embodiment, the image data transmitted from the game apparatus 3 to the hand-held device 9 is image data used in a game, and the playability of a game can be adversely influenced if there is a delay in the images displayed in the game. Therefore, it is preferred to eliminate delay as much as possible for the transmission of image data from the game apparatus 3 to the hand-held device 9. Therefore, in the present embodiment, the image compression section 27 compresses image data using a compression technique with high efficiency such as the H.264 standard, for example. Other compression techniques may be used, and image data may be transmitted uncompressed if the communication speed is sufficient. The high-speed wireless communication module 28 is, for example, a Wi-Fi certified communication module, and may perform wireless communication at high speed with the hand-held device 9 using a MIMO (Multiple Input Multiple Output) technique employed in the IEEE 802.11n standard, for example, or may use other communication schemes.

While the above description focuses on the image data transmitted from the game apparatus 3 to the hand-held device 9, in the present embodiment, sound data is also transmitted together with the image data. Specifically, the input/output processor 11a outputs sound data generated by the DSP 11c to the high-speed wireless communication module 28 via the image compression section 27. The high-speed wireless communication module 28 transmits the sound data, along with the image data, to the hand-held device 9 via the antenna 29. Note that the image compression section 27 may or may not perform a compression process on the sound data.

Also, when the hand-held device 9 transmits data (specifically, second operation data) to the game apparatus 3, the high-speed wireless communication module 28 receives the data via the antenna 29. The received data is acquired by the input/output processor 11a. Note that in the present embodiment, any data from the hand-held device 9 to the game apparatus 3 is not subjected to a compression process, and the data is not subjected to a decompression process, but in another embodiment, such data may be subjected to a compression process in the hand-held device 9 and a decompression process in the game apparatus 3.

The input/output processor 11a is connected to the expansion connector 20 and the memory card connector 21. The expansion connector 20 is a connector for an interface, such as a USB or SCSI interface. The expansion connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card. For example, the input/output processor 11a can access an external storage medium via the expansion connector 20 or the memory card connector 21 to save data in the external storage medium or read data from the external storage medium.

The game apparatus 3 includes a power button 24, a reset button 25, and an eject button 26. The power button 24 and the reset button 25 are connected to the system LSI 11. When the power button 24 is on, power is supplied to the components of the game apparatus 3 through en AC adaptor not shown). When the reset button 25 is pressed, the system LSI 11 reboots a boot program of the game apparatus 3. The eject button 26 is connected to the disc drive 14. When the eject button 26 is pressed, the optical disc 4 is ejected from the disc drive 14.

In other embodiments, some of the components of the game apparatus 3 may be provided as extension devices separate from the game apparatus 3. In this case, an extension device may be connected to the game apparatus 3 via the expansion connector 20, for example. Specifically, an extension device may include components of the image compression section 27, the high-speed wireless communication module 28 and the antenna 29, for example, and can be attached/detached to/from the expansion connector 20. Thus, by connecting the extension device to a game apparatus which does not include the above components, the game apparatus can communicate with the hand-held device 9.

3. Configuration of Operating Device 7

Figure 3:
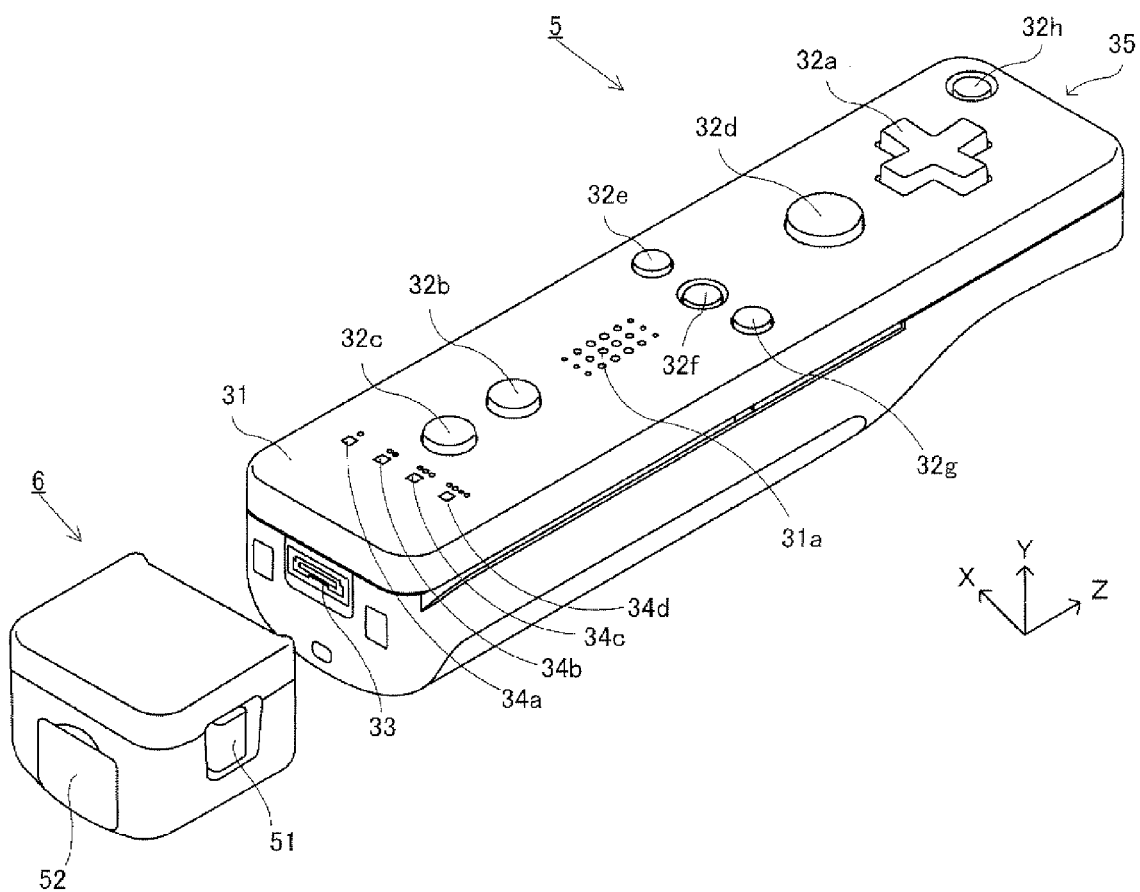
FIG. 3 is a perspective view showing an external configuration of a controller device.
Figure 4:
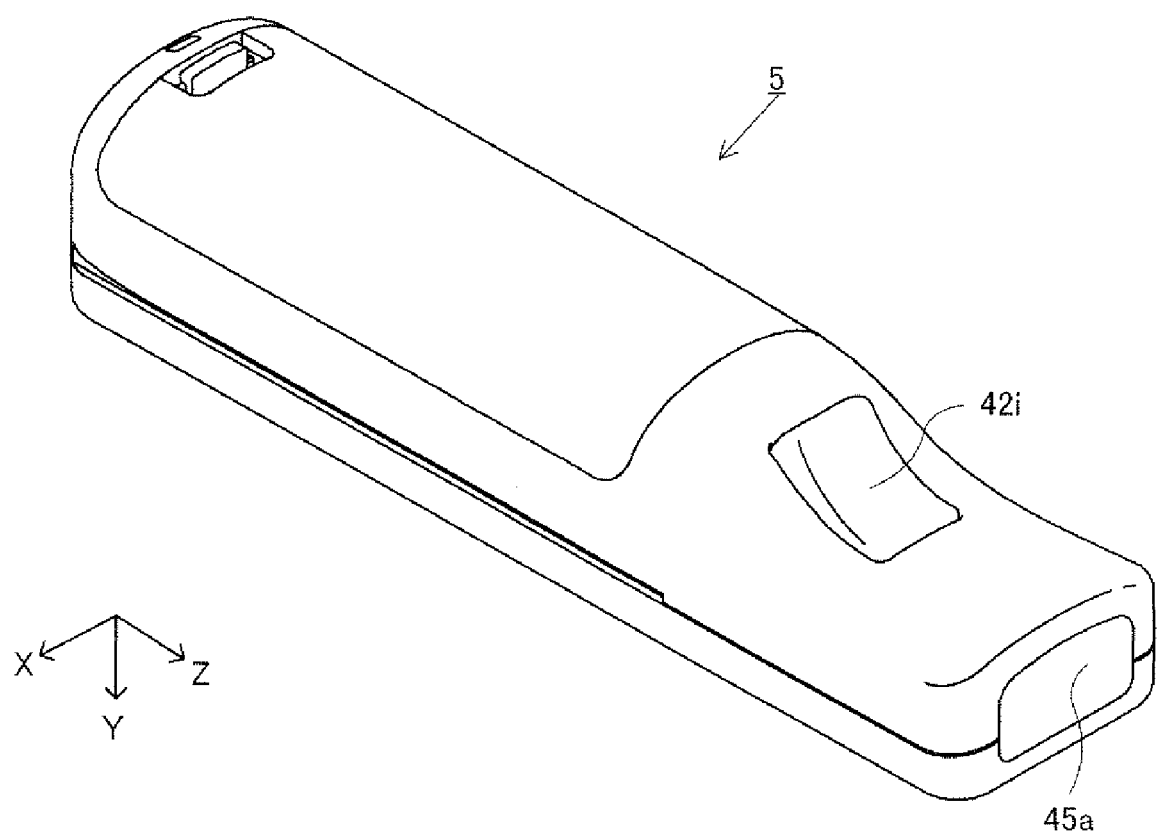
FIG. 4 is a perspective view showing an external configuration of a controller.

Next, with reference to FIGS. 3 to 7, the operating device 7 (the controller 5 and the gyroscope unit 6) will be described. FIG. 3 is a perspective view illustrating an external configuration of the operating device 7. FIG. 4 is a perspective view illustrating an external configuration of the controller 5. The perspective view of FIG. 3 shows the operating device 7 as viewed from the top rear side thereof, and the perspective view of FIG. 4 shows the controller 5 as viewed from the bottom front side thereof.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. A player can perform game operations by pressing buttons provided on the controller 5, and moving the controller 5 to change the position and the attitude (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present invention, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are assigned, as necessary, their respective functions in accordance with the information processing program executed by the game apparatus 3. Further, the power button 32h is intended to remotely turn ON/OFF the game apparatus 3. The home button 32f and the power button 32h each have the top surface thereof recessed below the top surface of the housing 31. Therefore, the home button 32f and the power button 32h are prevented from being inadvertently pressed by the player.

On the rear surface of the housing 31, the connector 33 is provided. The connector 33 is used for connecting the controller 5 to another device (for example, the gyroscope unit 6 or another controller). Both sides of the connector 33 on the rear surface of the housing 31 have a fastening hole 33a for preventing easy inadvertent disengagement of another device as described above.

In the rear-side portion of the top surface of the housing 31, a plurality (four in FIG. 3) of LEDs 34a, 34b, 34c, and 34d are provided. The controller 5 is assigned a controller type (number) so as to be distinguishable from another main controller. The LEDs 34a, 34b, 34c, and 34d are each used for informing the player of the controller type which is currently being set for the controller 5 being used, and for informing the player of remaining battery power of the controller 5, for example.

Specifically, when a game operation is performed using the controller 5, one of the LEDs 34a, 34b, 34c, and 34d corresponding to the controller type is lit up.

The controller 5 has an imaging information calculation section 35 (FIG. 6), and a light incident surface 35a through which a light is incident on the imaging information calculation section 35 is provided on the front surface of the housing 31, as shown in FIG. 4. The light incident surface 35a is made of a material transmitting therethrough at least infrared light outputted from the markers 8R and 8L.

On the top surface of the housing 31, sound holes 31a for externally outputting a sound from a speaker 49 (shown in FIG. 5) incorporated in the controller 5 is provided between the first button 32b and the home button 32f.

Figure 5:
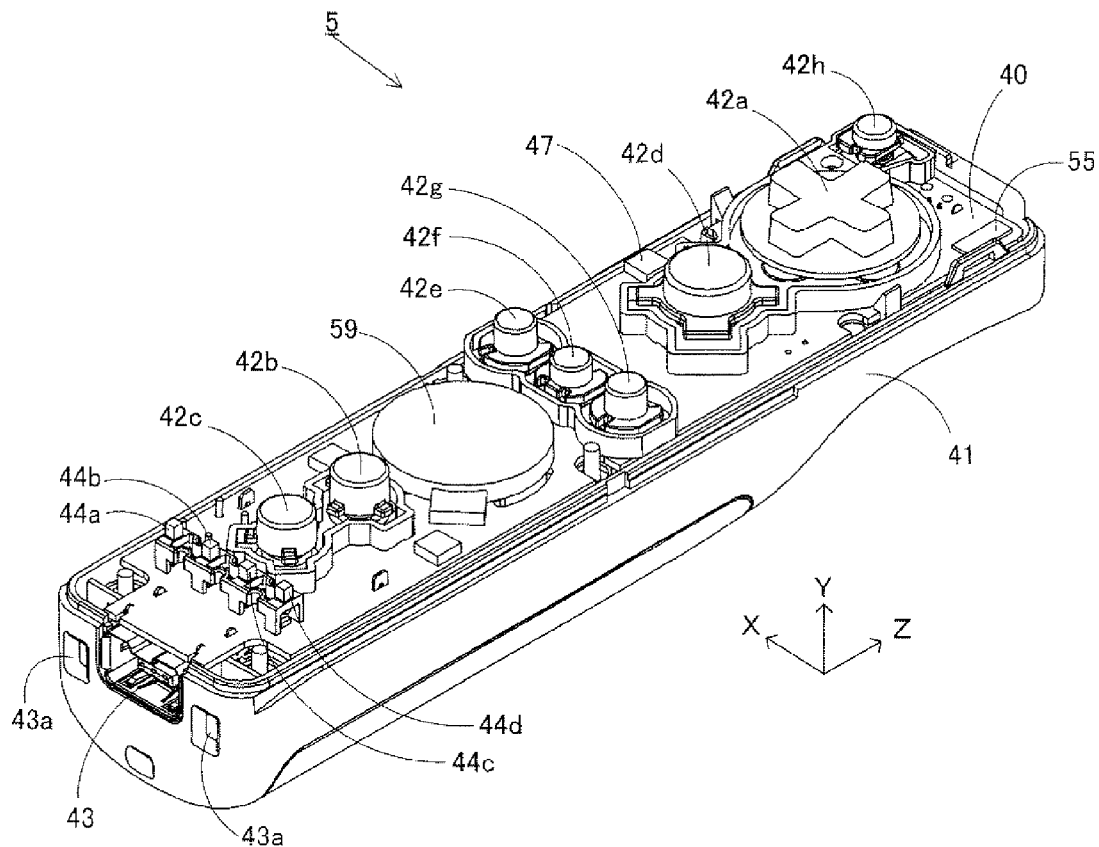
FIG. 5 is a diagram showing an internal configuration of a controller.
Figure 6:
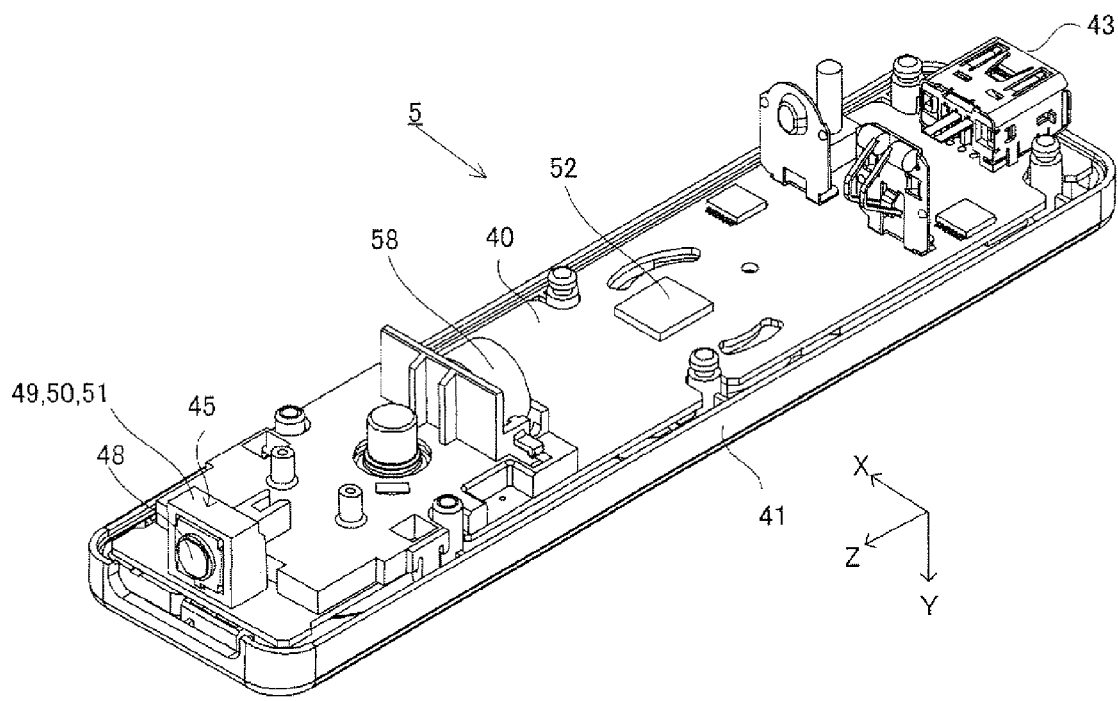
FIG. 6 is a diagram showing an internal configuration of a controller.

Next, with reference to FIGS. 5 and 6, an internal configuration of the controller 5 will be described. FIG. 5 and FIG. 6 are diagrams illustrating the internal configuration of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided on a position offset from the center of the controller 5 with respect to the X-axis direction. Thus, calculation of the movement of the controller 5 being rotated about the Z-axis may be facilitated. Further, the acceleration sensor 37 is provided anterior to the center of the controller 5 with respect to the longitudinal direction Z-axis direction). Further, a wireless module 44 (FIG. 6) and the antenna 45 allow the controller 5 to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, an image-capturing element 40 and an image processing circuit 41 located in order, respectively, from the front of the controller 5. These components 38 to 41 are attached on the bottom main surface of the substrate 30.

On the bottom main surface of the substrate 30, the microcomputer 42 and a vibrator 48 are provided. The vibrator 48 is, for example, a vibration motor or a solenoid, and is connected to the microcomputer 42 via lines formed on the substrate 30 or the like. The controller 5 is vibrated by actuation of the vibrator 48 based or a command from the microcomputer 42. Therefore, the vibration is conveyed to the player's hand holding the controller 5, and thus a so-called vibration-feedback game is realized. In the present embodiment, the vibrator 48 is disposed slightly toward the front of the housing 31. That is, the vibrator 48 is positioned offset from the center toward the end of the controller 5, and therefore the vibration of the vibrator 48 can lead to enhancement of the vibration of the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

Further, the gyroscope unit 6 includes gyroscopes (gyroscopes 55 and 56 shown in FIG. 7) for detecting angular velocities about three axes, respectively. The gyroscope unit 6 is detachably attached to the connector 33 of the controller 5. The gyroscope unit 6 has, at the front edge (an edge portion oriented to the Z-axis positive direction shown in FIG. 3), a plug (a plug 53 shown in FIG. 7) connectable to the connector 33. Further, the plug 53 has hooks (not shown) on both sides, respectively. In a state where the gyroscope unit 6 is attached to the controller 5, the plug 53 is connected to the connector 33, and the hooks engage with the fastening holes 33a, respectively, of the controller 5. Therefore, the controller 5 and the gyroscope unit 6 are securely fixed to each other. Further, the gyroscope unit 6 has a button 51 on each side surface (surfaces oriented to the X-axis direction shown in FIG. 3). When the button 51 is pressed, the hook is disengaged from the fastening hole 33a. Therefore, when the plug 53 is removed from the connector 33 while the button 51 is being pressed, the gyroscope unit 6 can be disconnected from the controller 5.

Further, a connector having the same shape as the connector 33 is provided at the rear edge of the gyroscope unit 6. Therefore, another device which can be attached to (the connector 33 of) the controller 5 can be attached as well to the connector of the gyroscope unit 6. In FIG. 3, a cover 52 is detachably provided over the connector.

FIGS. 3 to 6 show only examples of the shape of the controller 5 and the gyroscope unit 6, the shape of each operation button, the number and the positions of acceleration sensors and vibrators, and so on. The present invention can be realized with other shapes, numbers, and positions. Further, although in the present embodiment the imaging direction of the image-capturing means is the Z-axis positive direction, the imaging direction may be any direction. That is, the imagining information calculation section 35 (the light incident surface 35a through which a light is incident on the imaging information calculation section 35) of the controller 5 may not necessarily be provided on the front surface of the housing 31, but may be provided on any other surface on which a light can be received from the outside of the housing 31.

Figure 7:
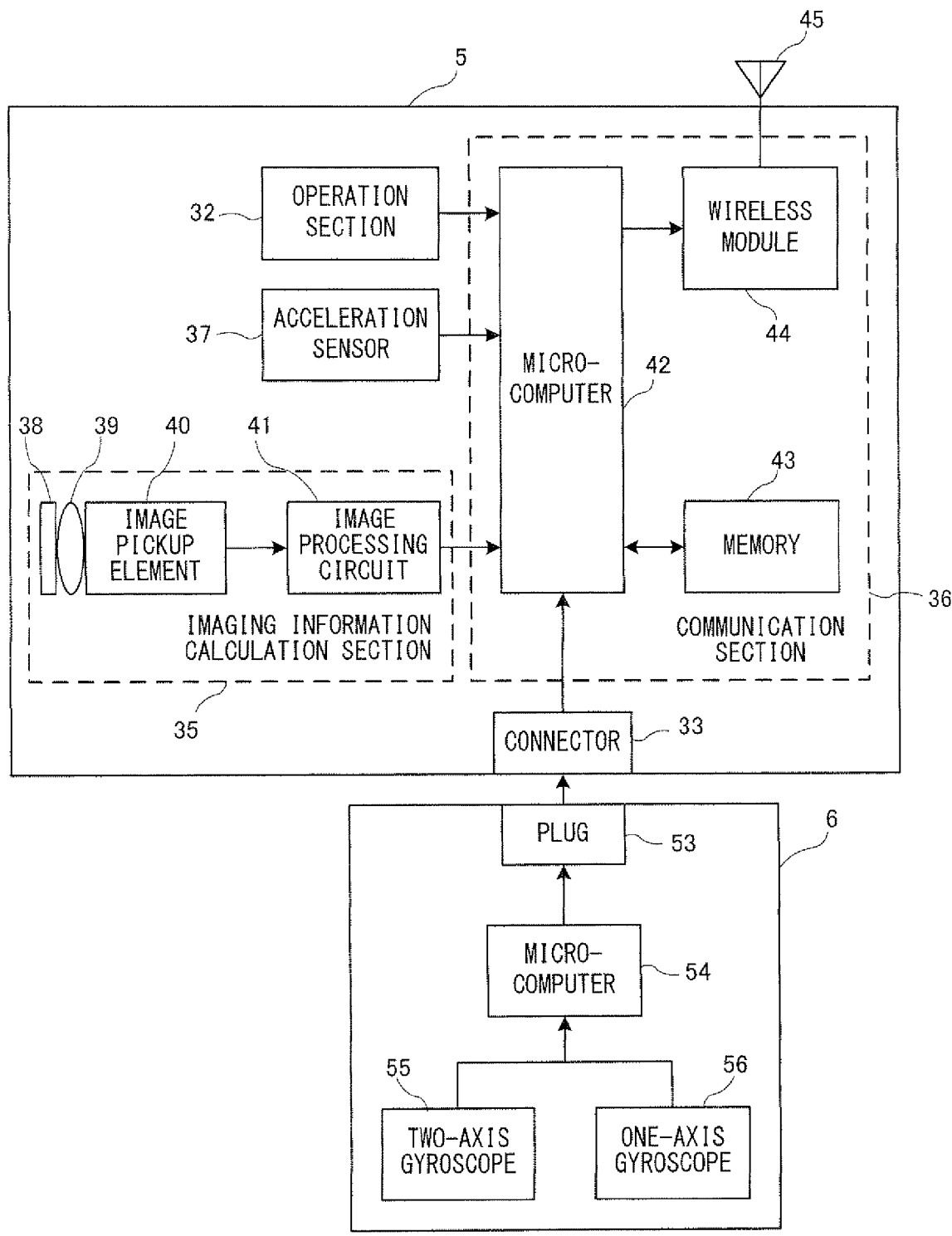
FIG. 7 is a block diagram showing a configuration of a controller device.

FIG. 7 is a block diagram illustrating a configuration of the operating device 7 (the controller 5 and the gyroscope unit 6). The controller 5 includes an operating section 32 (the operation buttons 32a to 32i) the connector 33, the imaging information calculation section 35, a communication section 36, and the acceleration sensor 37. The controller 5 transmits, as first operation data, data representing the content of an operation performed on the controller 5 itself, to the game apparatus 3.

The operating section 32 includes the operation buttons 32a to 32i described above, and outputs, to the microcomputer 42 of the communication section 36, operation button data indicating an input state (that is, whether or not each operation button 32a to 32i is pressed) of each operation button 32a to 32i.

The imaging information calculation section 35 is a system for analyzing image data taken by the image-capturing means and calculating, for example, the centroid and the size of an area having a high brightness in the image data. The imaging information calculation section 35 has a maximum sampling period of for example, about 200 frames/sec., and therefore can trace and analyze even a relatively fast motion of the controller 5.

The imaging information calculation section 35 includes the infrared filter 38, the lens 39, the image-capturing element 40 and the image processing circuit 41. The infrared filter 38 transmits therethrough, only infrared light included in the light incident on the front surface of the controller 5. The lens 39 collects the infrared light transmitted through the infrared filter 38 so as to be incident on the image-capturing element 40. The image-capturing element 40 is a solid-state imaging device such as, for example, a CMOS sensor or a CCD sensor, which receives the infrared light collected by the lens 39, and outputs an image signal. The markers 8R and 8L of the marker device 8 provided near the display screen of the television 2 each include an infrared LED for outputting an infrared light forward from the television 2. Therefore, the infrared filter 38 enables the image-capturing element 40 to receive only the infrared light transmitted through the infrared filter 38 and generate image data, so that an image of each of the markers 8R and 8L can be taken with enhanced accuracy. Hereinafter, the image taken by the image-capturing element 40 is referred to as a pickup image. The image data generated by the image-capturing element 40 is processed by the image processing circuit 41. The image processing circuit 41 calculates, in the pickup image, the positions of subjects to be imaged (the markers 8R and 8L). The image processing circuit 41 outputs data representing coordinate points of the calculated positions, to the microcomputer 42 of the communication section 36. The data representing the coordinate points is transmitted as first operation data to the game apparatus 3 by the microcomputer 42. Hereinafter, the coordinate points are referred to as "marker coordinate points". The marker coordinate point changes depending on the orientation (angle of tilt) and/or the position of the controller 5 itself, and therefore the game apparatus 3 is allowed to calculate the orientation and the position of the controller 5 using the marker coordinate point.

In another embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection section of the acceleration sensor 37 in the straight line direction along the sensing axis direction, among all accelerations applied to a detection section of the acceleration sensor 37. For example, a multiaxial acceleration sensor having two or more axes detects an acceleration of a component for each axis, as the acceleration applied to the detection section of the acceleration sensor. For example, the three-axis or two-axis acceleration sensor may be of the type available from Analog Devices, Inc. or STMicroelectronics N.V. The acceleration sensor 37 is, for example, an electrostatic capacitance type acceleration sensor. However, another type of acceleration sensor may be used.

In the present embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 represents a value of the linear acceleration for each of the three axes. In other words, the detected acceleration is represented as a three-dimensional vector in an XYZ-coordinate system (controller coordinate system) defined relative to the operating device 7 (the controller 5).

Data (acceleration data) representing the acceleration detected by the acceleration sensor 37 is outputted to the communication section 36. The acceleration detected by the acceleration sensor 37 changes depending on the orientation (angle of tilt) and the movement of the controller 5, and therefore the game apparatus 3 is allowed to calculate the orientation and the movement of the controller 5 using the acquired acceleration data. In the present embodiment, the game apparatus 3 calculates the attitude, angle of tilt, etc., of the controller 5 based on the acquired acceleration data.

When a computer such as a processor (e.g., the CPU 10) of the game apparatus 3 or a processor (e.g., the microcomputer 42) of the controller 5 processes an acceleration signal outputted from the acceleration sensor 37 (or similarly from an acceleration sensor 89 to be described later), additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the angle of tilt. Thus, the acceleration sensor 37 is used in combination, with the processor, making it possible to determine the angle of tilt or the attitude of the controller 5.

On the other hand, when it is premised that the controller 5 is in dynamic state (where the controller 5 is being moved), the acceleration sensor 37 detects the acceleration based on the movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on the movement of the acceleration sensor is eliminated from the detected acceleration through a predetermined process, whereby it is possible to determine the tilt of the controller 5 relative to the direction of gravity. In another embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (for example, gravitational acceleration), the embedded or dedicated processor could convert the acceleration signal to a corresponding angle of tilt (or another preferable parameter).

The communication section 36 includes the microcomputer 42, memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process. Further, the microcomputer 42 is connected to the connector 33. Data transmitted from the gyroscope unit 6 is inputted to the microcomputer 42 through the connector 33. Hereinafter, a configuration of the gyroscope unit 6 will be described.

The gyroscope unit 6 includes the plug 53, a microcomputer 54, the two-axis gyroscope 55, and the one-axis gyroscope 56. As described above, the gyroscope unit 6 detects angular velocities about three axes (X-, Y-, and Z-axes in the present embodiment), respectively, and transmits data (angular velocity data) representing the detected angular velocities, to the controller 5.

The two-axis gyroscope 55 detects an angular velocity (per unit time) about each of the X-axis and the Z-axis. Further, the one-axis gyroscope 56 detects an angular velocity (per unit time) about the Y-axis. In the present invention, the directions of rotation about the X-axis, the Y-axis, and the Z-axis relative to the imaging direction (the Z-axis positive direction) of the controller 5 are referred to as a pitch direction, a yaw direction, and a roll direction, respectively. That is, the two-axis gyroscope 55 detects angular velocities in the pitch direction (the direction of rotation about the X-axis) and the roll direction (the direction of rotation about the Z-axis), and the one-axis gyroscope 56 detects an angular velocity in the yaw direction (the direction of rotation about the Y-axis).

In the present embodiment, the two-axis gyroscope 55 and the one-axis gyroscope 56 are used to detect the angular velocities about the three axes. However, in another embodiment, the number of gyroscopes and a combination thereof to be used may be optionally selected, provided that the angular velocities about the three axes can be detected.

Data representing the angular velocities detected by the gyroscopes 56 and 57 are outputted to the microcomputer 54. That is, data representing the angular velocities about the three axes, i.e., the X-, Y-, and Z-axes, are inputted to the microcomputer 54. The microcomputer 54 transmits the data representing the angular velocities about the three axes, as angular velocity data, to the controller 5 through the plug 53. The transmission from the microcomputer 54 to the controller 5 is sequentially performed at a predetermined cycle, and the game is typically processed at a cycle of 1/60 seconds (corresponding to one frame time), and the transmission is preferably performed at a cycle shorter than a cycle of 1/60 seconds.

The controller 5 will be described again. Data outputted from the operating section 32, the imaging information calculation section 35, and the acceleration sensor 37 to the microcomputer 42, and data transmitted from the gyroscope unit 6 to the microcomputer 42 are temporarily stored to the memory 43. The data are transmitted as the first operation data to the game apparatus 3. At the time of the transmission to the controller communication module 19 of the game apparatus 3, the microcomputer 42 outputs the operation data stored in the memory 43 to the wireless module 44 as the first operation data. The wireless module 44 uses, for example, the Bluetooth (registered trademark) technology to modulate the first operation data onto a carrier wave of a predetermined frequency, and radiates the low power radio wave signal from the antenna 45. That is, the first operation data is modulated onto the low power radio wave signal by the wireless module 44 and transmitted from the controller 5. The controller communication module 19 of the game apparatus 3 receives the low power radio wave signal. The game apparatus 3 demodulates or decodes the received low power radio wave signal to acquire the first operation data. Based on the first operation data acquired from the operating device 7, the second operation data acquired from the hand-held device 9, and the game program, the CPU 10 of the game apparatus 3 performs the game process. The wireless transmission from the communication section 36 to the controller communication module 19 is sequentially performed at a predetermined time interval. Since the game process is generally performed at a cycle of 1/60 sec. (corresponding to one frame time), data is preferably transmitted at a cycle of a shorter time period. The communication section 36 of the controller 5 outputs, to the controller communication module 19 of the game apparatus 3, the first operation data at intervals of 1/200 seconds, for example.

As described above, the operating device 7 can transmit marker coordinate data, acceleration data, angular velocity data, and operation button data as first operation data representing operations performed thereon. In addition, the game apparatus 3 executes the game process using the first operation data as game inputs. Accordingly, by using the operating device 7, the player can perform the game operation of moving the operating device 7 itself, in addition to conventionally general game operations of pressing operation buttons. For example, it is possible to perform the operations of tilting the operating device 7 to arbitrary attitudes, pointing the operating device 7 to arbitrary positions on the screen, and moving the operating device 7 itself.

Also, in the present embodiment, the operating device 7 is not provided with any display means for displaying game images, but the operating device 7 may be provided with a display means for displaying an image or suchlike to indicate, for example, a remaining battery level.

4. External Configuration of Hand-Held Device 9

Figure 8:
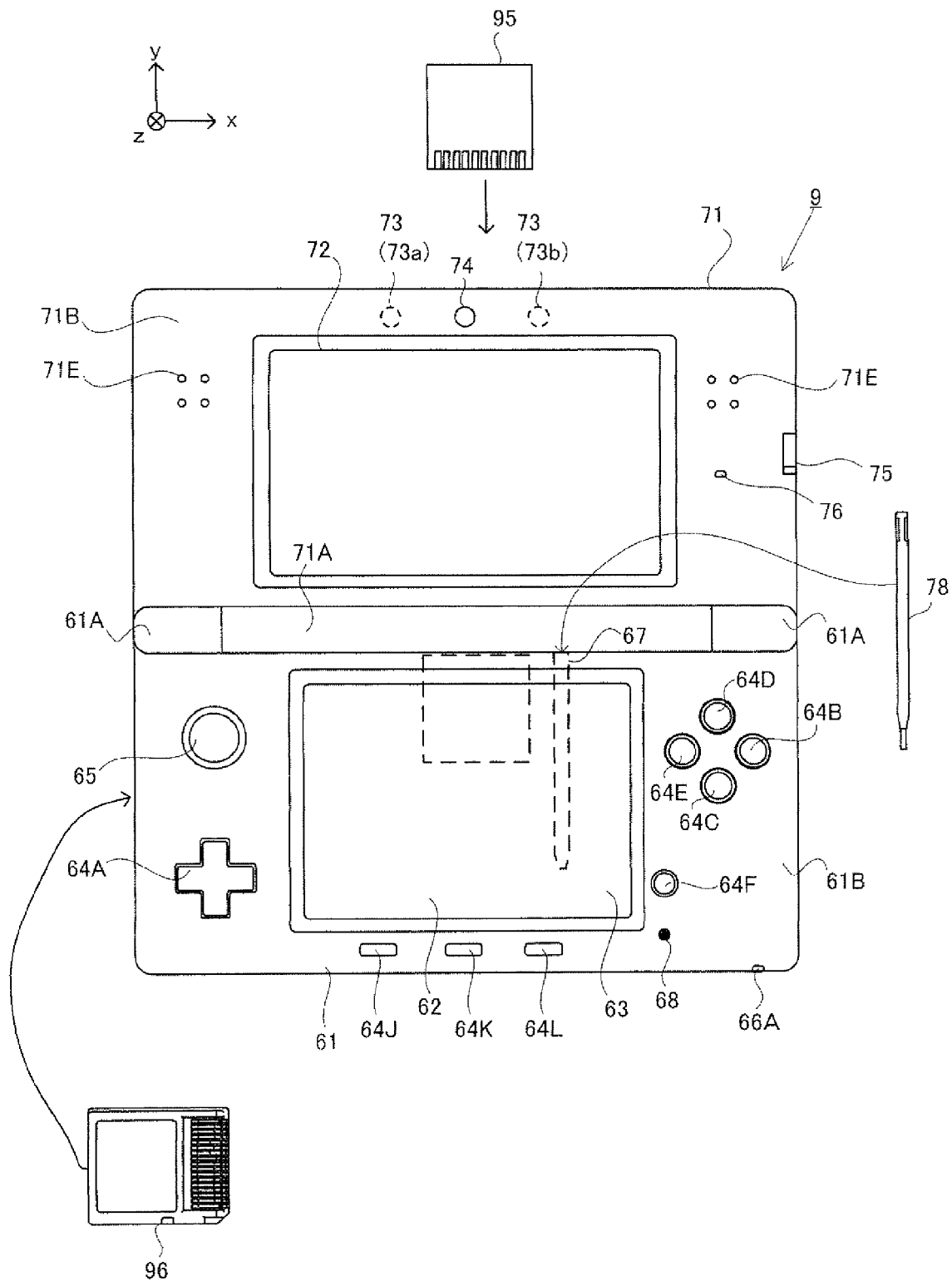
FIG. 8 is a diagram showing an external configuration of a hand-held device.

FIG. 8 is a diagram illustrating an external configuration of the hand-held device 9. As shown in FIG. 8, the hand-held device 9 includes a lower housing 61 and an upper housing 71. The lower housing 61 and the upper housing 71 are connected together so that they can be opened/closed (folded). In the present embodiment, the housings 61 and 71 each have a landscape-oriented rectangular plate shape and are pivotally connected together along their long-side portions. Specifically, the lower housing 61 and the upper housing 71 are connected in a foldable manner by coupling the protruding portion 61A of the lower housing 61 with the protruding portion 71A of the upper housing 71.

(Description of Lower Housing)

First, a configuration of the lower housing 61 will be described. As shown in FIG. 8, a lower LCD (Liquid Crystal Display) 62, a touch panel 63, operation buttons 64A to 64L, an analog stick 65, LEDs 66A to 66B, an insertion hole 67, and a microphone hole 68 are provided in the lower housing 61. Hereinafter, these components will be described in detail.

The lower LCD 62 is accommodated in the lower housing 61. In the present embodiment, the number of pixels of the lower LCD 62 is, for example, 256 dots×192 dots (horizontal×vertical), but a display device with any resolution can be used as the lower LCD 62. Furthermore, in the present embodiment, an LCD is used as the display device, but any other display device may be used such as a display device using EL (Electra Luminescence), for example.

The touch panel 63 is mounted on the screen of the lower LCD 62. Note that in the present embodiment, the touch panel 63 is a resistive film type touch panel. However, the touch panel is not limited to the resistive film type and can be a touch panel of any type such as, for example, the electrostatic capacitance type. Furthermore, the touch panel 63 may be either a single-touch panel or a multi-touch panel. In the present embodiment, a touch panel having the same resolution (detection precision) as the resolution of the lower LCD 62 is used as the touch panel 63. Note however that it is not always necessary that the resolution of the touch panel 63 and the resolution of the lower LCD 62 coincide with each other. The insertion hole 67 (a dotted line shown in FIG. 8) is provided on the upper-side surface of the lower housing 61. The insertion hole 67 can accommodate a stylus 78 which is used for performing operations on the touch panel 63. Note that although an input on the touch panel 63 is usually made by using the stylus 78, the present invention is not limited to the stylus 78 and a finger of the user may be used for making an input on the touch panel 63.

The operation buttons 64A to 64L are each an input device for making a predetermined input. As shown in FIG. 8, among the operation buttons 64A to 64L, a cross button 64A (a direction input button 64A), a button 64B, a button 640, a button 64D, a button 64E, a power button 64F, a select button 64J, a HOME button 64K, and a start button 64L are provided on the inner-side surface (main surface) of the lower housing 61. The cross button 64A is cross-shaped, and includes buttons for specifying up, down, left and right directions. The buttons 64A to 64E, the select button 64J, the HOME button 64K, and the start button 64L are assigned functions in accordance with a game program, as necessary. For example, the cross button 64A is used for selection operation, and the like, and the operation buttons 64B to 64E are used for determination operation, cancellation operation, etc. The power button 64F is used for turning ON/OFF the power of the hand-held device 9.

Although not shown, L and R buttons are provided on the upper-side surface of the lower housing 61. The L button is provided on the left end portion of the upper surface of the lower housing 61, and the R button is provided on the right end portion of the upper surface of the lower housing 61. Although not shown, a sound volume button is provided on the left-side surface of the lower housing 61. The sound volume button is used for adjusting the sound volume of a speaker of the hand-held device 9.

An analog stick 65 is a device for directing a course, provided on the inner-side surface of the lower housing 61. As shown in FIG. 8, the analog stick 65 is provided above the cross button 64A. The analog stick 65 is configured such that its stick portion can tilt in an arbitrary direction (at an arbitrary angle in any of the up, down, left and right directions) with respect to the inner-side surface of the lower housing 61 when it is operated with a thumb and/or a finger.

Also, a cover portion which can be opened/closed is provided on the left-side surface of the lower housing 61. A connector (not shown) for electrically connecting the hand-held device 9 and external data storage memory 96 with each other is provided inside the cover portion. The external data storage memory 96 is detachably connected to the connector. The external data storage memory 96 is used for, for example, storing (saving) data for an image captured by the hand-held device 9.

Also, a cover portion which can be opened/closed is provided on the upper-side surface of the lower housing 61. A connector (not shown) for electrically and detachably connecting the hand-held device 9 and external memory 95 having a game program recorded therein is provided inside the cover portion. A predetermined game program is executed as the external memory 95 is connected to the hand-held device 9.

As shown in FIG. 8, a first LED 66A for notifying the user of the ON/OFF status of the power supply of the hand-held device 9 is provided on the lower-side surface of the lower housing 61. Also, a second LED for notifying the user of the wireless communication establishment status of the hand-held device 9 is provided on the right-side surface of the lower housing 61. The hand-held device 9 can wirelessly communicate with other devices, and the second LED is lit while the wireless communication is maintained. The hand-held device 9 has a function of connecting to a wireless LAN by a scheme based on the IEEE 802.11n standard, for example. A wireless switch for enabling/disabling the wireless communication function is provided on the right-side surface of the lower housing 61.

The microphone hole 68 is provided on the inner-side surface of the lower housing 61. A microphone (see FIG. 9) as a sound input device to be described later is provided under the microphone hole 68, and the microphone detects sound from the outside of the hand-held device 9.

Note that although not shown, the lower housing 61 accommodates a rechargeable battery serving as the power supply of the hand-held device 9, and the battery can be charged through a terminal provided on a side surface (e.g., the upper-side surface) of the lower housing 61.

(Description of Upper Housing)

Next, a configuration of the upper housing 71 will be described. As shown in FIG. 8, the upper LCD (Liquid Crystal Display) 72, an outer camera 73 (a left-eye camera 73a and a right-eye camera 73b), an inner camera 74, a 3D adjustment switch 75, and the 3D indicator 76 are provided in the upper housing 71. Hereinafter, these components will be described in detail.

As shown in FIG. 8, the upper LCD 72 is accommodated in the upper housing 71. In the present embodiment, the screen of the upper LCD 72 is designed to be longer than the screen of the lower LCD 62, and the number of pixels of the lower LCD 72 is, for example, 640 dots×200 dots (horizontal× vertical). However, a display device with any resolution can be used as the upper LCD 72. Furthermore, in the present embodiment, the upper LCD 72 is a liquid crystal display, but a display device using EL (Electro Luminescence), etc., may be used, for example.

Also, in the present embodiment, the upper LCD 72 is a display device capable of displaying images that can be stereoscopically viewed (with the naked eye). Specifically, in the present embodiment, a display device of a lenticular type or a parallax barrier type is used as the upper LCD 72 so that the left-eye and right-eye images, which are alternatingly displayed in the horizontal direction on the upper LCD 72, can be seers separately by the left eye and the right eye, respectively. However, in another embodiment, the upper LCD 72 does not have to be a display device capable of displaying images that can be viewed stereoscopically. Note that in the present embodiment, the upper LCD 72 is a display device that can be switched between a stereoscopic display mode where a stereoscopically viewable image is displayed and a two-dimensional display mode where an image is two-dimensionally displayed (a two-dimensionally viewable image is displayed). The display mode switching is done with the 3D adjustment switch 75 to be described later.

The outer camera 73 is provided on an outer-side surface (the back surface opposite to the main surface on which the upper LCD 72 is provided) of the upper housing 71, and is a stereo camera whose image-capturing direction is the normal direction to the outer-side surface. The outer camera 73 includes two cameras, i.e., the left-eye camera 73a and the right-eye camera 73b. The left-eye camera 73a and the right-eye camera 73b are placed so that their image-capturing directions are parallel to each other. The left-eye camera 73a and the right-eye camera 73b each include an image-capturing element (e.g., a CCD image sensor, a CMOS image sensor, etc.) having a predetermined resolution, and a lens. The interval between the left-eye camera 73a and the right-eye camera 73b is set to be about equal to the interval between eyes of a human, and may be set in the range of 30 mm to 70 mm, for example. Note that the interval between the left-eye camera 73a and the right-eye camera 73b is not limited to this range. In other embodiments, the interval between the two cameras 73a and 73b may be variable. With the outer camera 73, it is possible to take images that can be viewed stereoscopically.

The inner camera 74 is a camera which is provided on the inner-side surface (main surface) 71B of the upper housing 71 and whose image-capturing direction is the normal direction to the inner-side surface. The inner camera 74 includes an image-capturing element (e.g., a CCD image sensor, a CMOS image sensor, etc.) having a predetermined resolution, and a lens. The inner camera 24 captures an image in the direction opposite to that of the outer camera 73, and therefore when the user is looking straight at the upper LCD 72, it is possible to capture an image of the face of the user from the front by the inner camera 74.

The 3D adjustment switch 75 is a sliding switch, and is a switch used for switching between the display modes of the upper LCD 72 as described above. The 3D adjustment switch 75 is used for adjusting the stereoscopic feel of the stereoscopically viewable image (stereoscopic image) displayed on the upper LCD 72. As shown in FIG. 8, the 3D adjustment switch 75 is provided at the edge between the inner-side surface and the right-side surface of the upper housing 71, and is provided at such a position that the 3D adjustment switch 75 can be seen when the user is looking straight at the upper LCD 72. The 3D adjustment switch 75 is provided with a slider slidable in up and down directions, and the stereoscopic feel of the stereoscopic image can be adjusted in accordance with the position of the slider. Here, when the slider is positioned at its lowermost point, the upper LCD 72 is set to the two-dimensional display mode, and when the slider is positioned between a predetermined position above the lowermost point and the uppermost point, the upper LCD 72 is set to the stereoscopic display mode. Also, when the slider is present between the predetermined position and the uppermost point, how a stereoscopic image is seen is adjusted in accordance with the position of the slider.

The 3D indicator 76 shows whether the upper LCD 72 is in the stereoscopic display mode. The 3D indicator 76 is an LED, and is lit when the stereoscopic display mode of the upper LCD 72 is enabled.

Speaker holes 71E are provided on the inner-side surface of the upper housing 71. Sound from a speaker 93 to be described later is outputted from the speaker holes 71E.

5. Internal Configuration of Hand-Held Device 9

Figure 9:
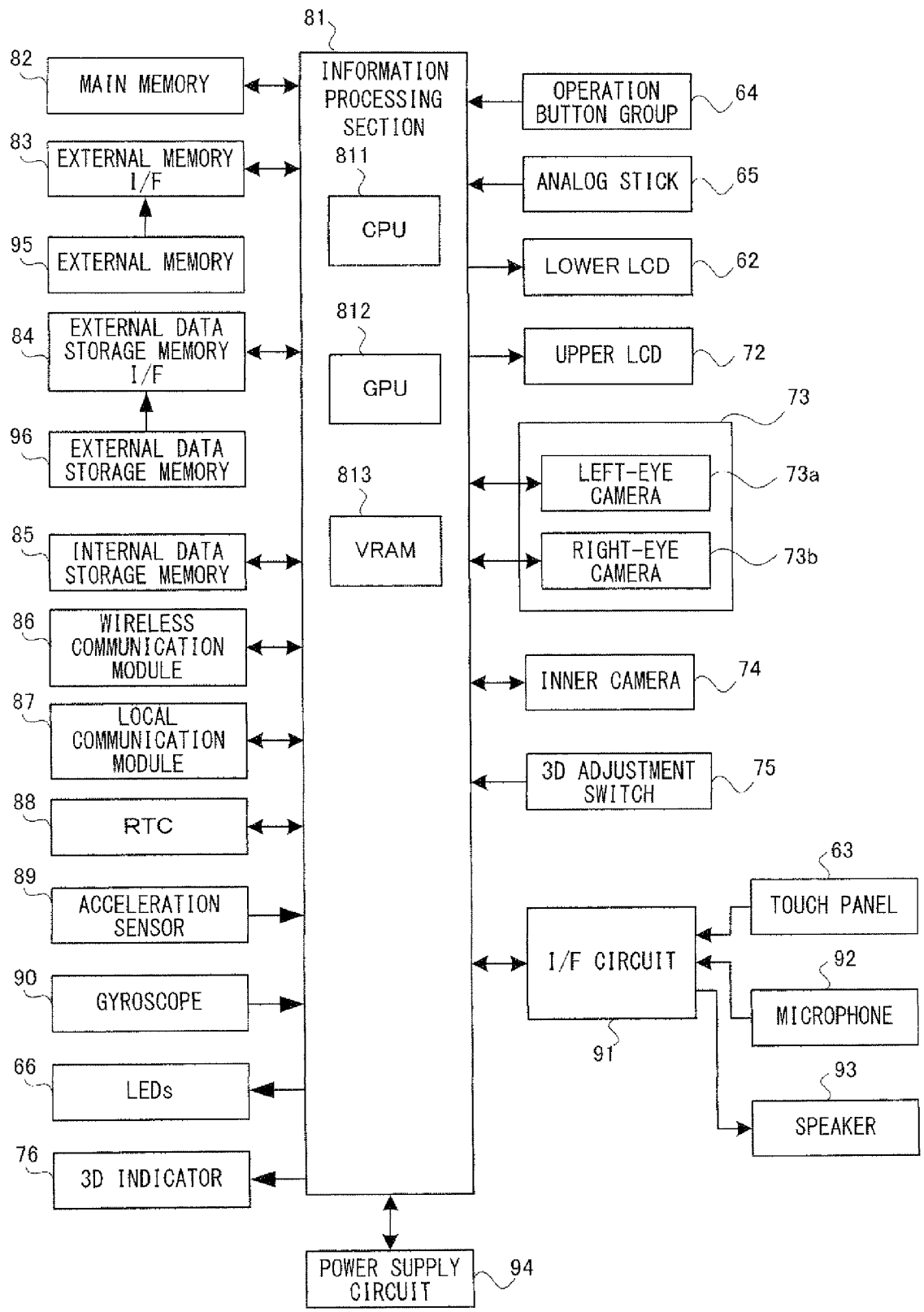
FIG. 9 is a block diagram showing an internal configuration of a hand-held device.

Next, referring to FIG. 9, an internal electrical configuration of the hand-held device 9 will be described. FIG. 9 is a block diagram illustrating an internal configuration of the hand-held device 9. As shown in FIG. 9, the hand-held device 9 includes electronic components such as an information processing section 81, main memory 82, an external memory interface (external memory I/F) 83, external data storage memory I/F 84, internal data storage memory 85, a wireless communication module 86, a local communication module 87, a real time clock (RTC) 38, an acceleration sensor 89, a gyroscope 90, a power supply circuit 94, and an interface circuit (I/F circuit) 41, in addition to the components described above. These electronic components are mounted on an electronic circuit substrate and accommodated in the lower housing 61 (or in the upper housing 71).

The information processing section 81 is an information processing section including a CPU 811 for executing a predetermined program, a CPU 812 for performing image processes, etc. In the present embodiment, a program for performing a predetermined process is stored in memory (e.g., the external memory 95 connected to the external memory I/F 83, or the internal data storage memory 85) in the hand-held device 9. The CPU 811 of the information processing section 81 executes the program, thereby performing a process according to the program (e.g., an image-capturing process, an image display process to be described later, etc.). Note that a program to be executed by the CPU 811 of the information processing section 81 may be acquired from other devices through communication with the other devices. The information processing section 81 includes VRAM 813. The CPU 812 of the information processing section 81 produces an image in accordance with an instruction from the CPU 811 of the information processing section 81, and renders the image in the VRAM 813. The CPU 812 of the information processing section 81 outputs the image rendered in the VRAM 813 to the upper LCD 72 and/or the lower LCD 62, thereby displaying the image on the upper LCD 72 and/or the lower LCD 62. Note that when image data is acquired from the outside (the game apparatus 3), the acquired image data is stored to the VRAM 813, and an image is displayed on the upper LCD 72 and/or the lower LCD 62.

The main memory 82, the external memory I/F 83, the external data storage memory I/F 84, and the internal data storage memory 85 are connected to the information processing section 81. The external memory I/F 83 is an interface for detachably connecting the external memory 95. The external data storage memory I/F 84 is an interface for detachably connecting the external data storage memory 96.

The main memory 82 is a volatile storage section used as a work area and a buffer area for (the CPU 811 of) the information processing section 81. That is, the main memory 82 temporarily stores various data used for the process based on the program, and temporarily stores a program acquired from the outside (the external memory 95, other devices, etc.). In the present embodiment, PSRAM (Pseudo-SRAM) is used as the main memory 82, for example.

The external memory 95 is a non-volatile storage section for storing a program to be executed by the information processing section 81. The external memory 95 is formed by read-only semiconductor memory, for example. When the external memory 95 is connected to the external memory I/F 83, the information processing section 81 can load the program stored in the external memory 95. A predetermined process is performed by executing the program loaded by the information processing section 81. The external data storage memory 96 is formed by non-volatile readable/writable memory (e.g., NAND-type flash memory), and is used for storing predetermined data. For example, the external data storage memory 96 stores images captured by the outer camera 73 and images captured by other devices. When the external data storage memory 96 is connected to the external data storage memory I/F 84, the information processing section 81 can load images stored in the external data storage memory 96, and display the images on the upper LCD 72 and/or the lower LCD 62.

The internal data storage memory 85 is formed by readable/writable non-volatile memory (e.g., NAND-type flash memory), and is used for storing predetermined data. For example, the internal data storage memory 85 stores data and programs downloaded through wireless communication via the wireless communication module 86.

The wireless communication module 86 has a function of connecting to a wireless LAN by a scheme based on the IEEE 802.11.n standard, for example. The local communication module 87 has a function of performing wireless communication with game devices of the same type by a predetermined communication scheme (e.g., a unique protocol or infrared communication). The wireless communication module 86 and the local communication module 87 are connected to the information processing section 81. The information processing section 81 can transmit/receive data to/from other devices via the Internet by using the wireless communication module 86, and can transmit/receive data to/from other game devices of the same type by using the local communication module 87.

In the present embodiment, the game apparatus 3 and the hand-held device 9 communicate with each other via the wireless communication module 86. Also, information processing section 81 includes an unillustrated image decompression section. The image decompression section performs a predetermined decompression process on image data (and sound data) from the wireless communication module 86. Accordingly, when the game apparatus 3 transmits image data (and sound data), the wireless communication module 86 receives the image data and then the image decompression section performs the predetermined decompression process on the received data. The image data subjected to the decompression process is stored as necessary to the VRAM 813 by the CPU 811, and then outputted to the upper LCD 72 and/or the lower LCD 62.

The acceleration sensor 89 is also connected to the information processing section 81. The acceleration sensor 89 detects magnitudes of linear acceleration along the directions of three axes (x-, y-, and z-axes shown in FIG. 8). In the present embodiment, the acceleration sensor 89 is provided inside the lower housing 61. The acceleration sensor 89 detects magnitudes of linear acceleration of the axes, where the x-axis is the long-side direction of the lower housing 61, the y-axis is the short-side direction of the lower housing 61, and the z-axis is the direction vertical to the inner-side surface (main surface) of the lower housing 61. For example, the acceleration sensor 89 may be one of those of types that are available from Analog Devices, Inc. or STMicroelectronics N.V. Note that while the acceleration sensor 89 is assumed to be an electrostatic capacitance type acceleration sensor, for example, other types of acceleration sensors may be used. The acceleration sensor 89 may be an acceleration sensor which performs detection in one or two axial directions. The information processing section 81 acquires data (acceleration data) representing acceleration detected by the acceleration sensor 89 to detect the attitude and the movement of the hand-held device 9.

The gyroscope 90 is connected to the information processing section 81. The gyroscope 90 detects angular velocities about three axes, i.e., the x-, y- and z-axes. Any number and combination of gyroscopes may be used for detecting angular velocities about the three axes, and similar to the gyroscope unit 6, the gyroscope 90 may include a two-axis gyroscope and a one-axis gyroscope. Alternatively, the gyroscope 90 may be a gyroscope for detection in one axial direction or two axial directions. The information processing section 81 can acquire data (angular velocity data) representing the angular velocities detected by the gyroscope 90 to detect the attitude and the movement of the hand-held device 9.

As described above, the hand-held device 9 can acquire acceleration data and angular velocity data as operation data representing operations performed thereon. Accordingly, by using the hand-held device 9, the player can perform the game operation of moving the hand-held device 9 itself, in addition to conventionally general game operations of pressing operation buttons.

The information processing section 81 is also connected to the RTC 88 and the power supply circuit 94. The RTC 88 counts the time, and outputs it to the information processing section 81. The information processing section 81 calculates the current time (date) based on the time counted by the RTC 88. The power supply circuit 94 controls the power from the power supply (the rechargeable battery described above accommodated in the lower housing 61) of the hand-held device 9, and supplies power to components of the hand-held device 9.

An I/F circuit 91 is connected to the information processing section 81. A microphone 92 and the speaker 93 are connected to the I/F circuit 91. Specifically, the speaker 93 is connected to the I/F circuit 91 via an amplifier, not shown. The microphone 92 detects sound of the user, and outputs a sound signal to the I/F circuit 91. The amplifier amplifies the sound signal from the I/F circuit 91, and outputs the sound from the speaker 93. The touch panel 63 is connected to the I/F circuit 91. The I/F circuit 91 includes a sound control circuit for controlling the microphone 92 and the speaker 93 (amplifier), and a touch panel control circuit for controlling the touch panel. The sound control circuit performs A/D conversion and D/A conversion on a sound signal, or converts a sound signal to sound data of a predetermined format. The touch panel control circuit produces touch position data of a predetermined format based on a signal from the touch panel 63, and outputs it to the information processing section 81. The touch position data represents the coordinates of the position on the input surface of the touch panel 63 at which an input has been made. Note that the touch panel control circuit reads a signal from the touch panel 63 and produces the touch position data once per a predetermined period of time. The information processing section 81 can know the position at which an input has been made on the touch panel 63 by acquiring the touch position data.

An operation button group 64 includes the operation buttons 64A to 64L and the L and R buttons, and is connected to the information processing section 81. Operation button data representing the input status of the operation button group 64 (whether any button has been pressed) is outputted from the operation button group 64 to the information processing section 81. The information processing section 81 acquires the operation data from the operation button group 64 to perform a process in accordance with the input on the operation button group 64.

The analog stick 65 is connected to the information processing section 81, and outputs stick data, which represents the tilting direction and amount of the analog stick 65, to the information processing section 81. The information processing section 81 acquires the stick data from the analog stick 65, and performs a process according to an input with the analog stick 65.

As described above, there are five input means included in the hand-held device 9 as input devices, which are the acceleration sensor 89, the gyroscope 90, the touch panel 63, the operation button group 64, and the analog stick 65. However, in another embodiment, the hand-held device 9 may include any input devices. For example, the hand-held device 9 may include one or more of the five input means. For example, the hand-held device 9 may also include a touch pad or may also include infrared light detection means (an infrared filter 38, a lens 39, an image-capturing element 40, and an image processing circuit 41) similar to those of the controller 5.

The second operation data representing operations on the input devices of the hand-held device 9 is transmitted to the game apparatus 3. Here, the second operation data includes acceleration data from the acceleration sensor 89 and angular velocity data from the gyroscope 90, in addition to the touch position data, the operation button data, and the stick data as mentioned above. The information processing section 81 wirelessly transmits the second operation data to the hand-held device 9 via the wireless communication module 86. Note that the second operation data is sequentially transmitted from the hand-held device 9 to the game apparatus 3 in predetermined cycles, preferably in cycles of one frame period or less as in the case of the first operation data being transmitted from the controller 5 to the game apparatus 3.

The lower LCD 62 and the upper LCD 72 are connected to the information processing section 81. The lower LCD 62 and the upper LCD 72 display images in accordance with an instruction from (the GPU 812 of) the information processing section 81. In the present embodiment, it is possible for the information processing section 81 to display a stereoscopic image (stereoscopically viewable image) on the upper LCD 72 using a right-eye image and a left-eye image.

The outer camera 73 and the inner camera 74 are connected to the information processing section 81. The outer camera 73 and the inner camera 74 capture images in accordance with instructions of the information processing section 81, and output data for the captured images to the information processing section 81.

The 3D adjustment switch 75 is connected to the information processing section 81. The 3D adjustment switch 75 transmits to the information processing section 81 an electrical signal in accordance with the position of a slider 25*a*.

The 3D indicator 76 is connected to the information processing section 81. The information processing section 81 controls lighting of the 3D indicator 76. For example, when the upper LCD 72 is in the stereoscopic display mode, the information processing section 81 lights the 3D indicator 76. This has been descriptive of the internal configuration of the hand-held device 9.

6. Outline of Game Process

Next, game processes to be performed by the present game system will be outlined. The present embodiment is directed to a game process for a game in which the player operates a hand-held device 9 to move an object in a virtual game space. Two different games which employ different methods of operating the movement direction of the object will be described below as examples.

In the two different games to be shown below, the controller device 7 is not used in the game operation, and the first operation data from the controller device 7 is not used in the game process. That is, the game system 1 may be configured without the controller device 7. In other embodiments, the game process may be such that the hand-held device 9 and the controller device 7 are both used in the game operation.

(Outline of Game of First Example)

First, the game of a first example will be outlined. The game is a game in which an object (a shuriken, or a throwing star) is shot in the game space by operating the hand-held device 9. The player can specify the direction (and the velocity) in which a shuriken is launched through an operation of changing the attitude of the hand-held device 9 and drawing a line on the touch panel 63. In the present example, the operation of drawing a line refers to an operation of moving the touch position on a surface through the operation of touching the touch panel or the touch pad with a finger or a touch pen and drawing a line while touching, and a line does not need to be drawn actually.

Figure 10:
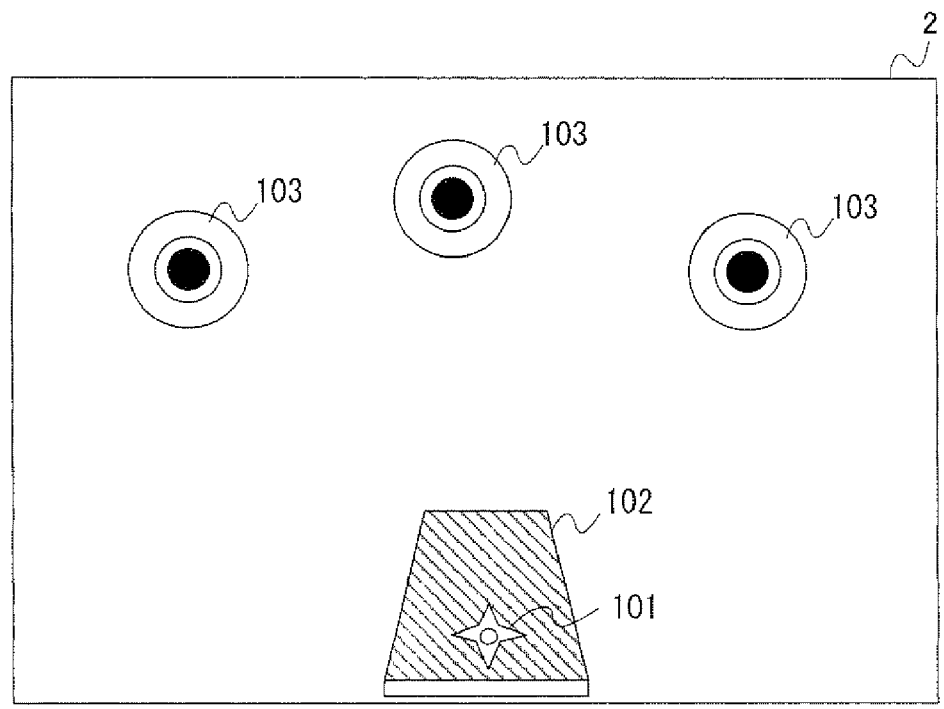
FIG. 10 is a diagram showing a screen of a television and a hand-held device in a first example.
Figure 10:
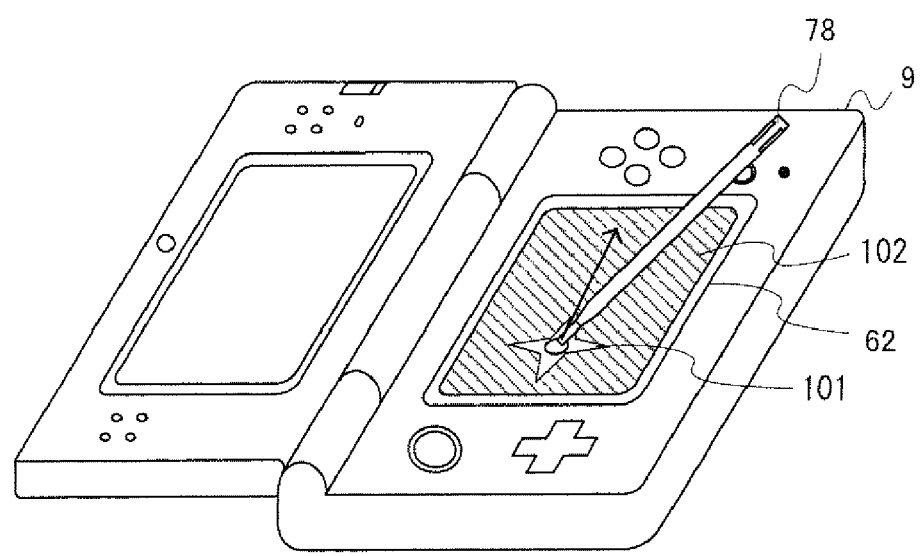

FIG. 10 is a diagram showing the screen of the television 2 and the hand-held device 9 in the first example. In FIG. 10, an image of the game space is displayed as the game image on the television 2 and the lower LCD 62 of the hand-held device 9. A shuriken 101, a control surface 102 and a target 103 are displayed on the television 2. The control surface 102 (and the shuriken 101) are displayed on the lower LCD 62. In the first game example, the player plays the game by shooting a shuriken 101 at a target 103 through an operation using the hand-held device 9.

when shooting the shuriken 101, the player first changes the attitude of the control surface 102 to an intended attitude by changing or varying the attitude of the terminal device 7. Then, the player performs an operation of drawing a line on the touch panel 63 as shown in FIG. 10. Through this operation, the direction on the control surface 102 is determined, and the shuriken 101 is launched in this direction. In the first example, the player can shoot the shuriken 101 in an intended direction through these operations. Although FIG. 10 shows an example in which the hand-held device 9 is used in a portrait position, the hand-held device 9 may be used in a landscape position and it may be used in any attitude.

Figure 11:
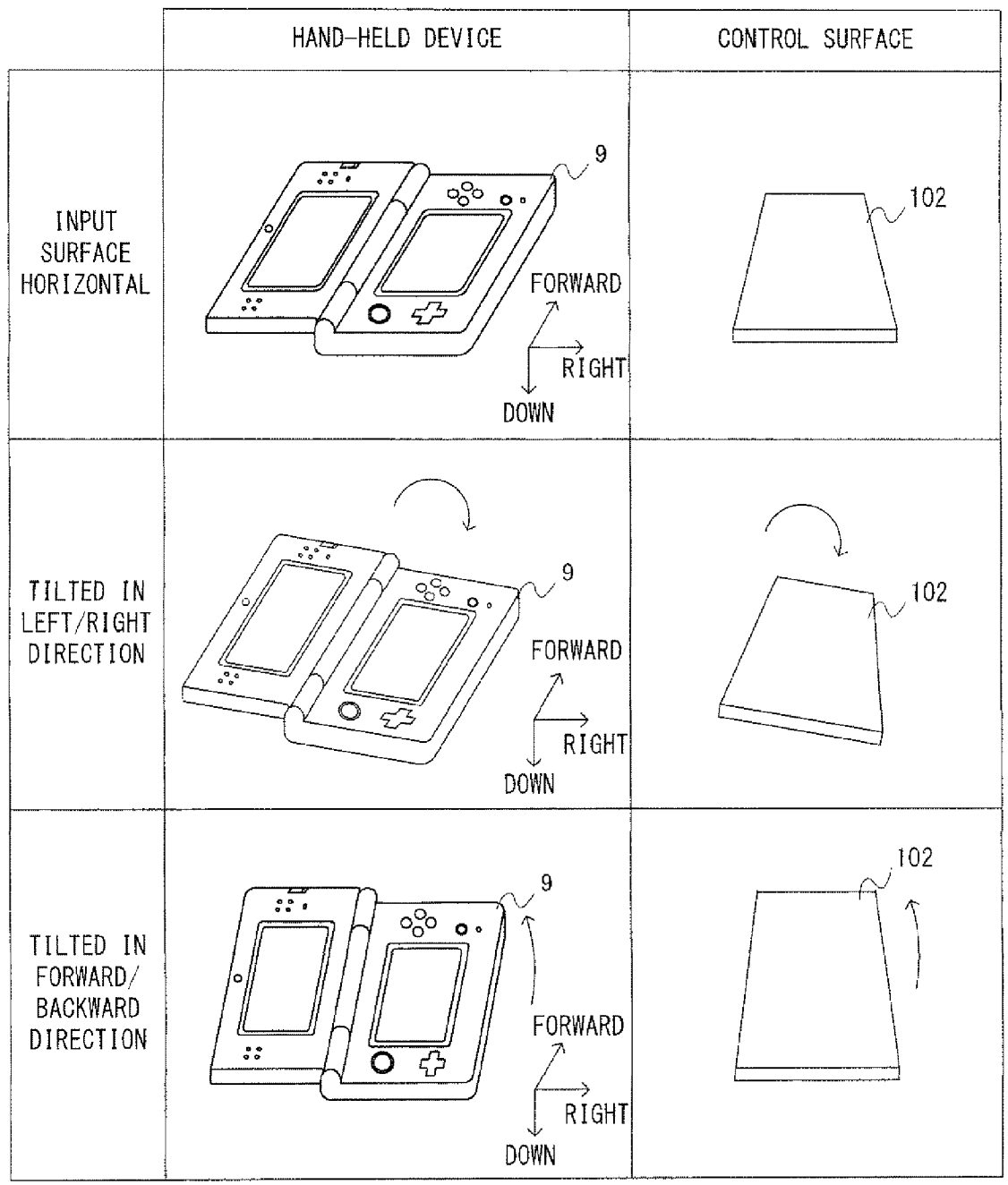
FIG. 11 is a diagram showing the relationship between the attitude of the hand-held device and the attitude of the control surface.

In the present embodiment, the attitude of the control surface 102 is determined in accordance with the attitude of the hand-held device 9. FIG. 11 is a diagram showing the relationship between the attitude of the hand-held device 9 and the attitude of the control surface 102. As shown in the upper row of the table of FIG. 11, when the input surface of the touch panel 63 of the hand-held device 9 is horizontal, the control surface 102 is placed horizontal in the game space. As shown in the middle row of the table of FIG. 11, when the hand-held device 9 is rotated about an axis in the forward/backward direction (specifically, tilted so that the right side thereof lowers), the control surface 102 is rotated about an axis in the forward/backward direction (specifically, tilted so that the right side thereof lowers). Moreover, as shown in the lower row of the table of FIG. 11, when the hand-held device 9 is rotated about an axis in the left/right direction (specifically, tilted so that the rear side lowers), the control surface 102 is rotated in the left/right direction (specifically, tilted so that the rear side lowers). Although not shown in the figure, when the hand-held device 9 is rotated about an axis in the up/down direction, the control surface 102 is also rotated about an axis in the up/down direction. Thus, the attitude of the control surface 102 is controlled so as to correspond to the attitude of the hand-held device 9. In the present embodiment, the position of the control surface 102 is fixed to a predetermined position in the game space.

The launch direction of the shuriken 101 is determined by determining the direction on the control surface 102 whose attitude is determined as described above. That is, a direction in the three-dimensional game space is determined by determining a direction on the control surface 102 of which the attitude in the three-dimensional game space has been set. The direction on the control surface 102 is calculated based on a line (input trace) input on the touch panel 63 of the hand-held device 9.

Figure 12:
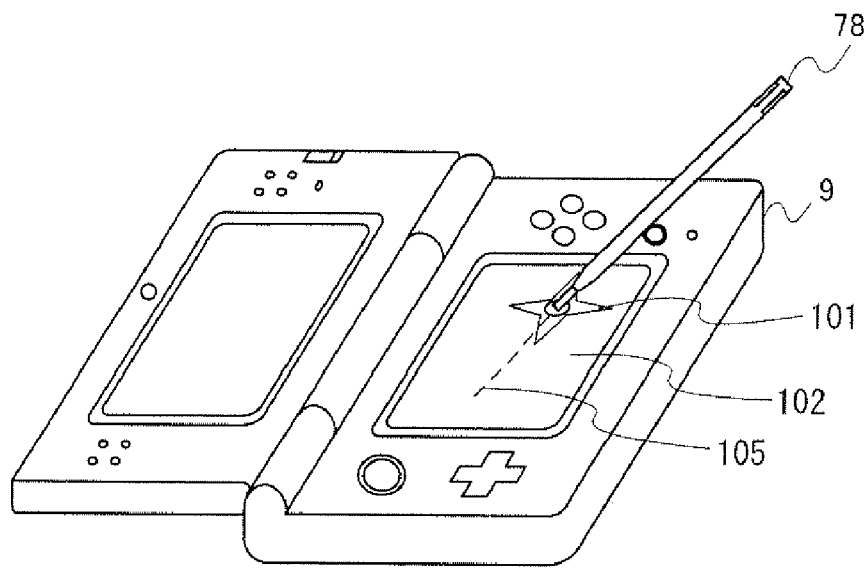
FIG. 12 is a diagram showing a line being drawn on a touch panel of the hand-held device.
Figure 13:
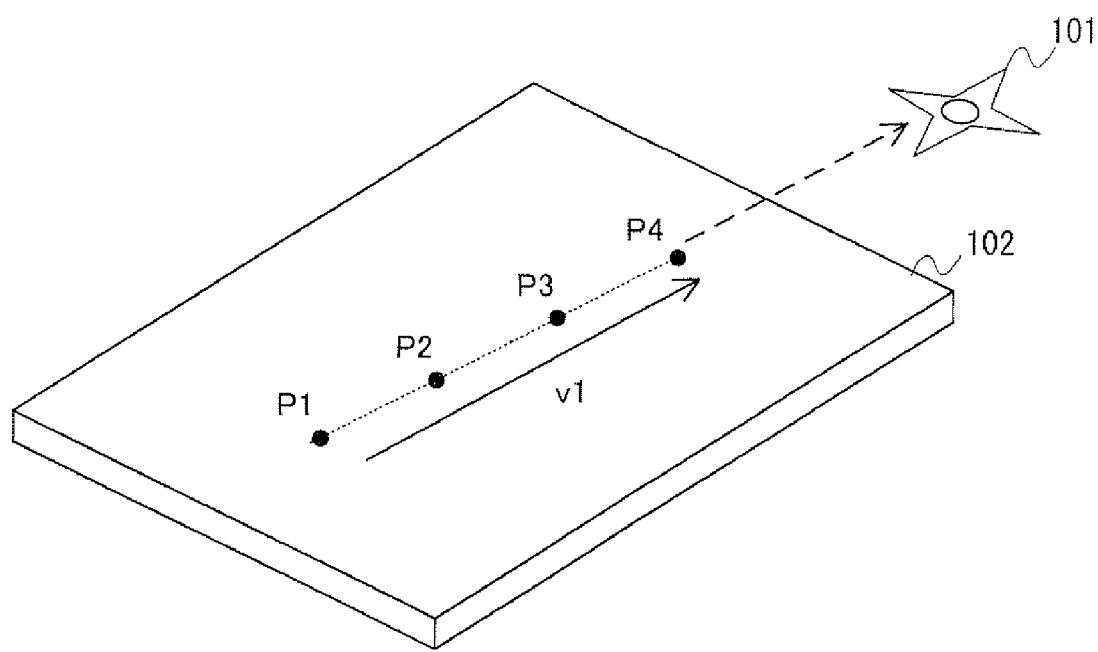
FIG. 13 is a diagram showing a control position and a control direction to be calculated on a control surface when the line shown in FIG. 12 is drawn on the touch panel.

FIG. 12 is a diagram showing a line being drawn on the touch panel 63 of the hand-held device 9. FIG. 13 is a diagram showing the control position and the control direction calculated on the control surface 102 in a case in which a line shown in FIG. 12 is drawn on the touch panel 63. As shown in FIG. 12, the control surface 102 is displayed on the lower LCD 62 of the hand-held device 9. Herein, the control surface 102 is displayed so that the input surface of the touch panel 63 and the control surface 102 coincide with each other on the screen (i.e., so that the screen is filled up by the control surface 102).

When launching the shuriken 101, the player performs an operation of drawing a line on the touch panel 63 as shown in FIG. 12. In the present embodiment, while an input is being made on the touch panel 63, the shuriken 101 is displayed at the touch position. Although FIG. 12 shows the line drawn by the player in a dotted line, this line does not actually need to be displayed.

When a line is drawn by the player, i.e., when there is an input on the touch panel 63, the game device 3 calculates a position on the control surface 102 corresponding to the touch position (referred to as the "control position"). The control position is calculated as a position (on the control surface 102) corresponding to the touch position on the screen of the lower LCD 62. In FIG. 13, the dotted line represents a line (on the control surface 102) corresponding to the line drawn on the input surface. The control position is calculated to be a position on this line such as the points P1 to P4 shown in FIG. 13, for example. The game device 3 repeatedly calculates the control position while an input is being made on the touch panel 63 (while a line is being drawn).

When the input of drawing a line on the touch panel 63 is ended, the game device 3 identifies the control direction (the vector v1 shown in FIG. 13) based on the control positions. The control direction is identified to be a direction that is represented by the control positions corresponding to the drawn line. That is, the control direction is calculated so as to be generally aligned with the line. In the present embodiment, the control direction is calculated as a vector which represents an average velocity of the control positions, the details of which will be described later. Since the control surface 102 is placed in the three-dimensional game space, the control direction is also calculated as a three-dimensional direction in the three-dimensional game space. Thus, the launch direction of the shuriken 101 in the game space is determined.

Once the control direction is calculated, the shuriken 101 is launched. The movement of the shuriken 101 in the game space is displayed on the television 2. In the present embodiment, the attitude of the shuriken 101 is determined to be an attitude in accordance with the control surface 102. Therefore, the shuriken 101 is launched (moved) in the control direction in an attitude in accordance with the attitude of the control surface 102. The behavior of the shuriken 101 after it is launched may be determined arbitrarily. For example, the shuriken 101 may be controlled to move straight in the control direction, or a gravitational influence may be virtually added so that it drops over time. The trajectory may be curved by the spin. It may be controlled with a movement direction determined in accordance with the attitude of the shuriken 101 (e.g., so that it curves to the right when the shuriken 101 is tilted to the right and to the left when it is tilted to the left).

As described above, in the present embodiment, the player can specify the attitude of the control surface 102 using the attitude of the hand-held device 9, and specify a direction on the control surface 102 using a line input on the touch panel 63. Then, the shuriken 101 is controlled so as to move in the specified direction (control direction) on the control surface 102. Therefore, according to the present embodiment, the player uses one hand to actually adjust the attitude of the hand-held device 9 and the other to input a direction by a line on the touch panel 63, and it is therefore possible to easily specify a direction through an intuitive operation as if the player were actually inputting a direction in the space. Particularly, in the present example, it is possible to operate as if the player were actually shooting a shuriken with a hand toward the screen. Since the operation of the attitude of the hand-held device 9 and the input operation on the touch panel 63 can be done simultaneously in parallel, the player can quickly perform an operation of specifying a direction in a three-dimensional space.

(Game Process in First Example)

Figure 14:
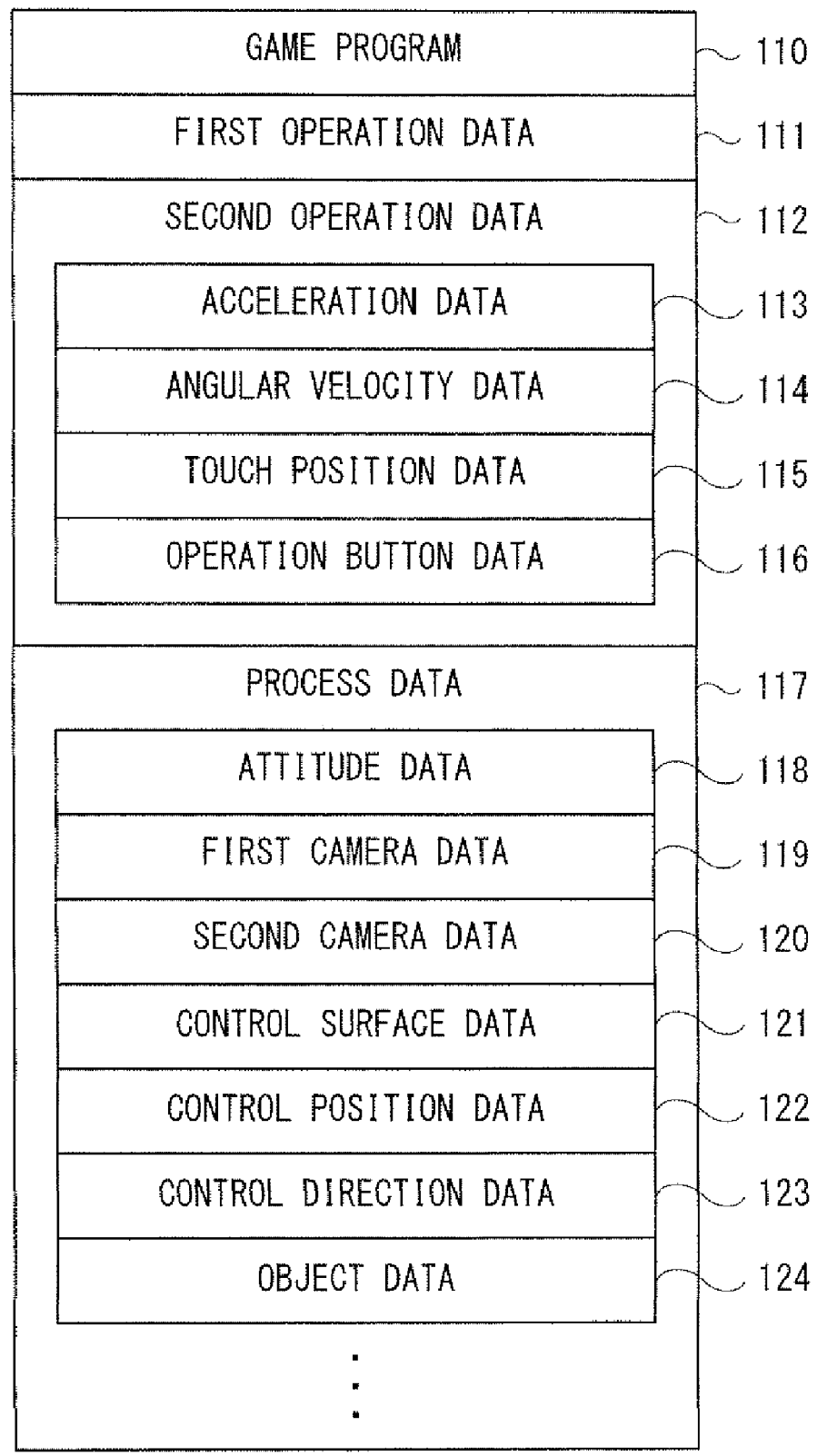
FIG. 14 is a diagram showing various data used in game processes.

Next, the details of the game processes of the first example will be described. First, various example data used in the game processes will be described. FIG. 14 is a diagram showing various data used in the game processes. FIG. 14 is a diagram showing primary data to be stored in the main memory (the external main memory 12 or the internal main memory 11e) of the game device 3. As shown in FIG. 14, the main memory of the game device 3 stores a game program 110, first operation data 111, second operation data 112, and process data 117. In addition to those shown in FIG. 14, the main memory also stores other data necessary for the game, such as image data of various objects appearing in the game, and sound data used in the game, etc.

At an appropriate point in time after the power of the game device 3 is turned ON, a part or whole of the game program 110 is loaded from the optical disc 4 and stored in the main memory. The game program 110 may be obtained from an external device of the game device 3 (e.g., via the Internet), instead of from the optical disc 4. A part of the game program 110 (e.g., a program for calculating the attitude of the controller device 7 and/or the hand-held device 9) may be pre-stored in the game device 3.

The first operation data 111 is data representing a user operation on the controller device 7. The first operation data 111 is transmitted from the controller device 7 and received by the game device 3. Although the first operation data 111 is not used in the game processes in the present embodiment and the details thereof will not be described below, the first operation data 111 includes acceleration data, angular velocity data, marker coordinate data, and operation button data.

The second operation data 112 is data representing a user operation on the hand-held device 9. The second operation data 112 is transmitted from the hand-held device 9 and received by the game device 3. The second operation data 112 includes acceleration data 113, angular velocity data 114, touch position data 115, and operation button data 116. The main memory may store a predetermined number of latest (most recently obtained) sets of second operation data.

The acceleration data 113 is data representing the acceleration (acceleration vector) detected by an acceleration sensor 89. While the acceleration data 113 herein represents three-dimensional acceleration of which each component is the acceleration for one of the three axes of x, y and z shown in FIG. 8, it may represent acceleration for any one or more directions in other embodiments.

The angular velocity data 114 is data representing the angular velocity detected by the gyrosensor 90. While the angular velocity data 114 herein represents angular velocity about each of the three axes of x, y and z shown in FIG. 8, it may represent angular velocity about any one or more axes in other embodiments.

The touch position data 115 is data representing the position (touch position) on the input surface of the touch panel 63 at which an input is made. The touch position data 115 herein represents coordinate values in a two-dimensional coordinate system for representing a touch position. When no input is being made on the touch panel 63, the touch position data 115 indicates that there is no input.

The operation button data 116 is data representing input status of operation buttons 64A to 64L provided on the hand-held device 9.

The second operation data 112 may be any data that includes data representing the player input position on the input surface (the touch position data 115 in the present embodiment) and data whose value changes in accordance with the movement of the hand-held device 9 the acceleration data 113 and the angular velocity data 114 in the present embodiment). Therefore, the second operation data 112 may be data that does not include the operation button data 116, or data that includes only one of the acceleration data 113 and the angular velocity data 114. That is, the hand-held device 9 may not include the operation buttons 64, or may include only one of the acceleration sensor 89 and the gyrosensor 90. If the hand-held device 9 includes the image capturing/processing section 35 instead of the acceleration sensor 89 and the gyrosensor 90, the second operation data 112 may include marker coordinate data instead of the acceleration data 113 and the angular velocity data 114.

The process data 117 is data used in the game processes (FIG. 15) to be described later. The process data 117 includes attitude data 118, first camera data 119, second camera data 120, control surface data 121, control position data 122, control direction data 123, and object data 124. In addition to those shown in FIG. 14, the process data 117 also includes various data used in the game processes, such as data representing parameters set for various objects.

The attitude data 118 is data representing the attitude of the hand-held device 9. In the present embodiment, the attitude data 118 is calculated based on the acceleration data 113 and the angular velocity data 114 included in the second operation data 112. The method for calculating the attitude data 118 will be described later.

The first camera data 119 is data representing the placement of the first virtual camera for generating the first game image displayed on the television 2. Specifically, the first camera data 119 represents the position and the attitude of the first virtual camera in the virtual game space. The first camera data 119 may include, for example, data representing the angle of view (range of viewing field) of the first virtual camera.

The second camera data 120 is data representing the placement of the second virtual camera for generating the second game image displayed on the lower LCD 62 of the hand-held device 9. Specifically, the second camera data 120 represents the position and the attitude of the second virtual camera in the game space. The second camera data 120 may include, for example, data representing the angle of view (range of viewing field) of the second virtual camera. In the present embodiment, the second virtual camera is placed in accordance with the position and the attitude of the control surface 102 so that the control surface 102 is displayed on the lower LCD 62.

The control surface data 121 is data representing the position and the attitude of the control surface 102 in the game space. Specifically, the control surface data 121 represents a formula of a plane that represents the control surface 102. In the present embodiment, the position of the control surface 102 is fixed to a predetermined position, and the attitude of the control surface 102 is calculated based on the attitude of the hand-held device 9.

The control position data 122 is data representing the control position on the control surface 102 corresponding to the touch position. Specifically, the control position data 122 represents three-dimensional coordinate values which represent a position in the game space. In other embodiments, the control position data 122 may represent coordinate values in a two-dimensional coordinate system which represent a position on the control surface. In the present embodiment, when inputs are made successively the touch panel 63 (i.e., when touch positions are detected successively), data representing a plurality of control positions corresponding to a predetermined number of latest touch positions is stored as the control position data 122. When the input on the touch panel 63 is ended, the contents of the control position data 122 are reset.

The control direction data 123 is data representing the control direction for determining the launch direction (movement direction) of the shuriken 101. Specifically, the control direction data 123 represents a three-dimensional vector indicating a direction in a three-dimensional game space. The vector representing this control direction will be hereinafter referred to as the "control direction vector". The control direction data 123 is calculated based on the control position data 122.

The object data 124 is data representing the status of an object (the shuriken 101 in the present embodiment) moved based on the control direction. Specifically, the object data 124 represents the position and the attitude of the shuriken 101 in the game space. The game device 3 places the shuriken 101 in the game space based on the object data 124, and generates and displays an image of the game space with the shuriken 101 placed therein.

Figure 15:
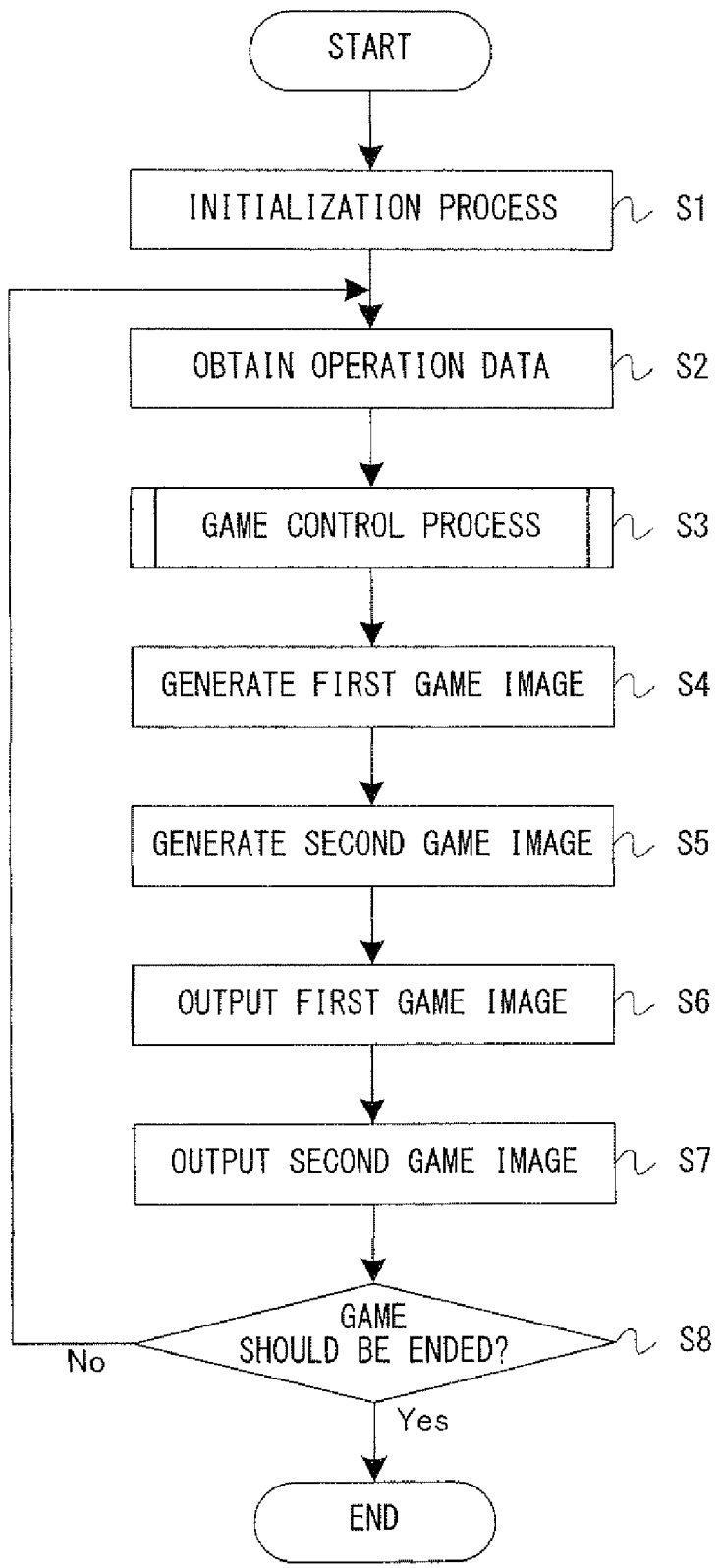
FIG. 15 is a main flow chart showing a flow of game processes performed by the game device.

Next, the details of the game processes performed by the game device 3 will be described with reference to FIGS. 15 and 16. FIG. 15 is a main flow chart showing a flow of game processes performed by the game device 3. When the power of the game device 3 is turned ON, the CPU 10 of the game device 3 executes a boot program stored in a boot ROM (not shown), so as to initialize each unit, including the main memory. Then, the game program stored in the optical disc 4 is loaded to the main memory, and the CPU 10 starts executing the game program. The game device 3 may be configured to execute the game program stored in the optical disc 4 immediately after power-up, or it may be configured so that a built-in program is executed after power-up for displaying a predetermined menu screen first, and then the game program stored in the optical disc 4 is executed when the start of the game is instructed by the user. The flow chart of FIG. 15 is a flow chart showing the process to be performed after processes described above are completed.

The process of the steps of the flow chart shown in FIGS. 15 and 16 and FIG. 19 to be discussed later is merely illustrative, and the order of steps to be performed may be switched around as long as similar results are obtained. The values of the variables, and the threshold values used in determination steps are also merely illustrative, and other values may be used as necessary. While the present embodiment is described assuming that the processes of the steps of the flow chart are performed by the CPU 10, processes of some of the steps may be performed by a processor or a dedicated circuit other than the CPU 10.

First, in step S1, the CPU 10 performs an initialization process. The initialization process is a process of constructing a virtual game space, placing objects appearing in the virtual space at their initial positions, and setting initial values of various parameters used in the game processes. In the present embodiment, the position and the attitude of the first virtual camera are set in the initialization process. The position and the attitude of the first virtual camera are set so that the control surface 102 is included in the image-capturing range (range of the view volume of the virtual camera). Data representing the position and the attitude which have been set is stored in the main memory as the first camera data 119. Since the attitude of the control surface 102 is variable but the position thereof is fixed, it is possible to set first virtual camera in the initialization process so that the control surface 102 is included in the image-capturing range. The process of step S2 is performed, following step S1. Thereafter, the process loop including a series of processes of steps S2 to S8 is repeatedly performed at a rate of once per a predetermined amount of time (e.g., one frame period).

In step S2, the CPU 10 obtains the second operation data from the hand-held device 9. Since the hand-held device 9 repeatedly transmits various data, which are outputted from the acceleration sensor 89, the gyrosensor 90, the touch panel 63 and the operation buttons 64, to the game device 3 as the second operation data, the game device 3 successively receives the data from the hand-held device 9 and stores them as the second operation data 112 in the main memory. In step S2, the CPU 10 may obtain the first operation data from the controller device 7 in addition to the second operation data. In step S2, the CPU 10 reads out the latest second operation data 112 from the main memory. The process of step S3 is performed, following step S2.

In step S3, the CPU 10 performs the game control process. The game control process is a process for allowing the game to progress by, for example, performing processes such as controlling the action of an object (the shuriken 101, etc.) in the game space in accordance with operations by the player. The details of the game control process will now be described with reference to FIG. 16. The game control process will be described below, focusing on the process relating to the calculation of the control direction, and processes that can be performed in a manner similar to the conventional processes will not be described in detail. For example, the detailed description will be omitted for the process relating to the movement control of the shuriken 101 after the shuriken 101 is launched in accordance with the control direction, the process for determining whether the shuriken 101 has hit the target 103, the process of calculating the score when the shuriken 101 has hit the target 103, etc., because these operations can be performed in a manner similar to the conventional processes.

Figure 16:
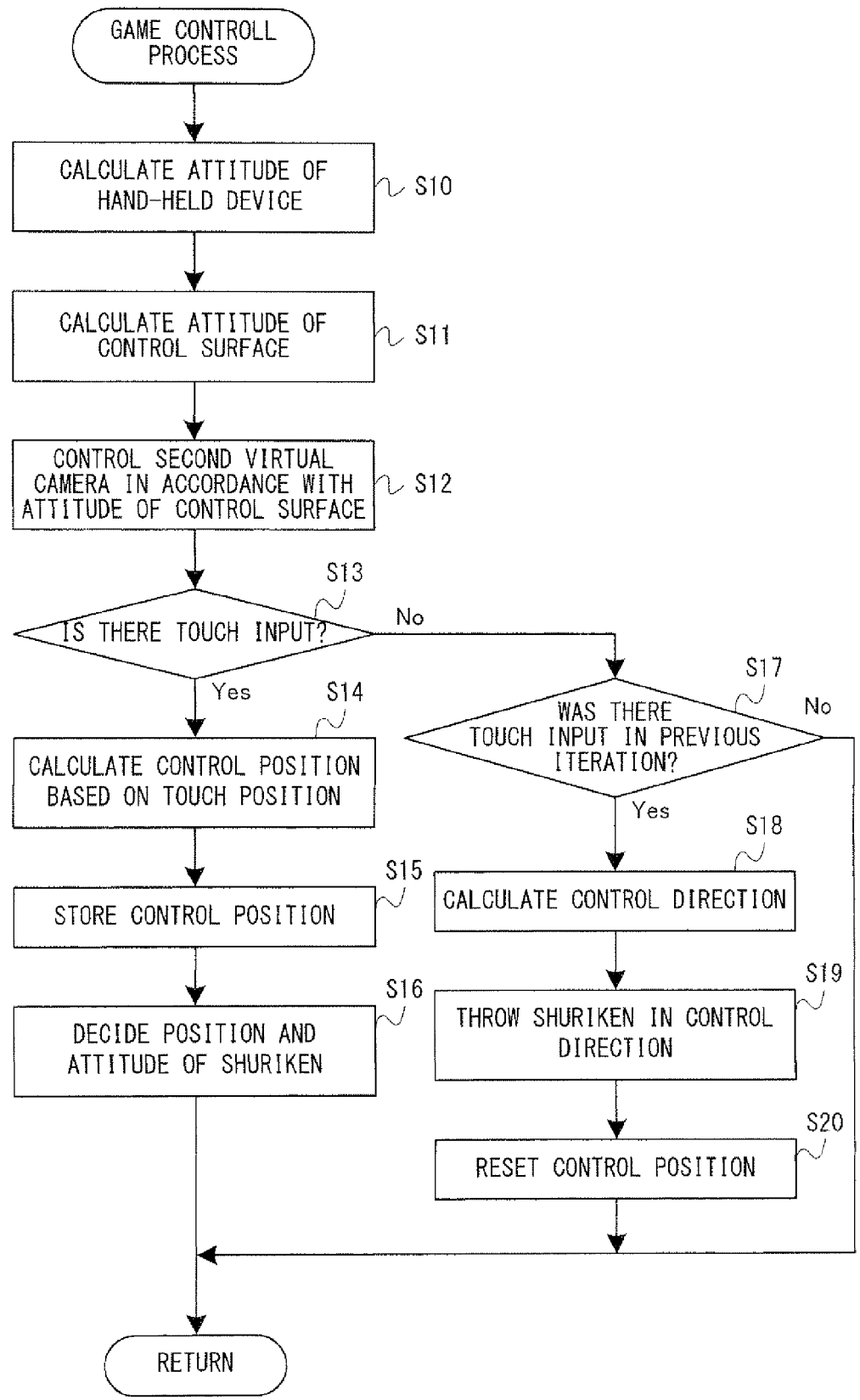
FIG. 16 is a flow chart showing a detailed flow of game control processes.

FIG. 16 is a flow chart showing a detailed flow of game control processes. In the game control process, first, in step 310, the CPU 10 calculates the attitude of the hand-held device 9. While the attitude of the hand-held device 9 may be calculated by any method as long as it is calculated based on the second operation data 112, the attitude is calculated by the following method in the present embodiment. The method for calculating the attitude of the hand-held device 9 will be described below.

First, the CPU 10 calculates the attitude of the hand-held device 9 based on the angular velocity data 114 stored in the main memory. While the method for calculating the attitude of the hand-held device 9 from the angular velocity may be any method, the attitude is calculated using the previous attitude (the attitude which was calculated in the previous iteration) and the current angular velocity (the angular velocity obtained in the current iteration of the process loop). Specifically, the CPU 10 calculates the attitude by rotating the previous attitude by a unit time's worth of the current angular velocity. The previous attitude is represented by the attitude data 118 stored in the main memory, and the current angular velocity is represented by the angular velocity data 114 stored in the main memory. Therefore, the CPU 10 reads out the attitude data 118 and the angular velocity data 114 from the main memory to calculate the attitude of the attitude of the hand-held device 9. The data representing "the attitude based on the angular velocity" calculated as described above is stored in the main memory.

Where the attitude is calculated from the angular velocity, it is preferred that an initial attitude is set. That is, where the attitude of the hand-held device 9 is calculated from the angular velocity, the CPU 10 initially calculates the initial attitude of the hand-held device 9. The initial attitude of the hand-held device 9 may be calculated based on the acceleration data, or the player may be prompted to perform a predetermined operation with the hand-held device 9 in a particular attitude so that the particular attitude at the point in time when the predetermined operation is performed is used as the initial attitude.

Next, the CPU 10 corrects the attitude of the hand-held device 9 calculated based on the angular velocity by using the acceleration data 113. Specifically, the CPU 10 reads out the acceleration data 113 from the main memory and calculates the attitude of the hand-held device 9 based on the acceleration data 113. With the acceleration sensor 89, in a state in which the hand-held device 9 is substantially stationary, the acceleration acting upon the hand-held device 9 means the gravitational acceleration. Therefore, the CPU 10 can calculate the direction of the gravitational acceleration (the direction of gravity) acting upon the hand-held device 9 by using the acceleration data 113 outputted from the acceleration sensor 89. That is, it is possible to calculate the direction (attitude) of the hand-held device 9 with respect to the direction of gravity based on the acceleration data 113. As described above, in circumstances in which the acceleration sensor 89 detects the gravitational acceleration, it is possible to calculate the direction (attitude) of the hand-held device 9 based on the acceleration data 113. The data representing "the attitude based on the acceleration" calculated as described above is stored in the main memory.

After calculating the attitude based on the acceleration, the CPU 10 then corrects the attitude based on the angular velocity by using the attitude based on the acceleration. Specifically, the CPU 10 reads out data representing the attitude based on the angular velocity and data representing the attitude based on the acceleration from the main memory, and makes a correction such that the attitude based on the angular velocity data is brought closer to the attitude based on the acceleration data at a predetermined rate. The predetermined rate may be a predetermined fixed value, and may be for example set in accordance with the acceleration represented by the acceleration data 113, etc. with the attitude based on the acceleration, the attitude cannot be calculated for the rotation direction about the direction of gravity, and therefore the CPU 10 may not make a correction for the rotation direction. In the present embodiment, data representing the corrected attitude obtained as described above is stored in the main memory as the attitude data 118. The process of step S11 is performed, following step S10.

Through the process of step S10 described above, the attitude of the hand-held device 9 is calculated. With the method using the angular velocity, among the methods for calculating the attitude of the hand-held device 9, it is possible to calculate the attitude no matter how the hand-held device 9 is moving. On the other hand, with the method using the angular velocity, since the attitude is calculated by cumulatively adding the successively-detected angular velocities, accumulation of errors, or the like, may lead to poor precision, and a so-called "temperature drift" problem may deteriorate the precision of the gyrosensor. With the method using the acceleration, errors do not accumulate, but it is not possible to calculate the attitude with high precision in a state in which the hand-held device 9 is being moved violently (since the direction of gravity cannot be detected accurately). According to the present embodiment, since two different methods having different characteristics as described above are used, it is possible to more accurately calculate the attitude of the hand-held device 9.

While the game device 3 calculates the attitude of the hand-held device 9 using the two methods described above in the present embodiment, the attitude may be calculated using one of the two methods in other embodiments. In other embodiments, if the hand-held device 9 includes the image capturing/processing section 35 of the controller device 7, the attitude may be calculated based on the marker coordinate data in addition to (or instead of) the acceleration and the angular velocity. The game device 3 may correct the attitude calculated based on the acceleration and/or the angular velocity using the marker coordinate data.

In step S11, the CPU 10 calculates the attitude of the control surface 102 based on the attitude of the hand-held device 9. In the present embodiment, the attitude of the control surface 102 in the game space is set so as to correspond to the attitude of the hand-held device 9 in the real space. Specifically, when the hand-held device 9 is in a reference attitude, the attitude of the control surface 102 is calculated to be a predetermined reference attitude. In the present embodiment, the reference attitude of the hand-held device 9 is such an attitude that the input surface of the touch panel 63 is horizontal, and the predetermined reference attitude of the control surface 102 is such an attitude that it is horizontal in the game space (see the upper row of FIG. 11). When the hand-held device 9 is in an attitude other than the reference attitude, the attitude of the control surface 102 is calculated to be an attitude obtained by rotating it from the predetermined reference attitude in a direction in which the hand-held device 9 is rotated from the reference attitude by an amount by which the hand-held device 9 is rotated from the reference attitude (see the middle row and the lower row of FIG. 11). As described above, in the present embodiment, the attitude of the control surface 102 is calculated so that the attitude of the control surface 102 in the virtual space coincides with the attitude of the hand-held device 9 in the real space. In other embodiments, the attitude of the hand-held device 9 and the attitude of the control surface 102 do not need to coincide with each other, and the attitude of the control surface 102 may be calculated so as to change in accordance with the attitude of the hand-held device 9.

As a specific process of step S11, the CPU 10 reads out the attitude data 118 from the main memory, and calculates the attitude of the control surface 102 based on the attitude data 118. The position of the control surface 102 is set to a predetermined position. Then, data representing the calculated attitude and, the set position is stored in the main memory as the control surface data 121. The process of step S12 is performed, following step S11.

In step S11, the CPU 10 fixes the position of the control surface 102, and changes the attitude of the control surface 102 in accordance with the attitude of the hand-held device 9. In other embodiments, the attitude and the position of the control surface 102 may be changed in accordance with the attitude of the hand-held device 9. For example, when rotating the control surface 102 to the left, the CPU 10 may move the position of the control surface 102 to the left while rotating the control surface 102 to the left.

In step S12, the CPU 10 controls the second virtual camera in accordance with the attitude of the control surface 102. As described above, the control surface 102 is displayed on the lower LCD 62 of the hand-held device 9, and specifically, the control surface 102 is displayed so that the input surface of the touch panel 63 and the control surface 102 coincide with each other on the screen. Therefore, the position and the attitude of the second virtual camera are controlled in accordance with the attitude of the control surface 102 so that the control surface 102 is included in the range of viewing field (specifically, so that the periphery of the control surface 102 and the perimeter of the range of viewing field of the second virtual camera coincide with each other). The second virtual camera is controlled so that the line-of-sight direction thereof is orthogonal to the control surface 102.

By the process of step S12, the second virtual camera is moved in accordance with the change of the control surface 102 so that the positional relationship between the control surface 102 and the second virtual camera is kept constant. Thus, since the correspondence between the touch position and the control position does not change irrespective of the attitude of the control surface 102, it is possible to improve the controllability of the touch operation on the touch panel 63.

As a specific process of step S12, the CPU 10 reads out the control surface data 121 from the main memory, and calculates the position and the attitude of the second virtual camera based on the attitude of the control surface 102. Then, data representing the position and the attitude which have been calculated is stored in the main memory as the second camera data 120. The process of step S13 is performed, following step S12.

In step S13, the CPU 10 determines whether there has been an input on the touch panel 63 (a touch input). Specifically, the CPU 10 reads out and references the latest touch position data 115 stored in the main memory, and determines whether the touch position data 115 represents the coordinate values of the touch position or it indicates that there has been no input. If the determination result of step S13 is affirmative, the process of step S14 is performed. If the determination result of step S13 is negative, the process of step S17 to be described below is performed.

In step S14, the CPU 10 calculates the control position on the control surface 102 based on the touch position. The control position is calculated as a position on the control surface 102 corresponding to the touch position. Specifically, the control position is calculated so that the positional relationship of the touch position with respect to the four sides of the input surface of the touch panel 63 is the same as the positional relationship of the control position with respect to the four sides of the control surface 102.

As a specific process of step S14, the CPU 10 first reads out the latest touch position data 115 stored in the main memory, and converts the touch position represented by the touch position data 115 into coordinates of a two-dimensional coordinate system representing a position on the control surface 102. Then, the CPU 10 converts the two-dimensional coordinates obtained through the conversion into three-dimensional coordinates representing a position in the three-dimensional game space. The three-dimensional coordinates can be calculated by using the coordinates of the two-dimensional coordinate system and a formula of a plane representing the control surface 102 (the control surface data 121). That is, the CPU 10 reads out the control surface data 121 from the main memory, and calculates the three-dimensional coordinates based on the two-dimensional coordinates and the control surface data 121. The three-dimensional coordinates thus calculated represent the control position. The process of step S15 is performed, following step S14 described above.

In step S14, the control position is preferably calculated so that the touch position is the control position on the screen of the lower LCD 62. Then, the player can more easily grasp the control position in the virtual game space, and can more easily specify a control direction. In the present embodiment, the shape (aspect ratio) of the input surface of the touch panel 63 and the shape (aspect ratio) of the control surface 102 are made equal to each other, and the input surface of the touch panel 63 and the control surface 102 are made to coincide with each other on the screen of the lower LCD 62. Then, by calculating the control position as described above, the touch position and the control position can be made to correspond to each other on the screen of the lower LCD 62. In other embodiments, the method for calculating the control position from the touch position may be any method, and it may be such a method that the touch position and the control position do not correspond to each other on the screen.

In step S15, The CPU 10 stores data representing the control position calculated in step S14 in the main memory. When inputs are made successively on the touch panel 63, the CPU 10 stores a plurality of control positions corresponding to a predetermined number of latest touch positions. Therefore, the CPU 10 reads out the control position data 122 from the main memory, and if the control position represented by the control position data 122 is smaller than the predetermined number, the CPU 10 generates data obtained by adding a new control position (the control position calculated in step S14) to the control position represented by the control position data 122. If the control position represented by the read-out control position data 122 is greater than or equal to the predetermined number, the CPU 10 generates data obtained by removing the oldest control position from the control positions represented by the control position data 122 and adding a new control position the control position calculated in step S14). The data generated as described above is stored in the main memory as the new control position data 122. Therefore, the control position data 122 represents control positions corresponding to the touch positions which have been input within a predetermined amount of time from the present. The process of step S16 is performed, following step S15.

In step S16, the CPU 10 calculates the position and the attitude of the shuriken 101 in the game space. In the period from when the input is made on the touch panel 63 until the shuriken 101 is launched, the shuriken 101 is placed at the control position in an attitude in accordance with the control surface 102. That is, the CPU 10 reads out the control surface data 121 and the control position data 122 from the main memory, and calculates the position and the attitude of the shuriken 101. Data representing the position and the attitude which have been calculated is stored in the main memory as the object data 124. While the shuriken 101 is placed/displayed on the control surface 102 during a period in which an input is being made on the touch panel 63 in the first example, the shuriken 101 may not be placed/displayed during the period in other embodiments. In other embodiments, the CPU 10 may only control the position of the shuriken 101 in accordance with the control position while the attitude of the shuriken 101 is not controlled (the attitude may be fixed). The CPU 10 ends the game control process after step S16.

If the determination result of step S16 is negative, the process of step S17 is performed. In step S17, the CPU 10 (determines whether there has been a touch input in the previous iteration of the process loop (the process loop including a series of processes of steps S2 to S8). The determination of step S17 can be made based on whether the control position data 122 is stored in the main memory, for example. The determination may be made as to whether touch inputs have been made successively a predetermined number of previous iterations, instead of making the determination as to only the previous touch input. If the determination result of step S17 is affirmative, the process of step S18 is performed. If the determination result of step S17 is negative, the CPU 10 skips the processes of steps S11 to S20 and ends the game control process.

In step S18, the CPU 10 calculates the control direction. In the present embodiment, the control direction (control direction vector) is calculated as a vector representing the average velocity of control positions. That is, the CPU 10 reads out the control position data 122 from the main memory, and calculates a vector representing the average velocity from a plurality of control positions represented by the control position data 122. Specifically, a vector representing the average velocity can be calculated by dividing, by the number of control positions, a vector whose start point is the oldest one of the plurality of control positions and whose end point is the latest one of the plurality of control positions. Data representing the calculated vector is stored in the main memory as the control direction data 123. The process of step S19 is performed, following step S18.

Step S18 employs a method for calculating the control direction as the average velocity of the plurality of control positions represented by the control position data 122. With this method, if the player stops moving the touch position in the middle of drawing a line on the touch panel, the average velocity to be calculated may be very small. Therefore, in other embodiments, the CPU 10 may calculate the average velocity while discarding control positions that correspond to touch positions for which no movement is assumed to have been made. Specifically, in step S15, if there is no (or little) movement from the previously-calculated control position to the new control position calculated in step S14, the CPU 10 may not store the new control position. That is, the CPU 10 may not update the control position data 122 if the distance between the new control position and the previously-calculated control position is within a predetermined value.

In step S19, the CPU 10 launches the shuriken 101 in the control direction. In the present embodiment, the movement direction and the movement velocity of the shuriken 101 are determined based on the control direction vector. That is, the shuriken 101 is moved in the direction of the control direction vector by an amount of movement in accordance with the control direction vector. Specifically, in step S19, the CPU 10 reads out the object data 124 and the control direction data 123, and calculates a position obtained by moving the position represented by the object data 124 in the direction of the control direction vector by an amount of movement in accordance with the control direction vector. Then, the position represented by the object data 124 is updated to the moved position, and the updated object data is stored in the main memory. Thus, the position of the shuriken 101 is updated, meaning that the shuriken 101 has been moved in the control direction. In the present embodiment, the shuriken 101 is placed in an attitude in accordance with the control surface 102 as described above in step S16. Therefore, the shuriken 101 is launched in a direction determined by the control direction and in an attitude determined by the attitude of the control surface. If the magnitude of the control direction vector is smaller than a predetermined value, it is presumed that the player does not intend to perform an operation of drawing a line on the touch panel 63 (i.e., an operation of launching the shuriken 101). Therefore, in such a case, the CPU 10 may not launch the shuriken 101. The process of step S20 is performed, following step S19.

In step S20, the CPU 10 resets the control position. Specifically, the control position data 122 stored in the main memory is erased. Therefore, when a touch input is next made, control positions are stored afresh in step S15. After step S20, the CPU 10 ends the game control process.

With the game control process shown in FIG. 16, the attitude of the control surface 102 is controlled in accordance with the attitude of the hand-held device 9 (steps S11 and S12), and a control direction in accordance with the direction of a line inputted on the touch panel 63 is calculated on the control surface 102 (step S18). Therefore, the player can easily and intuitively specify a direction in a three-dimensional space by operating the attitude of the hand-held device 9 and by performing an operation on the touch panel 63.

In the game control process described above, the control direction is calculated as the average velocity of a plurality of control positions. The method for calculating a control direction from control positions is not limited to the method described above, but may be any method. For example, in a case in which the player makes an input by drawing a line as in the present embodiment, the CPU 10 may calculate, as the control direction vector, a vector whose end point is the latest one of a plurality of control positions represented by the control position data 122 and whose start point is the second latest control position. The player may be allowed to specify the control direction by specifying two points on the touch panel 63. That is, the CPU 10 may calculate, as the control direction vector, a vector whose start point is a control position corresponding to a touch position that is touched first and whose end point is a control position corresponding to a touch position that is touched next.

Referring back to FIG. 15, the process of step S4 is performed, following the game control process of step S3. In step S4, the CPU 10 generates the first game image. That is, the CPU 10 generates, as the first game image, an image of the game space as seen from the first virtual camera which is set in step S1. Thus, an image of the game space including the control surface 102 is generated as the first game image (see FIG. 10). If the position and the attitude of the first virtual camera do not change even if the attitude of the control surface 102 changes as in the first example, the player can easily grasp the attitude of the control surface 102 in the game space. The process of step S5 is performed, following step S4.

In step S5, the CPU 10 generates the second game image. That is, the CPU 10 generates, as the second game image, an image of the game space as seen from the second virtual camera which is set in step S12. Thus, an image of the control surface 102 is generated as the second game image (see FIG. 10). The process of step S6 is performed, following step S5.

In step S6, the CPU 10 outputs the first game image generated in step S4 to the television 2. Specifically, the CPU 10 sends the image data of the generated first game image to the AV-IC 15, and the AV-IC 15 outputs the image data to the television 2 via the AV connector 16. Thus, the first game image is displayed on the television 2. The process of step S7 is performed, following step S6.

In step S7, the CPU 10 outputs the second game image generated in step S5 to the hand-held device 9. Specifically, the image data of the second game image is sent to the image compression section 27 by the CPU 10, and is subjected to a predetermined compression process by the image compression section 27, after which it is transmitted to the hand-held device 9 via the antenna 29 by the high-speed wireless communication module 28. The hand-held device 9 receives the image data transmitted from the game device 3 by the wireless communication module 86, and performs a predetermined expansion process using the image expansion section. The expanded image data is stored as necessary by the CPU 811 in the VRAM 813 and output to the lower LCD 62. Thus, the second game image is displayed on the lower LCD 62. The process of step S8 is performed, following step S7.

In step S8, the CPU 10 determines whether the game should be ended. The determination of step S7 is made based on, for example, whether the game is over, the player has given an instruction to quit the game, etc. If the determination result of step S8 is negative, the process of step S2 is performed again. If the determination result of step S8 is affirmative, the CPU 10 ends the game process shown in FIG. 15. The series of processes through steps S2 to S8 is repeatedly performed until it is determined in step S8 that the game should be ended.

With the game process of the first example described above, the attitude of the control surface 102 is determined by the attitude of the hand-held device 9, and the control direction on the control surface 102 is determined based on the input on the touch panel. Then, the shuriken 101 is launched in the determined control direction. Thus, according to the present embodiment, the player can easily specify a direction in a three-dimensional space using the touch panel 63 through an intuitive operation.

Since the game process of the first example calculates the control direction vector on the control surface 102, it is possible to control the amount of movement, in addition to the movement direction, of an object with the control direction vector. Therefore, it is possible to control an object in a more detailed manner using the hand-held device 9.

With the game process of the first example, an image including the control surface 102 is displayed on the television 2 as the first game image, the player can check the attitude and the launch direction of the shuriken 101 by the first game image, and it is therefore possible to more easily perform the operation.

(Outline of Game of Second Example)

Next, the second game will be outlined. This game is a game in which an object (cannonball) is launched in the game space by operating the hand-held device 9. The player can specify the direction in which the cannonball is launched by specifying (touching) a position on the touch panel 63 while changing the attitude of the hand-held device 9.

Figure 17:
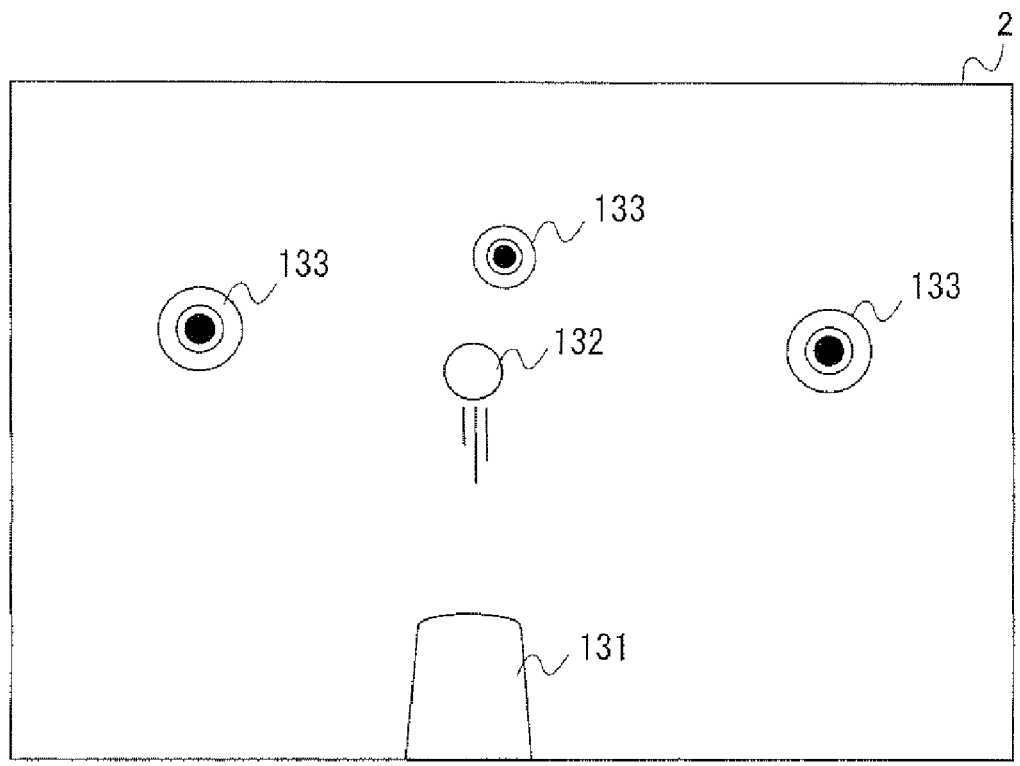
FIG. 17 is a diagram showing the screen of the television and the hand-held device in the first example.
Figure 17:
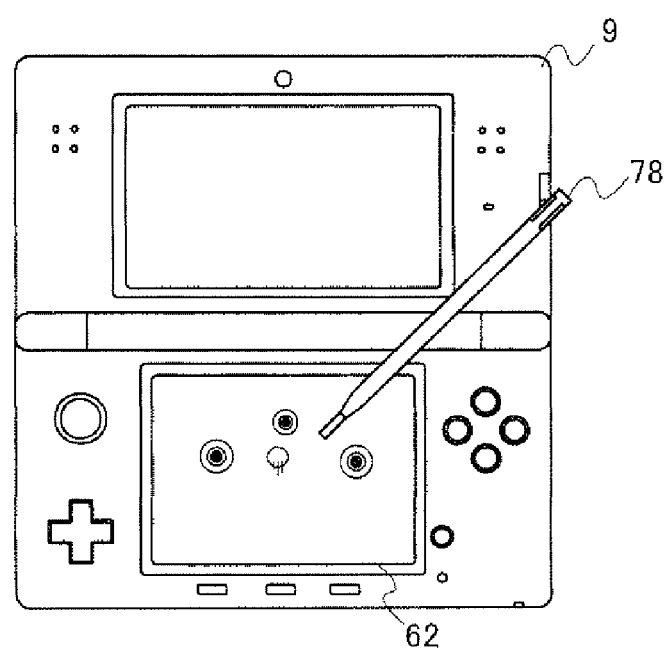

FIG. 17 is a diagram showing the screen of the television 2 and the hand-held device 9 in the second example. In FIG. 17, an image of the game space is displayed as the game image on the television 2 and the lower LCD 62 of the hand-held device 9. A cannon 131, a cannonball 132 and a target 133 are displayed on the television 2. The cannonball 132 and the target 133 are displayed on the lower LCD 62. In FIG. 17, the second game image displayed on the lower LCD 62 is an image of the game space as seen from the position of the cannon 131. Also in the second example, a control surface is set in the game space as in the first example, but the control surface is not displayed as opposed to the first example. Therefore, in the present example, the player can play the game from a subjective viewpoint while looking at the lower LCD 62 of the hand-held device 9. Although the image displayed on the television 2 may be an image seen from the same viewpoint as the lower LCD 62, it is possible to provide a game that makes use of two screens if an image seen from a different viewpoint is displayed. For example, if an area that cannot be seen on the lower LCD 62 is displayed on the television 2, it is possible to realize such gameplay that the player can look at the television 2 and aim at an area that cannot be seen from the subjective viewpoint while hiding himself/herself. Although the gameplay will be different, an image from the subjective viewpoint may be displayed on the television 2, while the hand-held device is not provided with a screen and receives inputs on the touch pad.

When launching the cannonball 132 from the cannon 131, the player first operates the attitude of the hand-held device 9 to change the attitude of the control surface to an intended attitude. That is, also in the second example, the attitude of the control surface is determined in accordance with the attitude of the hand-held device 9 as in the first example. In the second example, the position of the control surface changes (moves) in accordance with the attitude of the control surface, the details of which will be described later.

In the second example, the player further performs an operation of touching an intended position on the touch panel 63 as shown in FIG. 17. Through this operation, a position in the game space corresponding to the touch position (the control position on the control surface) is determined. Also in the second example, the method for determining the control position is similar to the first example.

Figure 18:
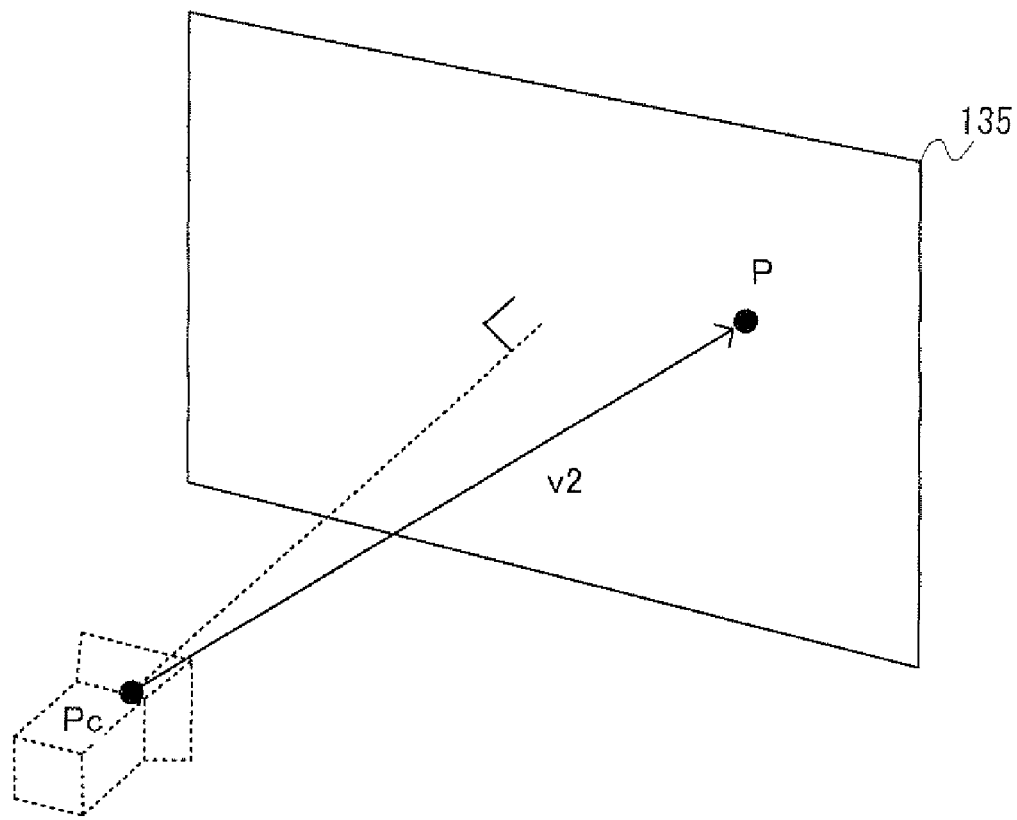
FIG. 18 is a diagram showing a virtual camera and a control surface in a game space.

In the second example, the control direction is determined as a direction from the position of the second virtual camera to the control position. FIG. 18 is a diagram showing a virtual camera and a control surface in the game space. In FIG. 18, the point P represents the control position which is set on a control surface 135, and the vector v2 represents the control direction. In the second example, as shown in FIG. 18, the control direction (the control direction vector v2) is calculated based on the position. Pc of the second virtual camera and the control position P. Specifically, the control direction vector v2 is calculated as a vector whose start point is the position Pc of the second virtual camera and whose end point is the control position P. The cannonball 132 is launched in the calculated control direction.

As described above, in the second example, the player can shoot the cannonball 132 in an intended direction by operating the attitude of the hand-held device 9 and specifying a position on the touch panel 63. Therefore, in the second example, as in the first example, the player can easily specify a direction in a three-dimensional space using the touch panel 63 through an intuitive operation. Since the operation of the attitude of the hand-held device 9 and the input operation on the touch panel 63 can be done simultaneously in parallel, the player can quickly perform an operation of specifying a direction in a three-dimensional space.

(Game Process in Second Example)

Next, the details of the game processes of the second example will be described. First, referring to FIG. 14, various data used in the game process of the second example will be described focusing on differences from the first example.

Figure 19:
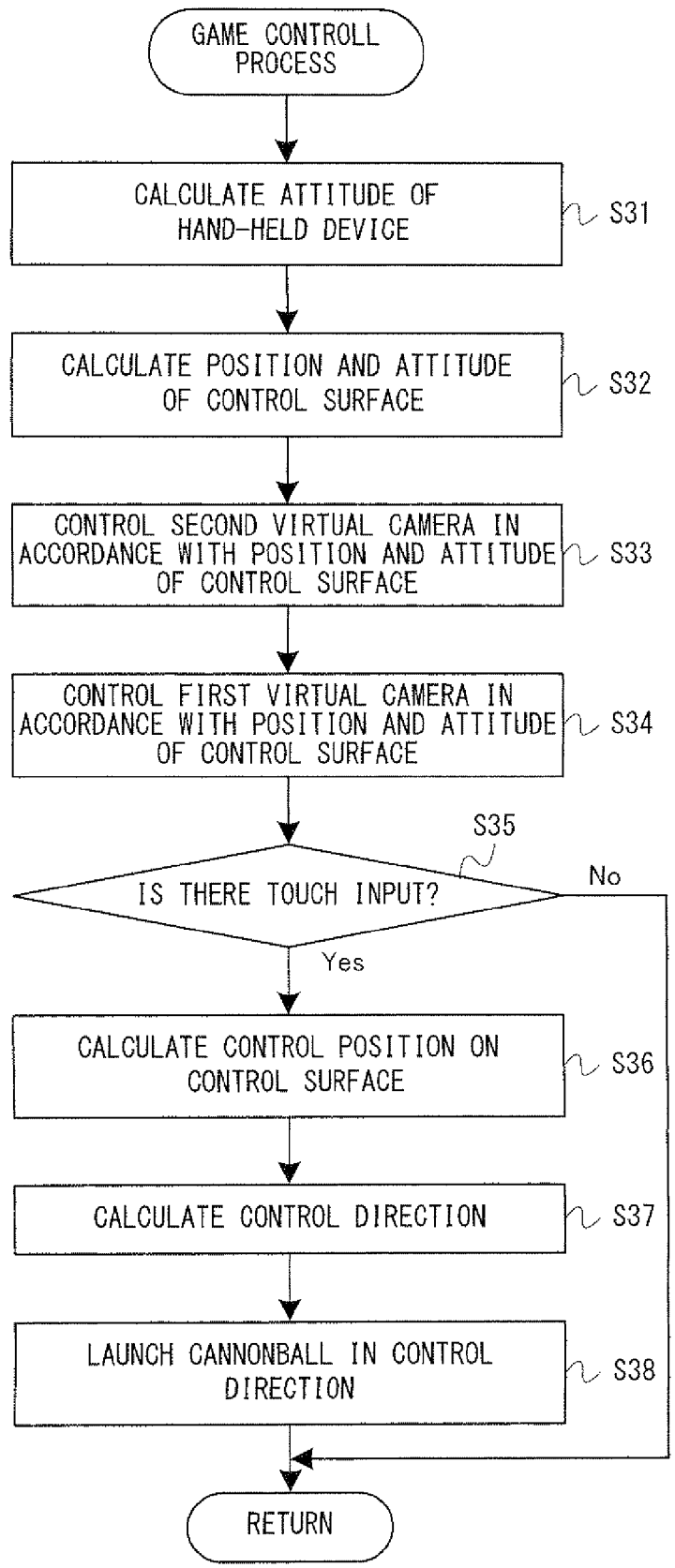
FIG. 19 is a flow chart showing a detailed flow of game control processes in a second example.

In the second example, a game program for performing a game process shown in FIG. 19 is stored in the game program 110. The first operation data 111 and the second operation data 112 are similar to those of the first game.

As the process data 117, data similar to that of the first example is stored also in the second example. Note however that the control position data 122 may be data that represents one latest control position in the second example. The object data 124 represents the position of the cannonball 132.

Figure 20:
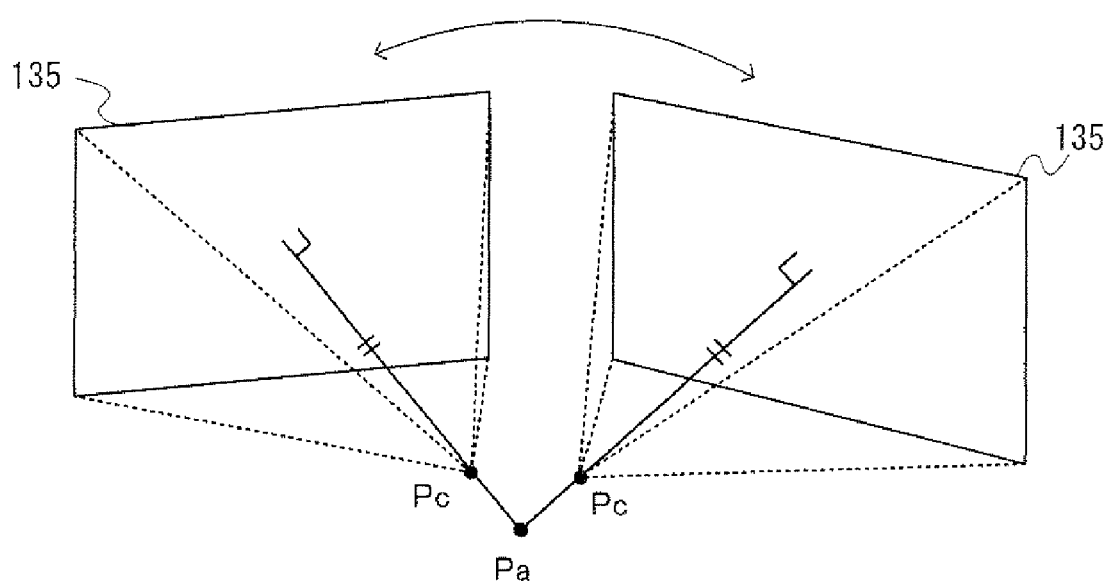
FIG. 20 is a diagram showing how the position and the attitude of the control surface change.

Next, the details of the game process in the second example will be described with reference to FIGS. 15, 19 and 20. Also in the second example, as in the first example, the process of steps S1 to S8 shown in FIG. 15 is performed. The game process of the second example will now be described focusing on differences from the game process of the first example.

In step S1, the CPU 10 performs an initialization process similar to that of the first example. Note however that in the second example, the first virtual camera is controlled in accordance with the position and the attitude of the control surface (step S34 to be described below), and therefore the position and the attitude of the first virtual camera are not set in the initialization process. The process of step S2 in the second embodiment is similar to that of the first embodiment.

In step S3, the CPU 10 performs the game control process. The game control process of the second example is a process for allowing the game to progress by, for example, performing processes such as controlling the action of an object (the cannonball 132, etc.) in the game space in accordance with operations by the player. The details of the game control process of the second example will now be described with reference to FIG. 19. The game control process will be described below, focusing on the process relating to the calculation of the control direction, and processes that can be performed in a manner similar to the conventional processes will not be described in detail. For example, the detailed description will be omitted for the process relating to the movement control of the cannonball 132 after the cannonball 132 is launched in accordance with the control direction, the process for determining whether the cannonball 132 has hit the target 133, the process of calculating the score when the cannonball 132 has hit the target 133, etc., because these operations can be performed in a manner similar to the conventional processes.

FIG. 19 is a flow chart showing a detailed flow of game control processes of the second example. In the game control process, first, in step S31, the CPU 10 calculates the attitude of the hand-held device 9. The process of step S31 is the same as the process of step S10 of the first example. The process of step S32 is performed, following step S31.

In step S32, the CPU 10 calculates the position and the attitude of the control surface 135 based on the attitude of the hand-held device 9. The process of calculating the attitude of the control surface 135 based on the attitude of the hand-held device 9 is the same as the process of step S11 of the first example. That is, also in the second example, the attitude of the control surface 135 in the game space is set so as to correspond to the attitude of the hand-held device 9 in the real space.

The position of the control surface 135 is calculated as follows in accordance with the attitude of the control surface 135. FIG. 20 is a diagram showing how the position and the attitude of the control surface 135 change. In FIG. 20, the point Pa is a reference point for determining the position of the control surface 135 and is set fixedly in the game space. As shown in FIG. 20, when the attitude of the hand-held device 9 changes, the position of the control surface 135 changes as if to rotate about the reference point Pa as the attitude changes. Specifically, the position of the control surface 135 is calculated so that the length of the perpendicular from the reference point Pa to the control surface 135 is equal to a predetermined value (i.e., so that the distance from the reference point Pa is constant).

As a specific process of step S32, the CPU 10 first calculates the attitude of the control surface 135 by a method similar to step S11. Then, the CPU 10 calculates the position of the control surface 135 based on the calculated attitude and the position of the reference point Pa so that the length of the perpendicular is equal to the predetermined value. Data representing the position and the attitude of the calculated control surface 135 is stored in the main memory as the control surface data 121. The process of step S33 is performed, following step S32.

With the process of step S32, the control surface 135 is controlled so that the position of the control surface 135 changes together with the attitude thereof. By changing the position of the control surface 135 in accordance with the attitude of the hand-held device 9 in an arc about the position of the second virtual camera (or the position of a reference point), the player can perform game operations with such gameplay as if the player were looking around from a predetermined position. In other examples, it is possible to realize such gameplay as if to look at a particular position in the virtual space from different angles, for example. That is, the position of the second virtual camera may be changed in accordance with the attitude of the hand-held device 9 without changing the position of the control surface 135. The position of the control surface 135 and the position of the second virtual camera may be allowed to move in accordance with the attitude so that the player can perform game operations with such gameplay that the player can also change the line-of-sight direction while changing the viewpoint moving around in the virtual space.

In step S33, the CPU 10 controls the second virtual camera in accordance with the position and the attitude of the control surface 135. The point Pc shown in FIG. 20 is a point representing the position of the second virtual camera. As shown in FIG. 20, the second virtual camera is controlled so that the control surface 102 is included in the range of viewing field (more specifically, so that the periphery of the control surface 135 and the perimeter of the range of viewing field of the second virtual camera coincide with each other). Therefore, the position of the second virtual camera is calculated so as to be along a straight line passing through the reference point Pa and the center of the control surface 135 and so that the distance from the control surface 135 is in accordance with the range of viewing field. The second virtual camera only needs to be along the straight line, and it may be at a position behind the reference point Pa (on the side farther away from the control surface 135) depending on the range of viewing field (viewing angle).

By setting the second virtual camera as described above, the control surface 135 is displayed on the lower LCD 62 so that the input surface of the touch panel 63 and the control surface 135 coincide with each other on the screen (see FIG. 17). Then, the cannonball 132 is launched toward a position in the game space corresponding to the position touched by the player, and it is therefore possible to provide intuitive and easy-to-understand game operations. Also in the second example, as in the first example, the second virtual camera is moved around in accordance with the change of the control surface 102 so that the positional relationship between the control surface 102 and the second virtual camera is constant.

As a specific process of step S33, the CPU 10 reads out the control surface data 121 from the main memory, and calculates the position and the attitude of the second virtual camera based on the position and the attitude of the control surface 135. Then, data representing the position and the attitude which have been calculated is stored in the main memory as the second camera data 120. The process of step S34 is performed, following step S33.

In step S34, the CPU 10 controls the first virtual camera in accordance with the position and the attitude of the control surface 135. In the second example, the first virtual camera is included in the range of viewing field of the control surface 135 and is controlled so as to be at a position different from the second virtual camera (see FIG. 17). Specifically, the first virtual camera is placed so as to face toward the control surface 135 from a position slightly behind the cannon 131 so that the cannon 131 is displayed. It is assumed that the cannon 131 is placed at the position of the second virtual camera. As a specific process, the CPU 10 reads out the control surface data 121 from the main memory and calculates the position and the attitude of the first virtual camera so that the position and the attitude are in accordance with the position and the attitude of the control surface 135. Then, data representing the position and the attitude which have been calculated is stored in the main memory as the first camera data 119. The process of step S35 is performed, following step S34.

With the process of step S34, the first virtual camera is placed at a position different from the second virtual camera. Thus, the player can see the game space as seen from two different viewpoints, and can more easily perform the game operations. For example, since the first virtual camera is placed so as to capture an image of a larger area of the game space than the second virtual camera in the second example (see FIG. 17), the player can more easily grasp how things are in the game space (the placement of the objects, etc.) by looking at the first game image.

By making the positions of the two virtual cameras different from each other, it is possible to also improve the playability of the game. For example, if a wall is placed between the cannon 131 and the target 133 (so that the target 133 are not seen from the second virtual camera) with the first virtual camera placed at a position above the wall where the target 133 can be seen, the target 133 can be displayed only on the television 2. In this case, the player performs game operations while visually comparing the screen of the hand-held device 9 and the screen of the television 2 with each other, and the playability of the game can be thus enhanced. In other embodiments, the position and the attitude of the first virtual camera may be controlled in any way, and the first virtual camera may be placed at such a position the control surface 135 cannot be seen or the position and the attitude thereof may be set to be equal to those of the second virtual camera (i.e., only one virtual camera may be set).

In step S35, the CPU 10 determines whether there has been an input on the touch panel 63 (a touch input). The process of step S35 is the same as the process of step S13 of the first example. If the determination result of step S35 is affirmative, the process of step S36 is performed. If the determination result of step S35 is negative, the CPU 10 ends the game control process.

In step S36, the CPU 10 calculates the control position on the control surface 135 based on the touch position. The method for calculating the control position of step S36 is the same as the calculation method of step S14 of the first example. In the second example, the control direction is calculated based on the latest control position. Therefore, in step S36, the CPU 10 stores data representing the calculated control position in the main memory as the control position data 122. The process of step S37 is performed, following step S36.

In step S37, the CPU 10 calculates the control direction based on the control position calculated in step S36. The control direction is calculated as a direction that connects between a predetermined position in the game space and the control position. In the second example, the control direction is calculated as a direction from the position of the second virtual camera (the cannon 131) to the control position (see FIG. 18). Specifically, the CPU 10 reads out the second camera data 120 and the control position data 122 from the main memory, and calculates the control direction vector v2 whose start point is the position of the second virtual camera and whose end point is the control position. Data representing the calculated control direction vector v2 is stored in the main memory as the control direction data 123. The process of step S38 is performed, following step S37.

In step S37, the position of the second virtual camera is used as the predetermined position. In other embodiments, the predetermined position may be a different position. For example, the predetermined position may be the position of the reference point Pa shown in FIG. 20, or the position of a particular object. If a position other than the position of the virtual camera is used as the predetermined position, the object (the cannonball 132) appears to be launched from a position different from the viewpoint. If the start point of the control direction is made to coincide with the viewpoint of the second game image as in the second example, the player can perform an operation of launching the cannonball from a subjective viewpoint, and it is possible to provide easier game operations.

In step S38, the CPU 10 launches the cannonball 132 in the control direction calculated in step S37. In the second example, the cannonball 132 is moved in a predetermined movement direction with a predetermined velocity (a predetermined amount of movement). The predetermined movement direction is a direction determined by the control direction, and is a direction that is facing upward by a predetermined angle from the control direction. In the second example, it is assumed that the launched cannonball 132 is controlled so as to describe a parabola taking gravity into consideration. In a case in which the cannonball 132 flies so as to describe a parabola, if the cannonball 132 is launched in the control direction, the player may feel that the cannonball 132 is launched in a direction slightly downward from the control direction. Therefore, in the second example, the CPU 10 launches the cannonball 132 in a direction that is more upward than the control direction by a predetermined angle. Thus, the movement direction of the object may be any direction that is determined by the control direction, and does not need to coincide with the control direction.

As a specific process of step S38, the CPU 10 reads out the control direction data 123, and calculates the movement direction of the cannonball 132 from the control direction. Then, the CPU 10 reads out the object data 124 and calculates a position obtained by moving the position represented by the object data 124 by a predetermined amount of movement in the movement direction calculated. Then, the position represented by the object data 124 is updated to the moved position, and the updated object data is stored in the main memory. Thus, the position of the cannonball 132 is updated, meaning that the cannonball 132 has been moved in the control direction. After step S38, the CPU 10 ends the game control process.

Following the game control process, the process of steps S3 to S8 is performed also in the second example as in the first example. That is, the first game image is generated in step S4, and the second game image is generated in step S5. Moreover, the first game image is displayed on the television 2 in step S6, and the second game image is displayed on the lower LCD 62 of the hand-held device 9 in step S7. In the second example, the game space is displayed (the control surface 135 is not displayed) on the lower LCD 62 so that the input surface of the touch panel 63 and the control surface 135 coincide with each other on the screen, and the game space of a wider area than the lower LCD 62 is displayed on the television 2 (see FIG. 17). It is determined in step S8 whether the game should be ended, and the series of processes through steps S2 to S8 is repeatedly performed until it is determined in step S8 that the game should be ended.

With the game process of the second example described above, the attitude of the control surface 135 is determined by the attitude of the hand-held device 9, and the control position on the control surface 102 is determined based on the input on the touch panel. Then, the cannonball 132 of the cannon 131 is launched in the control direction determined by the control position. Thus, according to the present embodiment, the player can easily specify a direction in a three-dimensional space using the touch panel 63 through an intuitive operation.

7. Other Embodiments

The above embodiment is an example of how the present invention can be carried out, and the present invention may also be carried out with, for example, the following configurations in other embodiments.

(Variation Regarding Configuration of Game System)

The above embodiment is directed to an example of the hand-held device 9 which includes display devices (the lower LCD 62 and the upper LCD 72), the hand-held device 9 may include no display device. That is, the game system 1 is only required to output game images to a display device (the television 2) which is separate from the hand-held device 9, and does not need to include two display sections. While the television 2 is used as an example of the "separate display device" in the above embodiment, the display device may be integral with the game device 3.

(Variation Regarding Game Process Based on Control Direction)

In the examples above, the CPU 10 performs a game process in which the movement direction of a predetermined object (the shuriken 101 or the cannonball 132) in the game space is controlled based on the control direction. The game process is not limited to the game process for controlling the movement direction of an object, and the CPU 10 may perform any game process based on the control direction. For example, in other embodiments, the CPU 10 may perform a predetermined process on an object that is placed along a straight line extending from a predetermined position (e.g., from the position of the virtual camera) to the control direction.

(Variation Regarding Input Section, of Touch Position)

While the above embodiment is directed to an example in which the hand-held device 9 includes the touch panel 63, the hand-held device 9 may include a touch pad as described above. If the hand-held device 9 includes a touch pad, the hand-held device 9 may or may not include a display device.

The touch panel or the touch pad may be those of a type (so-called multi-touch) capable of detecting a plurality of touch positions that are inputted simultaneously. In this case, in the examples described above, the CPU 10 may calculate the control position and the control direction for each touch position. Specifically, in the game control process shown in FIG. 16, the CPU 10 may perform the process of steps S14 to S16 and the process of steps S18 to S20 for each touch position. In the game control process shown in FIG. 19, the CPU 10 may perform the process of steps S36 to S38 for each touch position.

(Variation Regarding Operation on Hand-Held Device 9)

In the examples described above, the control surface is controlled by an operation of tilting (changing the attitude of) the hand-held device 9 itself. That is, the CPU 10 calculates the attitude of the hand-held device 9 based on data whose values change in accordance with the movement of the hand-held device 9 (the acceleration data 113 and the angular velocity data 114), and controls the control surface based on the attitude of the hand-held device 9. The control surface may be controlled so that at least the attitude thereof changes in accordance with the movement of the hand-held device 9. For example, in other embodiments, the control surface may be controlled in accordance with the change in the position of the hand-held device 9. Specifically, the CPU 10 can calculate the change in the position of the hand-held device 9 based on an acceleration obtained by removing the gravitational acceleration from the acceleration represented by the acceleration data 113. Therefore, for example, in the process of step S11 or S32, the CPU 10 may change the position and/or the attitude of the control surface in accordance with the change in the position of the hand-held device 9 (e.g., the control surface may be tilted in a direction in accordance with the direction in which the position of the hand-held device 9 has changed). Then, the position and/or the attitude of the control surface can be changed by moving the hand-held device 9 up, down, left or right.

(Variation Regarding Device for Performing Game Process)

While the game device 3 performs the series of game processes shown in FIG. 16 in the above embodiment, some of the game processes may be performed by another device. For example, in other embodiments, some of the game processes (e.g., the process of generating the second game image) may be performed by the hand-held device 9. In other embodiments, in a game system including a plurality of information processing devices that can communicate with each other, the game processes may be divided among the plurality of information processing devices. As described above, the game system including a game device and a hand-held device having a predetermined input surface may include: (a) an obtaining section for obtaining operation data which includes touch data representing a player input position on the predetermined input surface and movement data whose value changes in accordance with movement of the hand-held device; (b) a surface control section for controlling an attitude of a control surface placed in a three-dimensional game space based on the movement data; (c) a direction calculation section for calculating a control direction in the game space based on the attitude of the control surface and the touch data; (d) a game process section for performing a game process based on the control direction; (e) a first image generation section for generating a first game image representing the game space based on a first virtual camera which is set in the game space; and (f) a first image output section for outputting the first game image to a first display device which is separate from the hand-held device. A single device may include the sections (a) to (f) above, or a plurality of devices may include the sections (a) to (f) above.

(Variation Regarding Configuration of Hand-Held Device)

The hand-held device 9 of the above embodiment is an example, the shape of each operation button of the hand-held device 9, the shape of the housing 50, and the number and the positions of the components, etc., are merely illustrative, and the present invention can be realized with other shapes, numbers, and positions. For example, the hand-held device may be such a terminal device as illustrated below. A variation of the hand-held device will now be described with reference to FIGS. 21-27.

[4. Configuration of Terminal Device 200]

Figure 21:
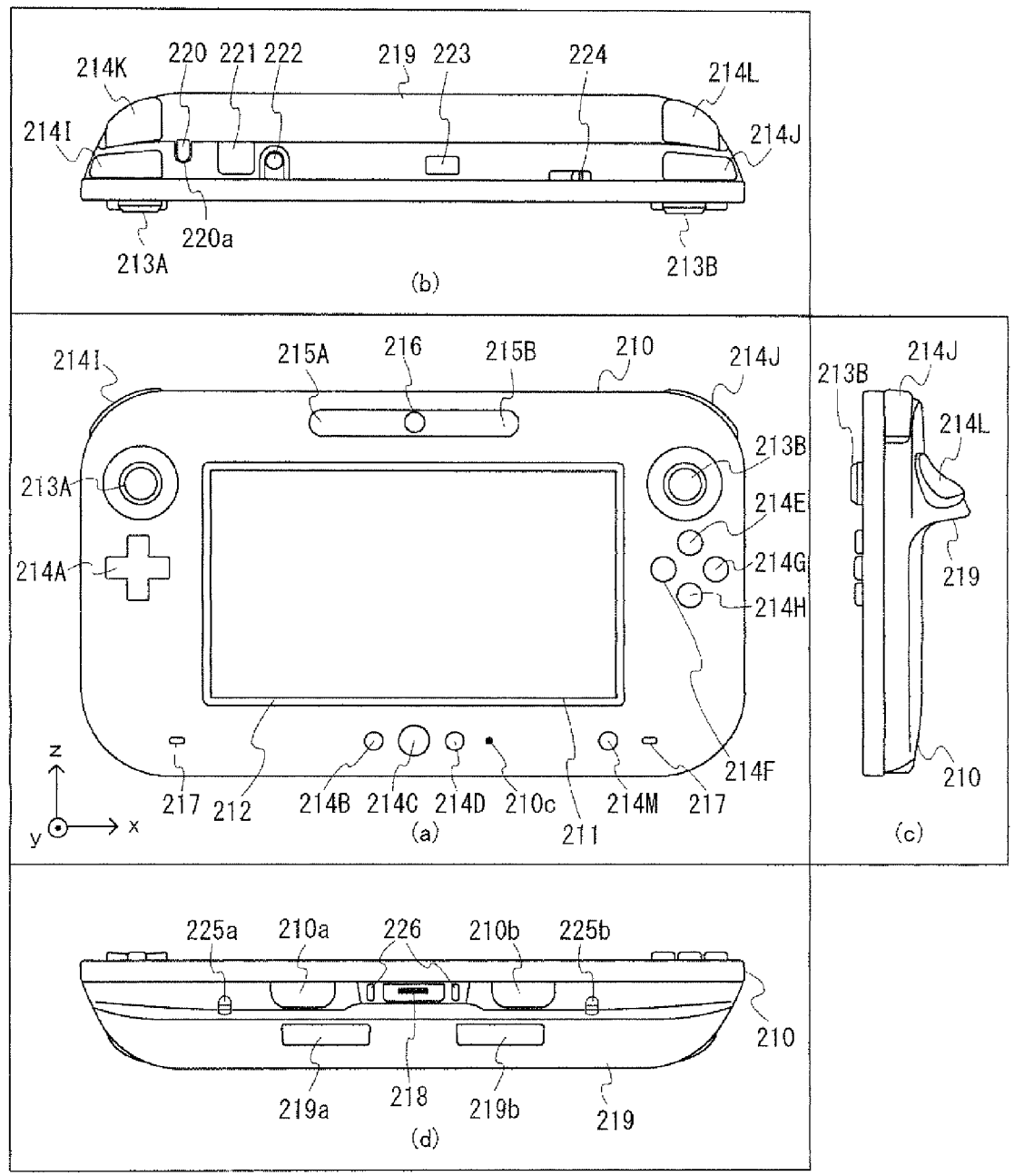
FIG. 21 is a diagram showing an external configuration of a terminal device according to a variation of the above embodiment.
Figure 22:
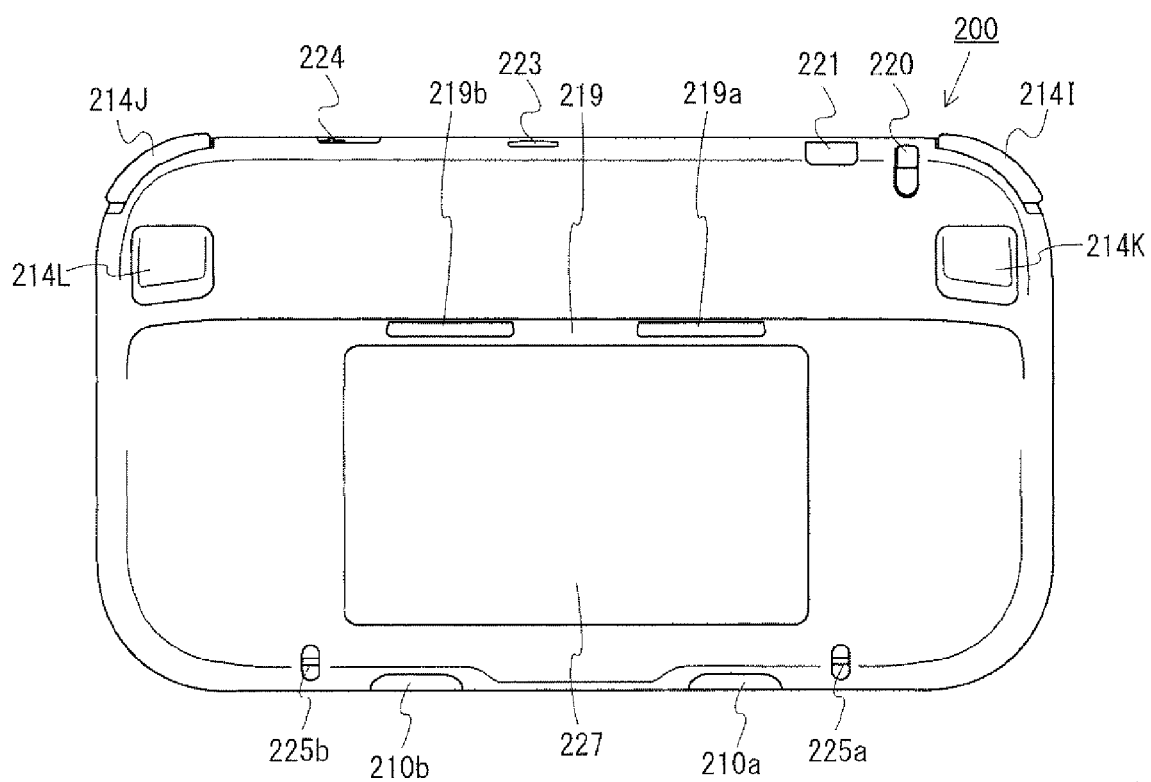
FIG. 22 is a diagram showing an external configuration of a terminal device according to a variation of the above embodiment.
Figure 23:
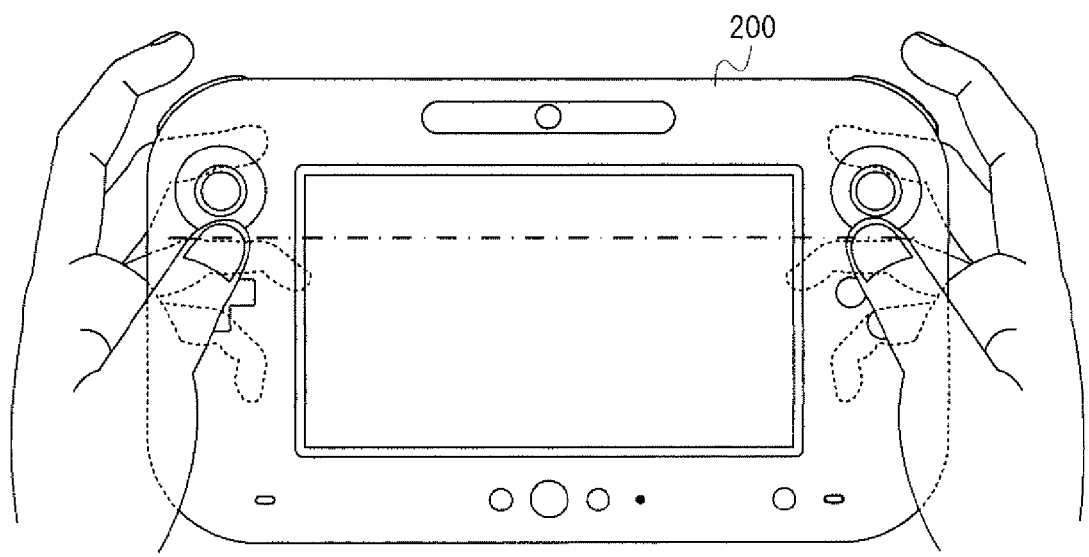
FIG. 23 is a diagram showing a user holding the terminal device in a landscape position.
Figure 24:
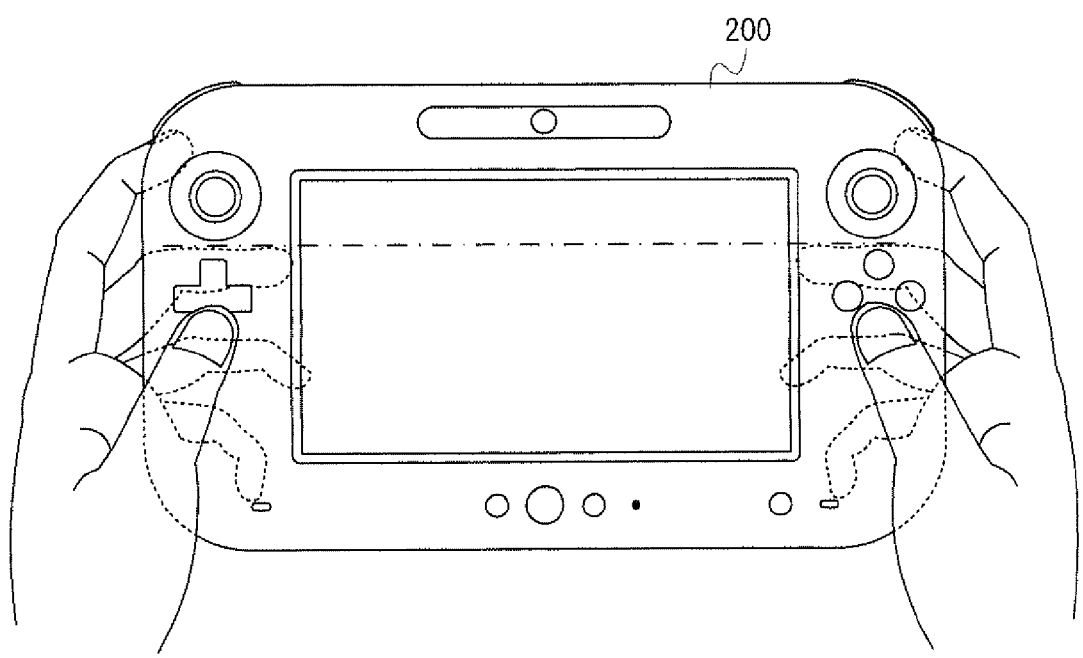
FIG. 24 is a diagram showing a user holding the terminal device in a landscape position.
Figure 25:
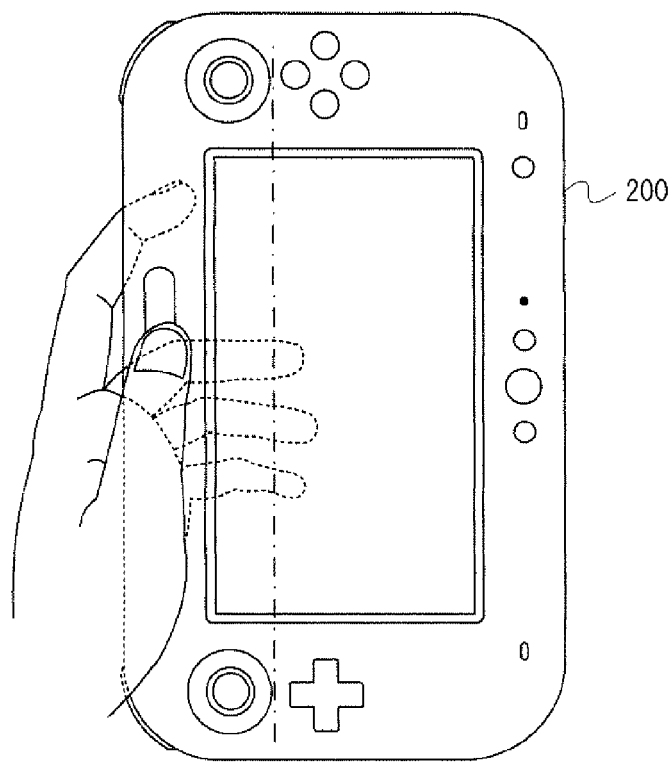
FIG. 25 is a diagram showing a user holding the terminal device in a portrait position.
Figure 26:
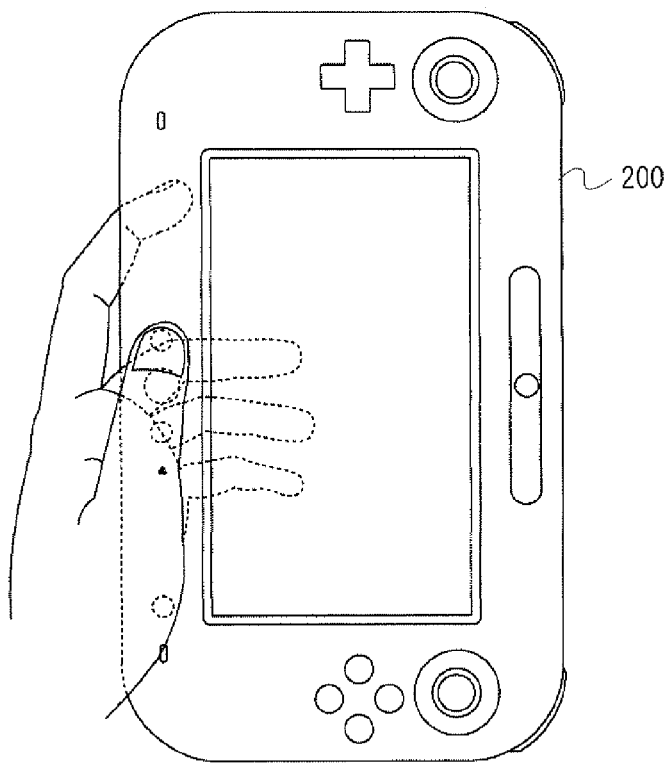
FIG. 26 is a diagram showing a user holding the terminal device in a portrait position.

First, an external configuration of a terminal device according to a variation of the embodiment above will be described with reference to FIGS. 21 to 26. FIG. 21 is a plan view showing an external configuration of a terminal device 200. FIG. 21(*a*) is a front view of the terminal device 200, FIG. 21(*b*) is a top view thereof, FIG. 21(*c*) is a right side view thereof, and FIG. 21(*d*) is a bottom view thereof. FIG. 22 is a back view of the terminal device 200. FIGS. 23 and 24 are diagrams showing a user holding the terminal device 200 in a landscape position. FIGS. 25 and 26 are diagrams showing a user holding the terminal device 200 in a portrait position.

As shown in FIG. 21, the terminal device 200 includes a housing 210 generally in a horizontally-elongated rectangular plate shape. That is, it can also be said that the terminal device 200 is a tablet-type information processing device. The housing 210 may have a curved surface or may have some protrusions, etc., as long as it is generally in a plate shape. The housing 210 is sized so that it can be held by the user. Thus, the user can hold and move the terminal device 200, and can change the position in which the terminal device 200 is placed. The longitudinal (z-axis direction) length of the terminal device 200 is preferably 100 to 150 [mm], and is 133.5 [mm] in the present embodiment. The widthwise (x-axis direction) length of the terminal device 200 is preferably 200 to 250 [mm], and is 228.26 [mm] in the present embodiment. The thickness (the length in the y-axis direction) of the terminal device 200 is preferably about 15 to about 30 [mm] in a plate-shaped portion and about 30 to about 50 [mm] including the thickest part, and is 23.6 (40.26 in the thickest part) [mm] in the present embodiment. The weight of the terminal device 200 is about 400 to about 600 [g], and is 530 [g] in the present embodiment. Although the details will be described later, the terminal device 200 is configured so that it is easily held and operated by the user even though it is such a relatively large terminal device (controller device) as described above.

The terminal device 200 includes an LCD 211 on the front surface (front side) of the housing 210. The size of the screen of the LCD 211 is preferably 5 inches or larger, and is herein 6.2 inches. The terminal device 200 of the present embodiment has such a configuration that it is easily held and operated, and it is therefore easy to operate even if a large LCD is provided. In other embodiments, the terminal device 200 may be of a relatively small size with the provision of a smaller LCD 211. The LCD 211 is provided near the center of the surface of the housing 210. Therefore, the user can hold and move the terminal device 200 while looking at the screen of the LCD 211 by holding opposing end portions of the housing 210 with respect to the LCD 211, as shown in FIGS. 23 and 24. While FIGS. 23 and 24 show an example in which the user holds the terminal device 200 in a landscape position (in a horizontally-oriented direction) by holding left and right opposing end portions of the housing 210 with respect to the LCD 211, the user can hold the terminal device 200 in a portrait position (in a vertically-oriented direction) as shown in FIGS. 25 and 26.

As shown in FIG. 21(*a*), the terminal device 200 includes a touch panel 212 on the screen of the LCD 211 as an operation mechanism. In the present embodiment, the touch panel 212 is a resistive-type touch panel. However, the touch panel is not limited to the resistive type, and may be a touch panel of any type including, for example, a capacitive type, etc. the touch panel 212 may be of a single-touch type or a multi-touch type. In the present embodiment, a touch panel having the same resolution, (detection precision) as the resolution of the LCD 211 is used as the touch panel 212. However the resolution of the touch panel 212 does not always need to coincide with the resolution of the LCD 211. While a touch pen 220 is usually used for making inputs on the touch panel 212, the present invention is not limited to using the touch pen 220, and an input may be made on the touch panel 212 with a finger of the user. The housing 210 is provided with a hole 220*a* for accommodating the touch pen 220 used for performing operations on the touch panel 212 (see FIG. 21(*b*)). While the hole 220*a* is provided on the upper surface of the housing 210 so that the touch pen 220 does not fall, it may be provided on the side surface or the bottom surface. Thus, since the terminal device 200 includes the touch panel 212, the user can operate the touch panel 212 while moving the terminal device 200. That is, the user can move the screen of the LCD 211 while directly (by means of the touch panel 212) making an input on the screen.

As shown in FIG. 21, the terminal device 200 includes two analog sticks 213A and 213B and a plurality of buttons (keys) 214A to 214M, as operation mechanisms (operation sections). The analog sticks 213A and 213B are each a direction-specifying device. The analog sticks 213A and 213B are each configured so that the movable member (stick portion) operated with a finger of the user can be slid in any direction (at any angle in the up, down, left, right and diagonal directions) with respect to the surface of the housing 210. That is, it is a direction input device which is also called a slide pad. The movable member of each of the analog sticks 213A and 213B may be of such a type that it is tilted in any direction with respect to the surface of the housing 210. Since the present embodiment use analog sticks of such a type that the movable members slide, the user can operate the analog sticks 213A and 213B without significantly moving the thumbs, and therefore operations can be made while the housing 210 is held more firmly. When analog sticks of such a type that the movable members tilt are used as the analog sticks 213A and 213B, the degree of input (the degree of tilt) is better perceived by the user, thus allowing the user to more easily perform precise operations.

The left analog stick 213A is provided on the left side of the screen of the LCD 211, and the right analog stick 213B is provided on the right side of the screen of the LCD 211. Therefore, the user can make a direction-specifying input by using an analog stick with either the left or the right hand. As shown in FIGS. 23 and 24, the analog sticks 213A and 213B are provided at such positions that the user can operate them while holding the left and right portions of the terminal device 200 (the left and right opposing end portions with respect to the LCD 211), and therefore the user can easily operate the analog sticks 213A and 213B even when holding and moving the terminal device 200.

The buttons 214A to 214L are operation mechanisms (operation sections) for making predetermined inputs, and are keys that can be pressed. As will be discussed below, the buttons 214A to 214L are provided at such positions that the user can operate them while holding the left and right portions of the terminal device 200 (see FIGS. 23 and 24). Therefore, the user can easily operate these operation mechanisms even when holding and moving the terminal device 200.

As shown in FIG. 21(*a*), the cross button (direction-input button) 214A and the buttons 214B to 214H and 214M, of the operation buttons 214A to 214L, are provided on the front surface of the housing 210. That is, these buttons 214A to 214H and 214M are provided at positions at which they can be operated by the thumbs of the user (see FIGS. 23 and 24).

The cross button 214A is provided on the left side of the LCD 211 and under the left analog stick 213A. That is, the cross button 214A is provided at such a position that it can be operated with the left hand of the user. The cross button 214A has a cross shape, and is a button with which it is possible to specify at least up, down, left and right directions.

The buttons 214B to 214D are provided on the lower side of the LCD 211. These three buttons 214B to 214D are provided at positions at which they can be operated with either the left or the right hand. The terminal device 200 includes the power button 214M for turning ON/OFF the power of the terminal device 200. The power of the game device 3 can be remotely turned ON/OFF by operating the power button 214M. The power button 214M is provided on the lower side of the LCD 211 as are the buttons 214B to 214D. The power button 214M is provided on the right side of the buttons 214B to 214D. Thus, the power button 214M is provided at a position at which it can be operated (easily operated) with the right hand. The four buttons 214E to 214H are provided on the right side of the LCD 211 and under the right analog stick 213B. That is, the four buttons 214E to 214H are provided at positions at: which they can be operated with the right hand of the user. Moreover, the four buttons 214E to 214H are provided on the upper, lower, left and right side (of the center position among the four buttons 214E to 214H). Therefore, with the terminal device 200, the four buttons 214E to 214H can also serve as buttons with which the user specifies the up, down, left and right directions.

In the present embodiment, the analog sticks 213A and 213B are provided above the cross button 214A and the buttons 214E to 214H. Here, the analog sticks 213A and 213B protrude beyond the cross button 214A and the buttons 2143 to 214H in the thickness direction (the y-axis direction). Therefore, if the positions of the analog stick 213A and the cross button 214A are reversed, the thumb of the user may inadvertently touch the analog stick 213A when the user is operating the cross button 214A with the thumb. A similar problem occurs also when the positions of the analog stick 213B and the buttons 214E to 214H are reversed. In contrast, in the present embodiment, since the analog sticks 213A and 213B are provided above the cross button 214A and the buttons 214E to 214H, the possibility that a finger may inadvertently touch the cross button 214A and the buttons 214E to 214H when the user is operating the analog sticks 213A and 213B is smaller as compared with the above cases. Thus, in the present embodiment, the possibility of erroneous operations can be reduced, and it is possible to improve the controllability of the terminal device 200. Note however that in other embodiments, the positions of the analog stick 213A and the cross button 214A may be reversed and the positions of the analog stick 213B and the buttons 214E to 214H may be reversed as necessary.

Here, in the present embodiment, some operation sections (the analog sticks 213A and 213B, the cross button 214A, and the three buttons 214E to 214G) are provided on the left and right opposing sides of the display section (the LCD 211) and above the center of the housing 210 in the up/down direction (y-axis direction). When operating these operation sections, the user primarily holds a portion of the terminal device 200 that is above the center thereof in the up/down direction. If the user holds the lower portion of the housing 210 (particularly if the terminal device 200 has a relatively large size as in the present embodiment), the terminal device 200 to be held becomes unstable, making it more difficult for the user to hold the terminal device 200. In contrast, in the present embodiment, when operating the operation section, the user primarily holds a portion of the terminal device 200 that is above the center thereof in the up/down direction, and the housing 210 can be supported from the sides by the palms. Therefore, the user can stably hold the housing 210 and it is made easier to hold the terminal device 200, thus making it easier to operate the operation section. In other embodiments, operation sections are provided, at least one on the left and one on the right of the display section, above the center of the housing 210. For example, only the analog sticks 213A and 213E may be provided above the center of the housing 210. For example, in a case in which the cross button 214A is provided above the left analog stick 213A and the four buttons 214E to 214H are provided above the right analog stick 213B, the cross button 214A and the four buttons 214B to 214H may be provided above the center of the housing 210.

In the present embodiment, a projecting portion (an eaves portion 219) is provided on the back side of the housing 210 (the side opposite to the front surface where the LCD 211 is provided) (see FIGS. 21(*c*) and 22). As shown in FIG. 21(*c*), the eaves portion 219 is a mountain-shaped member which is projecting from the back surface of the generally plate-shaped housing 210. The projecting portion has such a height (thickness) that it can rest on fingers of the user holding the back surface of the housing 210. The height of the projecting portion is preferably 10 to 25 [mm], and is 16.66 [mm] in the present embodiment. The bottom surface of the projecting portion preferably has an inclination of 45° or more (more preferably 60° or more) with respect to the back surface of the housing 210 so that the projecting portion easily rests on fingers of the user. As shown in FIG. 21(*c*), the bottom surface of the projecting portion may have a larger inclination angle than the upper surface. As shown in FIGS. 23 and 24, the user can hold the terminal device 200 stably without getting tired even if the terminal device 200 has a relatively large size by holding the terminal device 200 while resting fingers on the eaves portion 219 (placing the eaves portion 219 on the fingers). That is, the eaves portion 219 can be referred to as a supporting member by means of which the housing 210 is supported by fingers, and can be referred to also as a finger-resting portion.

The eaves portion 219 is provided above the center of the housing 210 with respect to the up/down direction. The eaves portion 219 is provided on the reverse side so as to generally correspond to the operation sections (the analog sticks 213A and 213B) which are provided on the front surface of the housing 210. That is, the projecting portion is provided so as to extend across an area on the reverse side including positions corresponding to the operation sections which are provided respectively on the left side and on the right side of the display section. Therefore, when operating the operation section, the user can hold the terminal device 200 so as to support the eaves portion 219 with the middle fingers or the ring fingers (see FIGS. 23 and 24). Then, it is easier to hold the terminal device 200, and it is easier to operate the operation sections. In the present embodiment, since the projecting portion has an eaves-like shape extending in the left/right direction, the user can hold the terminal device 200 with the middle fingers or the ring fingers placed along the bottom surface of the projecting portion, making it easier to hold the terminal device 200. The eaves portion 219 is not limited to the shape extending in the horizontal direction as shown in FIG. 22, as long as it is formed so that it (i.e., a portion thereof that is projecting) extends in the left/right direction. In other embodiments, the eaves portion 219 may extend in a direction that is slightly inclined from the horizontal direction. For example, the eaves portion 219 may be provided so as to be inclined upwardly or downwardly) from the left and right opposing end portions toward the center.

The present embodiment employs the eaves portion 219 having a shape of an eaves as the projecting portion formed on the back surface of the housing for the purpose of providing engagement holes to be described below in the eaves portion 219, but the projecting portion may have any other suitable shape. For example, in other embodiments, two projecting portions may be provided in the left and right opposing portions (with no projecting portion in the center of the left/right direction) on the back side of the housing 210 (see FIG. 25). In other embodiments, the cross-sectional shape (the shape along the cross section vertical to the x-axis direction) of the projecting portion may have an arched shape (which opens downward) so that the terminal device 200 can be more firmly supported by the fingers of the user (so that the projecting portion more firmly rests on the fingers).

The width of the projecting portion (the eaves portion 219) in the up/down direction may be of any value. For example, the projecting portion may be formed so as to extend to the top side of the housing 210. That is, the upper surface of the projecting portion may be formed at the same position as the side surface on the upper side of the housing 210. Then, the housing 210 has a 2-tiered structure with the thin lower side and the thick upper side. As described above, the housing 210 preferably includes a down-facing surface (the bottom surface of the projecting portion) formed in the left and right opposing portions of the back surface. Then, the user can easily hold the controller device with fingers abutting against this surface. While the "down-facing surface" may be provided at any position on the back surface of the housing 210, it is preferably located above the center of the housing 210.

As shown in FIGS. 21(*a*), 21(*b*) and 21(*c*), a first L button 214I and a first R button 214J are provided respectively in the right and left opposing portions on the upper surface of the housing 210. In the present embodiment, the first L button 214I and the first R button 214J are provided on diagonally upper portions (the left upper portion and the right upper portion) of the housing 210. Specifically, the first L button 214I is provided at the left end of the upper side surface of the plate-like housing 210 so that it is exposed on the upper left side surface (in other words, it is exposed on both the upper and left side surfaces). The first R button 214J is provided at the right end of the upper side surface of the housing 210, and is exposed on the upper right side surface (in other words, it is exposed on both the upper and right side surfaces). Thus, the first L button 214I is provided at such a position that it can be operated with the left index finger of the user, and the first R button 214J is provided at such a position that it can be operated with the right index finger of the user (see FIG. 23). In other embodiments, the operation sections provided respectively in the left and right portions of the upper surface of the housing 210 do not have to be provided at the left end and the right end, and may be provided at positions other than the end portions. The operation sections may be provided respectively on the left and right side surfaces of the housing 210.

As shown in FIGS. 21(*c*) and 22, a second L button 214K and a second R button 214L are provided on the projecting portion (the eaves portion 219). The second L button 214K is provided near the left end of the eaves portion 219. The second R button 214L is provided near the right end of the eaves portion 219. Specifically, the second L button 214K is provided slightly toward the upper side in the left portion (the left portion as viewed from the front surface side) of the back surface of the housing 210, and the second R button 214L is provided slightly toward the upper side in the right portion (the right portion as viewed from the front surface side) of the back surface of the housing 210. In other words, the second L button 214K is provided on the reverse side so as to (generally) correspond to the left analog stick 213A provided on the front surface, and the second R button 214L is provided on the reverse side so as to (generally) correspond to the right analog stick 213B provided on the front surface. Thus, the second L button 214K is provided at a position at which it can be operated with the left middle finger or left index finger of the user, and the second R button 214L is provided at a position at which it can be operated with the right middle finger or right index finger of the user (see FIGS. 23 and 24). The second L button 214K and the second R button 214L are provided on the upper surface of the eaves portion 219 as shown in FIG. 21(*c*). Therefore, the second L button 214K and the second R button 214L have upwardly-facing (diagonally-upwardly-facing) button surfaces. It is believed that the middle fingers or the index fingers will generally move in the up/down direction when the user holds the terminal device 200, and it will be easier for the user to press the second L button 214K and the second R button 214L if the button surfaces are facing upward.

As described above, in the present embodiment, operation sections (the analog sticks 213A and 213B) are provided respectively on the left side and the right side of the display section (the LCD 211) above the center of the housing 210, and other operation sections (the second L button 214K and the second R button 214L) are provided on the back side of the housing 210 so as to generally correspond respectively to the operation sections. Thus, since the operation sections and the other operation sections are provided on the front side and on the back side of the housing 210 so as to generally correspond to each other, the user can hold the housing 210 so as to sandwich the housing 210 from the front side and from the back side when operating these operation sections. When operating these operation sections, the user holds a portion of the housing 210 that is above the center thereof in the up/down direction, and therefore the terminal device 200 can be held in the upper portion thereof and the terminal device 200 can be supported by the palms (see FIGS. 23 and 24). Thus, the user can stably hold the housing 210 in a state in which the user can operate at least four operation sections, and it is therefore possible to provide a controller device (the terminal device 200) which can be easily held by the user and which has a good controllability.

As described above, in the present embodiment, the user can easily hold the terminal device 200 by holding the terminal device 200 with fingers abutting against the bottom surface of the projecting portion (the eaves portion 219). Since the second L button 214K and the second P button 214L are provided on the upper surface of the projecting portion, the user can easily operate these buttons in such a state as described above. The user can easily hold the terminal device 200 in the following manner, for example.

That is, as shown in FIG. 23, the user can hold the terminal device 200 with the ring fingers abutting against the bottom surface of the eaves portion 219 (the one-dot-chain line shown in FIG. 23) (so as to support the eaves portion 219 with the ring fingers). Then, the user can operate the four buttons (the first L button 214I, the first R button 214J, the second L button 214K and the second R button 214L) with the index fingers and the middle fingers. For example, in a case in which required game operations are relatively complicated and many buttons are to be used, it is possible to easily operate many buttons by holding the terminal device 200 as shown in FIG. 23. Since the analog sticks 213A and 213B are provided above the cross button 214A and the buttons 214E to 214H, the user can advantageously operate the analog sticks 213A and 213B with the thumbs when relatively complicated operations are required. In FIG. 23, the user holds the terminal device 200 with the thumbs abutting against the front surface of the housing 210, the index fingers against the upper surface of the housing 210, the middle fingers against the upper surface of the eaves portion 219 on the back surface of the housing 210, the ring fingers against the bottom surface of the eaves portion 219, and the little fingers against the back surface of the housing 210. Thus, the user can firmly hold the terminal device 200 as if to wrap around the housing 210 from four directions.

As shown in FIG. 24, the user can also hold the terminal device 200 with the middle fingers abutting against the bottom surface of the eaves portion 219 (the one-dot-chain line shown in FIG. 24). Then, the user can easily operate two buttons (the second L button 214K and the second R button 214L) with the index fingers. For example, in a case in which required game operations are relatively simple and only a few buttons are to be used, the terminal device 200 may be held as shown in FIG. 24. In FIG. 24, since the user can hold the lower side of the housing 210 with two fingers (the ring finger and the little finger), it is possible to firmly hold the terminal device 200.

In the present embodiment, the eaves portion 219 is provided so that the bottom surface thereof is located between the analog sticks 213A and 213B and the cross button 214A and the four buttons 214E to 214H (so that it is located on the lower side of the analog sticks 213A and 213B and above the cross button 214A and the four buttons 214E to 214H). Therefore, in a case in which the terminal device 200 is held with the ring fingers abutting against the eaves portion 219 (FIG. 23), the analog sticks 213A and 213B can be easily operated with the thumbs, and in a case in which the terminal device 200 is held with the middle fingers abutting against the eaves portion 219 (FIG. 24), the cross button 214A and the four buttons 214E to 214H can be easily operated with the thumbs. That is, in either of the two cases, the user can make a direction input operation while firmly holding the terminal device 200.

As described above, the user can also hold the terminal device 200 in a portrait position. That is, as shown in FIG. 25, the user can hold the terminal device 200 in a portrait position by holding the top side of the terminal device 200 with the left hand. As shown in FIG. 26, the user can hold the terminal device 200 in a portrait position by holding the bottom side of the terminal device 200 with the left hand while FIGS. 25 and 26 show the case in which the terminal device 200 is held with the left hand, it may be held with the right hand. Thus, since the user can hold the terminal device 200 with one hand, it is possible to for example perform an operation in which the terminal device 200 is held with one hand while an input is made to the touch panel 212 with the other hand.

In a case in which the terminal device 200 is held in a manner shown in FIG. 25, the user can firmly hold the terminal device 200 by having fingers other than the thumbs (the middle fingers, the ring fingers and the little fingers in FIG. 25) abutting against the bottom surface of the eaves portion 219 (the one-dot-chain line shown in FIG. 25). Particularly, in the present embodiment, since the eaves portion 219 extends in the left/right direction (in the up/down direction in FIG. 25), the user can abut fingers other than the thumbs against the eaves portion 219 and firmly hold the terminal device 200, irrespective of the position along the top side of the terminal device 200 at which the user holds the terminal device 200. That is, in a case in which the terminal device 200 is used in a portrait position, the eaves portion 219 can be used as a grip. On the other hand, in a case in which the terminal device 200 is held in a manner shown in FIG. 26, the user can operate the buttons 214B to 214D with the left hand. Therefore, it is possible for example to operate the buttons 214B to 214D with the hand with which the terminal device 200 is held while making inputs to the touch panel 212 with the other hand, thereby allowing for more operations.

With the terminal device 200 of the present embodiment, since the projecting portion (the eaves portion 219) is provided on the back surface, if the terminal device 200 is put down with the screen of the LCD 211 (the front surface of the housing 210) facing up, the screen is slightly inclined. Therefore, the screen is more easily seen with the terminal device 200 put down. Input operations to the touch panel 212 are more easily performed with the terminal device 200 put down. In other embodiments, an additional projecting portion having generally the same height as the eaves portion 219 may be formed on the back surface of the housing 210. Then, with the screen of the LCD 211 facing up, the terminal device 200 can be put down so that the screen is horizontal with the projecting portions in contact with the floor surface. The additional projecting portion may be a removable (or foldable) member. Then, the terminal device can be put down with the screen either slightly inclined or with the screen horizontal. That is, in a case in which the terminal device 200 is put down and used, the eaves portion 219 can be used as a leg portion.

The buttons 214A to 214L are each assigned a function in accordance with the game program. For example, the cross button 214A and the buttons 214E to 214H may be used for direction-specifying operations, selection operations, etc., whereas the buttons 214B to 214E may be used for OK button operations, cancel button operations, etc. The terminal device 200 may include a button for turning ON/OFF the power of the LCD 211, and a button for performing a connection setting (pairing) with the game device 3.

As shown in FIG. 21(a), the terminal device 200 includes the marker section 215 including a marker 215A and a marker 215B on the front surface of the housing 210. The marker section 215 is provided on the upper side of the LCD 211. The marker 215A and the marker 215B are each formed by one or more infrared LEDs, as are the markers 6R and 6L of the marker device 6. The infrared LEDs of the markers 215A and 215B are provided inside a window portion that is transmissive to infrared light. The marker section 215 is used for the game device 3 to calculate the movement, etc., of the controller 5, as is the marker device 6 described above. The game device 3 can control the lighting of the infrared LEDs of the marker section 215.

The terminal device 200 includes a camera 216 as an image-capturing mechanism. The camera 216 includes an image-capturing element (e.g., a CCD image sensor, a CMOS image sensor, or the like) having a predetermined resolution, and a lens. As shown in FIG. 21, the camera 216 is provided on the front surface of the housing 210 in the present embodiment. Therefore, the camera 216 can capture an image of the face of the user holding the terminal device 200, and can capture an image of the user playing a game while looking at the LCD 211, for example. In the present embodiment, the camera 216 is provided between the two markers 215A and 215B.

The terminal device 200 includes a microphone 239 as a sound input mechanism. A microphone hole 210c is provided on the front surface of the housing 210. The microphone 239 is provided inside the housing 210 behind the microphone hole 210c. The microphone 239 detects sounds around the terminal device 200 such as the voice of the user.

The terminal device 200 includes a speaker 237 as a sound output mechanism. As shown in FIG. 21(d), speaker holes 217 are provided in a lower portion of the front surface of the housing 210. The output sounds from the speaker 237 are outputted from the speaker holes 217. In the present embodiment, the terminal device 200 includes two speakers, and the speaker holes 217 are provided at the respective positions of each of the left speaker and the right speaker. The terminal device 200 includes a knob 224 for adjusting the sound volume of the speaker 237. The terminal device 200 includes a sound output terminal 222 for receiving a sound output section such as an earphone connected thereto. Although the sound output terminal 222 and the knob 224 are provided on the upper side surface of the housing 210 considering the fact that the additional device is connected to the lower side surface of the housing, they may alternatively be provided on the left or right side surface or on the lower side surface.

The housing 210 includes a window 223 through which an infrared signal from an infrared communication module 242 is emitted to the outside of the terminal device 200. The window 223 is herein provided on the upper side surface of the housing 210 so that the infrared signal is emitted in a forward direction of the user when the user holds the opposing sides of the LCD 211. In other embodiments, the window 223 may be provided at any position such as, for example, on the back surface of the housing 210.

The terminal device 200 includes an extension connector 218 via which another device can be connected to the terminal device 200. The extension connector 218 is a communication terminal for exchanging data (information) with another device connected to the terminal device 200. In the present embodiment, the extension connector 218 is provided on the lower side surface of the housing 210 as shown in FIG. 21(d). The additional device connected to the extension connector 218 may be any device, and may be, for example, a game-specific controller (gun-shaped controller, etc.) or an input device such as a keyboard. The extension connector 218 may be omitted if there is no need to connect an additional device to terminal device 200. The extension connector 218 may include a terminal for supplying power to the additional device or a terminal for charging.

In addition to the extension connector 218, the terminal device 200 includes a charging terminal 226 for obtaining power from an additional device. When the charging terminal 226 is connected to a predetermined charging stand to be described below, power is supplied from the charging stand to the terminal device 200. In the present embodiment, the charging terminal 226 is provided on the lower side surface of the housing 210. Therefore, when the terminal device 200 and an additional device are connected to each other, it is possible to supply power from one to the other, in addition to exchanging information therebetween, via the extension connector 218. Thus, with the provision of the charging terminal 226 around (on the left and right opposing sides of) the extension connector 218, it is possible to supply power, as well as exchange information, when the terminal device 200 and an additional device are connected to each other. The terminal device 200 includes a charging connector, and the housing 210 includes a cover portion 221 for protecting the charging connector. The charging connector can be connected to a charger 246 to be described below, and power is supplied from the charger 246 to the terminal device 200 when, the charging connector is connected to the charger. Although the charging connector (the cover portion 221) is provided on the upper side surface of the housing 210 in view of the fact that an additional device is connected to the lower side surface of the housing in the present embodiment, it may be provided on the left and right side surfaces or the lower side surface.

The terminal device 200 includes a battery cover 227 which can be attached to and removed from the housing 210. A battery (a battery 245 shown in FIG. 27) is placed inside the battery cover 227. In the present embodiment, the battery cover 227 is provided on the back side of the housing 210, below the projecting portion (the eaves portion 219).

The housing 210 of the terminal device 200 includes holes 225a and 225b through which a strap cord can be tied to the terminal device 200. As shown in FIG. 21(d), the holes 225a and 225b are provided on the bottom surface of the housing 210 in the present embodiment. Two holes 225a and 225b are provided in the present embodiment, one in the left portion and another in the right portion of the housing 210. Specifically, the hole 225a is provided on the left side of the center of the bottom surface of the housing 210, and the hole 225b is provided on the right side of the center of the bottom surface of the housing 210. The user can tie a strap to one of the holes 225a and 225b, and fasten the strap to the wrist of the user. Then, even if the user drops the terminal device 200 or if the terminal device 200 comes off the hand, the terminal device 200 is prevented from falling or hitting other objects. In the present embodiment, since the holes are provided both in the left and right portions, the user can conveniently fasten a strap to either hand.

With the terminal device 200 shown in FIGS. 21 to 26, the shape of each operation button, the shape of the housing 210, the number and the positions of the components, etc., are merely illustrative, and the present invention can be realized with other shapes, numbers, and positions.

Figure 27:
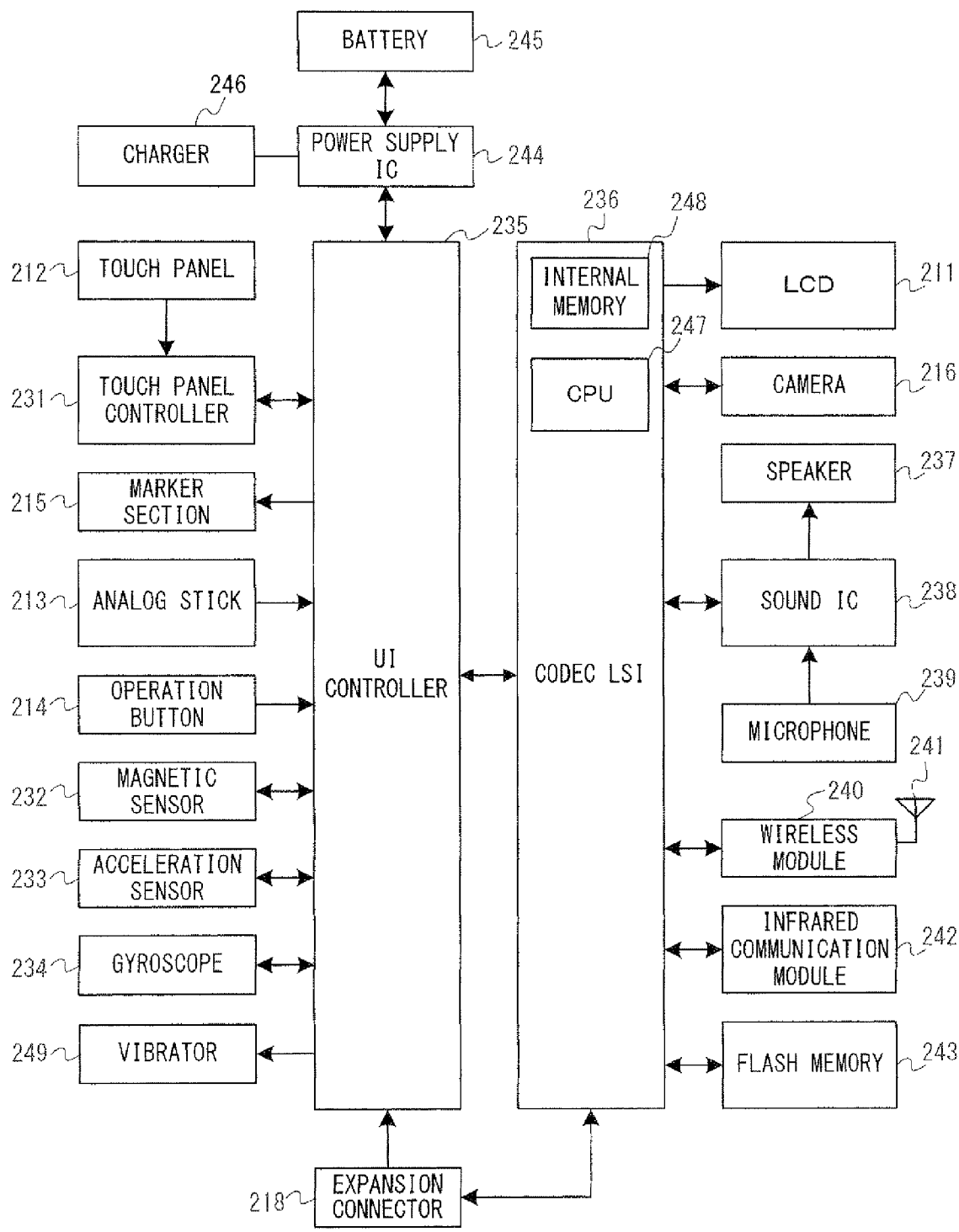
FIG. 27 is a block diagram showing an internal configuration of the terminal device shown in FIG. 21.

Next, an internal configuration of the terminal device 200 will be described with reference to FIG. 27. FIG. 27 is a block diagram showing an internal configuration of the terminal device 200. As shown in FIG. 27, in addition to the configuration shown in FIG. 21, the terminal device 200 includes a touch panel controller 231, a magnetic sensor 232, the acceleration sensor 233, the gyrosensor 234, a user interface controller (UI controller) 235, a codec LSI 236, the speaker 237, a sound IC 238, the microphone 239, a wireless module 240, an antenna 241, an infrared communication module 242, a flash memory 243, a power supply IC 244, a battery 245, and a vibrator 249. These electronic components are mounted on an electronic circuit board and accommodated in the housing 210.

The UI controller 235 is a circuit for controlling the input/output of data to/from various types of input/output sections. The UI controller 235 is connected to the touch panel controller 231, an analog stick 213 (the analog sticks 213A and 213B), an operation button 214 (the operation buttons 214A to 214L), the marker section 215, the magnetic sensor 232, the acceleration sensor 233, the gyrosensor 234, and the vibrator 249. The UI controller 235 is connected to the codec LSI 236 and the extension connector 218. The power supply IC 244 is connected to the UI controller 235, and power is supplied to various sections via the UI controller 235. The built-in battery 245 is connected to a power supply IC 244 to supply power. The charger 246 or a cable with which power can be obtained from an external power source can be connected to the power supply IC 244 via a charging connector, and the terminal device 200 can receive power supply from or be charged by an external power source using the charger 246 or the cable. The terminal device 200 may be charged by attaching the terminal device 200 to a cradle (not shown) having a charging function. That is, although not shown in the drawings, a cradle with which power can be obtained from an external power supply can be connected to the power supply IC 244 via the charging terminal 226, and the terminal device 200 can receive power supply from or be charged by an external power supply using the cradle.

The touch panel controller 231 is a circuit connected to the touch panel 212 for controlling the touch panel 212. The touch panel controller 231 generates touch position data of a predetermined format based on signals from the touch panel 212, and outputs it to the UI controller 235. The touch position data represents, for example, the coordinates of a position on the input surface of the touch panel 212 at which an input is made. The touch panel controller 231 reads a signal from the touch panel 212 and generates touch position data at a rate of once per a predetermined amount of time. Various control instructions for the touch panel 212 are outputted from the UI controller 235 to the touch panel controller 231.

The analog stick 213 outputs, to the UI controller 235, stick data representing the direction and the amount of slide (or tilt) of the stick portion operated with a finger of the user. The operation button 214 outputs, to the UI controller 235, operation button data representing the input status of each of the operation buttons 214A to 214L (e.g., whether it is pressed).

The magnetic sensor 232 detects the azimuthal direction by sensing the size and direction of the magnetic field. Azimuthal direction data representing the detected azimuthal direction is outputted to the UI controller 235. Control instructions for the magnetic sensor 232 are outputted from the UT controller 235 to the magnetic sensor 232. While there are sensors using an MI (magnetic impedance) element, a fluxgate sensor, a Hall element, a GMR (giant magneto-resistive) element, a TMR (tunnel magneto-resistance) element, an AMP (anisotropic magneto-resistive) element, etc., the magnetic sensor 232 may be any sensor as long as it is possible to detect the azimuthal direction. Strictly speaking, in a place where there is a magnetic field other than the geomagnetic field, the obtained azimuthal direction data does not represent the azimuthal direction. Nevertheless, if the terminal device 200 moves, the azimuthal direction data changes, and it is therefore possible to calculate the change in the attitude of the terminal device 200.

The acceleration sensor 233 is provided inside the housing 210 for detecting the magnitude of the linear acceleration along each of the directions of the three axes (the x, y and z axes shown in FIG. 21(a)). Specifically, the acceleration sensor 233 detects the magnitude of the linear acceleration along each of the axes, where the x axis lies in the longitudinal direction of the housing 210, the y axis lies in the direction vertical to the surface of the housing 210, and the z axis lies in the width direction of the housing 210. Acceleration data representing the detected acceleration is outputted to the UI controller 235. Control instructions for the acceleration sensor 233 are outputted from the UI controller 235 to the acceleration sensor 233. While the acceleration sensor 233 is assumed to be a capacitive-type MEMS-type acceleration sensor, for example, in the present embodiment, other types of acceleration sensors may be employed in other embodiments. The acceleration sensor 233 may be an acceleration sensor for 1-axis or 2-axis detection.

The gyrosensor 234 is provided inside the housing 210 for detecting angular velocities about the three axes, i.e., the x-axis, the y-axis and the z-axis. Angular velocity data representing the detected angular velocities is outputted to the UT controller 235. Control instructions for a gyrosensor 234 are outputted from the UT controller 235 to the gyrosensor 234. The number and combination of gyrosensors used for detecting angular velocities about three axes may be any number and combination, and the gyrosensor 234 may be formed by a 2-axis gyrosensor and a 1-axis gyrosensor, as is the gyrosensor unit 6. The gyrosensor 234 may be a gyrosensor for 1-axis or 2-axis detection.

The vibrator 249 is, for example, a vibration motor or a solenoid, and is connected to the UI controller 235. The terminal device 200 is vibrated by actuation of the vibrator 249 based on a command from the UT controller 235. Therefore, the vibration is conveyed to the player's hand holding the terminal device 200, and thus a so-called vibration-feedback game is realized.

The UI controller 235 outputs, to the codec LSI 236, operation data including touch position data, stick data, operation button data, azimuthal direction data, acceleration data, and angular velocity data received from various components described above. If another device is connected to the terminal device 200 via the extension connector 218, data representing an operation performed on the other device may be further included in the operation data.

The codec LSI 236 is a circuit for performing a compression process on data to be transmitted to the game device 3, and an expansion process on data transmitted from the game device 3. The LCD 211, the camera 216, the sound IC 238, the wireless module 240, the flash memory 243, and the infrared communication module 242 are connected to the codec LSI 236. The codec LSI 236 includes a CPU 247 and an internal memory 248. While the terminal device 200 does not itself perform game processes, the terminal device 200 needs to execute a minimal program for the management thereof and for the communication. When the terminal device 200 is started up, a program stored in the flash memory 243 is read out to the internal memory 248 and executed by the CPU 247 upon power-up. Some area of the internal memory 248 is used as the TRAM for the LCD 211.

The camera 216 captures an image in response to an instruction from the game device 3, and outputs the captured image data to the codec LSI 236. Control instructions for the camera 216, such as an image-capturing instruction, are outputted from the codec LSI 236 to the camera 216. Camera 216 can also record video. That is, the camera 216 can repeatedly capture images and repeatedly output the image data to the codec LSI 236.

The sound IC 238 is a circuit connected to the speaker 237 and the microphone 239 for controlling input/output of sound data to/from the speaker 237 and the microphone 239. That is, when sound data is received from the codec LSI 236, the sound IC 238 outputs sound signals obtained by performing D/A conversion on the sound data to the speaker 237 so that sound is outputted from the speaker 237. The microphone 239 detects sounds propagated to the terminal device 200 (the sound of the user, etc.), and outputs sound signals representing such sounds to the sound. IC 238. The sound IC 238 performs A/D conversion on the sound signals from the microphone 239 to output sound data of a predetermined format to the codec LSI 236.

The codec LSI 236 transmits, as terminal operation data, image data from the camera 216, sound data from the microphone 239 and operation data from the UI controller 235 to the game device 3 via the wireless module 240. In the present embodiment, the codec LSI 236 performs a compression process similar to that of the image compression section 27 on the image data and the sound data. The terminal operation data and the compressed image data and sound data are outputted, as transmit data, to the wireless module 240. The antenna 241 is connected to the wireless module 240, and the wireless module 240 transmits the transmit data to the game device 3 via the antenna 241. The wireless module 240 has a similar function to that of the high-speed wireless communication module 28 of the game device 3. That is, the wireless module 240 has a function of connecting to a wireless LAN by a scheme in conformity with the IEEE 802.11n standard, for example. The transmitted data may be encrypted as necessary or may not be encrypted.

As described above, the transmit data transmitted from the terminal device 200 to the game device 3 includes operation data (the terminal operation data), image data, and sound data. In a case in which another device is connected to the terminal device 200 via the extension connector 218, data received from the other device may be further included in the transmit data. The infrared communication module 242 establishes infrared communication in conformity with the IRDA standard, for example, with the other device. The codec LSI 236 may transmit, to the game device 3, data received via infrared communication while it is included in the transmit data as necessary.

As described above, compressed image data and sound data are transmitted from the game device 3 to the terminal device 200. These data are received by the codec LSI 236 via the antenna 241 and the wireless module 240. The codec LSI 236 expands the received image data and sound data. The expanded image data is outputted to the LCD 211, and images are displayed on the LCD 211. That is, the codec LSI 236 (the CPU 247) displays the received image data on the display section. The expanded sound data is outputted to the sound IC 238, and the sound IC 238 outputs sounds from the speaker 237.

In a case in which control data is included in data received from the game device 3, the codec LSI 236 and the UI controller 235 give control instructions to various sections in accordance with the control data. As described above, the control data is data representing control instructions for the components of the terminal device 200 (the camera 216, the touch panel controller 231, the marker section 215, sensors 222 to 224, and the infrared communication module 242 in the present embodiment). In the present embodiment, control instructions represented by control data may be instructions to activate the operation of the components or deactivate (stop) the operation thereof. That is, components that are not used in a game may be deactivated in order to reduce the power consumption, in which case it is ensured that data from the deactivated components are not included in the transmit data transmitted from the terminal device 200 to the game device 3. For the marker section 215, which is an infrared LED, the control can be done simply by turning ON/OFF the power supply thereto.

While the terminal device 200 includes operation mechanisms such as the touch panel 212, an analog stick 213 and the operation button 214, as described above, in other embodiments, other operation mechanisms may be included instead of, or in addition to, these operation mechanisms.

While the terminal device 200 includes the magnetic sensor 232, the acceleration sensor 233 and the gyrosensor 234 as sensors for calculating movement of the terminal device 200 (including the position and the attitude thereof, or changes in the position and the attitude thereof), it may only include one or two of these sensors in other embodiments. In other embodiments, other sensors may be included instead of, or in addition to, these sensors.

While the terminal device 200 includes the camera 216 and the microphone 239, it may not include the camera 216 and the microphone 239 or it may include only one of them in other embodiments.

While the terminal device 200 includes the marker section 215 as a configuration for calculating the positional relationship between the terminal device 200 and the controller 5 (the position and/or attitude, etc., of the terminal device 200 as seen from the controller 5), it may not include the marker section 215 in other embodiments. In other embodiments, the terminal device 200 may include other mechanisms as a configuration for calculating the positional relationship. For example, in other embodiments, the controller 5 may include a marker section, and the terminal device 200 may include an image-capturing element. Moreover, in such a case, the marker device 6 may include an image-capturing element, instead of an infrared LED.

As discussed above, the various systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable processor executing a suitable program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language, if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

The processing system/circuitry described in this specification is "programmed" to control processes such as game processes in accordance with the "logic" described in the specification. One of ordinary skill in the art will therefore recognize that, for example, a processing system including at least one CPU when executing instructions in accordance this logic operates as "programmed logic circuitry" to perform the operations defined by the logic.

As described above, the present invention is applicable to, for example, a game system and a game program with the aim of, for example, making it possible to easily specify a direction in a three-dimensional space using a pointing device such as a touch panel or a touch pad.

While the invention has been described in detail, the foregoing description is in all aspects illustrative and not restrictive. It is understood that numerous other modifications and variations can be devised without departing from the scope of the invention.

What is claimed is:

1. A game system comprising a game device, and a hand-held device having a predetermined input surface, wherein:
the hand-held device comprises:
a touch data output section for outputting touch data representing a player input position on the predetermined input surface;
a movement data output section for outputting movement data whose value changes in accordance with movement of the hand-held device; and
an operation data transmission section for transmitting operation data including the touch data and the movement data to the game device; and the game device comprises:
a first receiving section for receiving the operation data;
a surface control section for controlling an attitude of a control surface placed in a three-dimensional game space based on the movement data;
a direction calculation section for calculating a control direction in the game space based on the attitude of the control surface and the touch data;
a game process section for performing a game process based on the control direction;
a first image generation section for generating a first game image representing the game space based on a first virtual camera which is set in the game space; and
a first image output section for outputting the first game image to a first display device which is separate from the hand-held device.

2. The game system according to claim 1, wherein the game process section controls a movement direction of a predetermined object in the game space based on the control direction.

3. The game system according to claim 1, wherein:
the direction calculation section comprises:
a position calculation section for calculating a control position on the control surface based on the touch data; and
a direction identification section for identifying the control direction based on the control position.

4. The game system according to claim 3, wherein:
the position calculation section calculates a plurality of control positions on the control surface based on touch data representing successive inputs; and
the direction identification section identifies, as the control direction, a direction represented by the plurality of control positions.

5. The game system according to claim 4, wherein the game process section moves a predetermined object in the game space in a direction determined by the control direction in an attitude determined by the attitude of the control surface.

6. The game system according to claim 4, wherein:
the surface control section controls the attitude of the control surface placed in the game space based on the movement data; and
the game process section sets the first virtual camera so that the control surface is included in an image-capturing range.

7. The game system according to claim 3, wherein the direction identification section identifies, as the control direction, a direction from a predetermined position in the game space to the control position.

8. The game system according to claim 7, wherein:
the game device comprises:
a second image generation section for generating a second game image representing the game space based on a second virtual camera which is set in the game space; and
a second image output section for outputting the second game image to the hand-held device; and
the hand-held device comprises:
a second receiving section for receiving the second game image from the game device; and
a display process section for displaying the second game image on a second display device which is provided on the hand-held device.

9. The game system according to claim 8, wherein the direction identification section identifies, as the control direction, a direction from a position of the second virtual camera to the control position.

10. The game system according to claim 8, wherein the game process section moves the second virtual camera in accordance with a change in the control surface so that the control surface is included in an image-capturing range of the second virtual camera.

11. The game system according to claim 8, wherein the touch data output section is a touch panel including the input surface on a screen of the second display device.

12. The game system according to claim 11, wherein the game process section sets the second virtual camera so that an input position on the input surface and a control position corresponding to the input position coincide with each other on the screen of the second display device.

13. The game system according to claim 3, wherein:
the game device further comprises an attitude calculation section for calculating an attitude of the hand-held device based on the movement data; and
the surface control section controls the attitude of the control surface in accordance with the attitude of the hand-held device.

14. The game system according to claim 1, wherein the movement data output section comprises at least one of an acceleration sensor for outputting acceleration data and a gyrosensor for outputting angular velocity data.

15. A game device capable of communicating with a hand-held device having a predetermined input surface, the game device comprising:
a receiving section for receiving, from the hand-held device, operation data which includes touch data representing a player input position on the predetermined input surface and movement data whose value changes in accordance with movement of the hand-held device;
a surface control section for controlling an attitude of a control surface placed in a three-dimensional game space based on the movement data;
a direction calculation section for calculating a control direction in the game space based on the attitude of the control surface and the touch data;
a game process section for performing a game process based on the control direction;
a first image generation section for generating a first game image representing the game space based on a first virtual camera which is set in the game space; and
a first image output section for outputting the first game image to a first display device which is separate from the hand-held device.

16. The game device according to claim 15, wherein:
the direction calculation section comprises:
a position calculation section for calculating a control position on the control surface based on the touch data; and
a direction identification section for identifying the control direction based on the control position, wherein:
the position calculation section calculates a plurality of control positions on the control surface based on touch data representing successive inputs; and
the direction identification section identifies, as the control direction, a direction represented by the plurality of control positions.

17. The game device according to claim 15, wherein:
the direction calculation section comprises:
a position calculation section for calculating a control position on the control surface based on the touch data; and
a direction identification section for identifying, as the control direction, a direction from a predetermined position in the game space to the control position.

18. The game device according to claim 17, comprising:
a second image generation section for generating a second game image representing the game space based on a second virtual camera which is set in the game space; and
a second image output section for outputting the second game image to the hand-held device so as to display the second game image on a second display device which is provided on the hand-held device.

19. A computer-readable storage medium storing therein a game program executable on a computer of a game device which is capable of communicating with a hand-held device having a predetermined input surface, the game program causing the computer to function as:
an obtaining section for obtaining, from the hand-held device, operation data which includes touch data representing a player input position on the predetermined input surface and movement data whose value changes in accordance with movement of the hand-held device;
a surface control section for controlling an attitude of a control surface placed in a three-dimensional game space based on the movement data;
a direction calculation section for calculating a control direction in the game space based on the attitude of the control surface and the touch data;
a game process section for performing a game process based on the control direction;
a first image generation section for generating a first game image representing the game space based on a first virtual camera which is set in the game space; and
a first image output section for outputting the first game image to a first display device which is separate from the hand-held device.

20. The storage medium according to claim 19, wherein:
the direction calculation section comprises:
a position calculation section for calculating a control position on the control surface based on the touch data; and
a direction identification section for identifying the control direction based on the control position;
the position calculation section calculates a plurality of control positions on the control surface based on touch data representing successive inputs; and
the direction identification section identifies, as the control direction, a direction represented by the plurality of control positions.

21. The storage medium according to claim 19, wherein:
the direction calculation section comprises:
a position calculation section for calculating a control position on the control surface based on the touch data; and
a direction identification section for identifying, as the control direction, a direction from a predetermined position in the game space to the control position.

22. The storage medium according to claim 21, wherein:
the game program causes the computer to further function as:
a second image generation section for generating a second game image representing the game space based on a second virtual camera which is set in the game space; and a second image output section for outputting the second game image to the hand-held device so as to display the second game image on a second display device which is provided on the hand-held device.

23. A game process method to be carried out in a game system comprising a game device, and a hand-held device having a predetermined input surface, wherein:
the hand-held device performs:
a touch data output step of outputting touch data representing a player input position on the predetermined input surface;
a movement data output step of outputting movement data whose value changes in accordance with movement of the hand-held device; and
an operation data transmission step of transmitting operation data including the touch data and the movement data to the game device;
the game device performs:
a reception step of receiving the operation data;
a surface control step of controlling an attitude of a control surface placed in a three-dimensional game space based on the movement data;
a direction calculation step of calculating a control direction in the game space based on the attitude of the control surface and the touch data;
a game process step of performing a game process based on the control direction;
a first image generation step of generating a first game image representing the game space based on a first virtual camera which is set in the game space; and
a first image output step of outputting the first game image to a first display device which is separate from the hand-held device.

24. The game process method according to claim 23, wherein:
the direction calculation step comprises:
a position calculation step of calculating a control position on the control surface based on the touch data; and
a direction identification step of identifying the control direction based on the control position;
in the position calculation step, the game device calculates a plurality of control positions on the control surface based on the touch data representing successive inputs; and
in the direction identification step, the game device identifies, as the control direction, a direction represented by the plurality of control positions.

25. The game process method according to claim 23, wherein:
the direction calculation step comprises:
a position calculation step of calculating a control position on the control surface based on the touch data; and
a direction identification step of identifying, as the control direction, a direction from a predetermined position in the game space to the control position.

26. The game process method according to claim 25, wherein:
the game device further performs:
a second image generation step of generating a second game image representing the game space based on a second virtual camera which is set in the game space; and
a second image output step of outputting the second game image to the hand-held device so as to display the second game image on a second display device which is provided on the hand-held device.

\* \* \* \* \*